US011232680B2

(12) United States Patent
Weaver et al.

(10) Patent No.: US 11,232,680 B2
(45) Date of Patent: Jan. 25, 2022

(54) VIRTUAL WORLD GAMING TOURNAMENT WITH LIVE HOST

(71) Applicant: Pilot Games, Inc., Saint Paul, MN (US)

(72) Inventors: Jon Weaver, Saint Paul, MN (US); Warren R. White, Reno, NV (US); Anthony M. Morelli, Mt. Pleasant, MI (US); William D. Hermansen, Reno, NV (US)

(73) Assignee: PILOT GAMES, INC., Minnetonka, MN (US)

( * ) Notice: Subject to any disclaimer, the term of this patent is extended or adjusted under 35 U.S.C. 154(b) by 0 days.

(21) Appl. No.: 16/865,200

(22) Filed: May 1, 2020

(65) Prior Publication Data

US 2020/0360821 A1 Nov. 19, 2020

Related U.S. Application Data

(60) Provisional application No. 62/843,418, filed on May 4, 2019.

(51) Int. Cl.
*G07F 17/32* (2006.01)
*A63F 13/35* (2014.01)
*A63F 13/537* (2014.01)
*A63F 13/798* (2014.01)

(52) U.S. Cl.
CPC .......... *G07F 17/3276* (2013.01); *A63F 13/35* (2014.09); *A63F 13/537* (2014.09); *A63F 13/798* (2014.09); *G07F 17/329* (2013.01); *G07F 17/3211* (2013.01); *G07F 17/3225* (2013.01); *G07F 17/3258* (2013.01)

(58) Field of Classification Search
None
See application file for complete search history.

(56) References Cited

U.S. PATENT DOCUMENTS

| 10,086,278 | B2 * | 10/2018 | Elias | A63F 3/06 |
| 2015/0213672 | A1 * | 7/2015 | Elias | G07F 17/329 463/19 |
| 2020/0226873 | A1 * | 7/2020 | Weaver | G07F 17/3237 |
| 2020/0364987 | A1 * | 11/2020 | Weaver | A63F 13/35 |

* cited by examiner

*Primary Examiner* — Ronald Laneau
(74) *Attorney, Agent, or Firm* — Kerr IP Group, LLC

(57) ABSTRACT

A gaming system and method operating a virtual world gaming tournament is described. The gaming system includes gaming clients, a virtual world, a tournament session, a live host and a tournament prize. The virtual world has a variety of different locations and each gaming client is located at a particular location in the virtual world. The tournament session includes predetermined game sessions for each gaming client, in which each game session associates a random game outcome with a symbolic representation that is displayed at the location in the virtual world. The live host identifies locations in the virtual world and provides updates on the points awarded to the gaming clients at the virtual world location. The live host selectively broadcasts a first virtual world or a second virtual world during the tournament session. Additionally, the live host broadcast is displayed on a networked display or on the gaming clients.

20 Claims, 67 Drawing Sheets

MAIN SCREEN

PLAYER STANDINGS

PLAYER PROFILE

Figure 33

EVENT SCHEDULE

VENUES

VIRTUAL REWARDS

NEWS AND BLOG

MWS GAMES

VIRTUAL WORLD GAMING TOURNAMENT WITH LIVE HOST

CROSS REFERENCES

This patent application claims the benefit of provisional patent application 62/843,418 entitled CENTRALIZING TOURNAMENT GAME WITH VIRTUAL GAME REPRESENTATION that was filed on May 4, 2019.

FIELD

A gaming system and method operating a virtual world gaming tournament is described. The tournament session includes random outcomes and awards points for specific random outcomes. A live host identifies locations in the virtual world and provides updates about the points awarded at different locations in the virtual world.

BACKGROUND

Typical wagering devices include slot machines and video lottery terminals and are normally managed by various types of computer systems which monitor and control their activities. Such wagering devices are typically located in casinos, racetracks, tribal gaming locations or other authorized locations. These are generally capital-intensive operations where the high amount of play justifies a significant capital expenditure.

Smaller gaming venues, including charitable gaming venues, are challenged by such devices for several reasons: 1) play volume may not generate enough revenue to make expensive, proprietary devices cost-effective; 2) small locations cannot afford dedicated maintenance staffs to keep complex devices working; 3) considerable expertise is needed to coordinate effective operations; and, 4) such gaming devices require considerable space.

While gaming is still a popular and generally profitable enterprise, the popularity of gaming activity is not high among younger elements of the population. Indeed, most casinos and large gaming operations report an ever-increasing average age of players. This is an industry concern and results in a constant search for new ways to appeal to a younger age-group.

Virtual worlds engage younger players. A virtual world is a computer based online community where players interact in simulated world. Users interact with other users in these worlds using an avatar. Also, player engagement is improved when progressive prizes are included in game play because progressive prizes create excitement and attract players of all ages.

The virtual world systems and methods presented herein are directed to mobile devices, in combination with a video transmission system to produce a flexible, secure, low-cost gaming alternative. Additionally, the systems and methods presented herein support virtual world games that are socially centered and may appeal to younger players. Also, the introduction of tournaments games with tournament prizes and progressive prizes combined with an on-line community playing in a virtual world to appeal to players of all ages.

Therefore, it would beneficial to provide a system and method that can provide an engaging gaming experience that combines a linked bingo tournament with a virtual world.

Additionally, it would be beneficial to provide a linked bingo tournament system and method that is integrates a tournament prize with a progressive prize.

SUMMARY

A gaming system operating a virtual world gaming tournament is described. The gaming system includes gaming clients, a virtual world, a tournament session, a live host and a tournament prize. The gaming clients are communicatively coupled to a wagering sub-system that receives a wager from each of the gaming clients. The virtual world has a variety of different locations. Each gaming client is located at a particular location in the virtual world. The tournament session includes predetermined game sessions for each gaming client. The tournament session begins at a particular time and the tournament session ends when the predetermined number of game sessions have been played. Each game session associates a random game outcome with a symbolic representation that is displayed at the location in the virtual world associated with the gaming client. The random game outcome associated with each game session is further associated with points that are displayed in the virtual world associated with the gaming client. The live host identifies locations in the virtual world and provides updates on the points awarded to the gaming clients at the virtual world location. The live host selectively broadcasts a first virtual world or a second virtual world during the tournament session. Additionally, the live host broadcast is displayed on a networked display or on the gaming clients. The tournament prize associated with the tournament session is displayed on each gaming client. Additionally, the tournament prize is awarded to the gaming clients displaying a highest point total upon completion of the tournament session.

A bingo gaming system and method operating a virtual gaming tournament is also described. The gaming system includes bingo gaming clients, a virtual world, a bingo tournament session, a live host and tournament prize. The bingo gaming clients are communicatively coupled to a bingo wagering sub-system that receives a wager from each of the bingo gaming clients. The virtual world has a variety of different locations. Each bingo gaming client is associated with a location in the virtual world. The bingo tournament session includes predetermined bingo game sessions for each bingo gaming client. The bingo tournament session begins at a particular time and the bingo tournament session ends when the predetermined number of bingo game sessions have been played. Each bingo game session for each bingo gaming client associates a random bingo game outcome with a symbolic representation that is displayed at the location in the virtual world associated with the bingo gaming client. The random bingo game outcome associated with each bingo game session includes one or more points that are displayed in the virtual world associated with the bingo gaming client. The live host that identifies the locations in the virtual world. The live host provides updates on the points awarded to one or more bingo gaming clients at the virtual world location. The live host selectively broadcasts a first virtual world or a second virtual world during the tournament session. Additionally, the live host broadcast is displayed on a networked display or on the gaming clients. The tournament prize associated with the tournament session is displayed on each bingo gaming client. The tournament prize is awarded to bingo gaming clients displaying a highest point total upon completion of the tournament session.

In one illustrative embodiment, the live host is displayed on the gaming client. In another embodiment, the live host is displayed on a separate networked display. In yet another illustrative embodiment, the live host selects locations and provides updates about game play in the virtual world gaming tournament. Also, the symbolic representation associated with the random outcome includes a point value and a symbolic object that is associated with the point value.

In yet another illustrative embodiment, each gaming client in the tournament session receives a same wager from each gaming client.

In still another illustrative embodiment, the gaming system may also include a progressive prize that receives a portion of each wager received by the wagering sub-system. The progressive prize may be associated with the tournament session. Additionally, the progressive prize may be displayed on each gaming client. The progressive prize is awarded to each gaming client at the completion of the game session when the random game outcome corresponds to being awarded the progressive prize.

FIGURES

The illustrative embodiments may be more fully understood by reference to the following drawings which are for illustrative, not limiting, purposes.

FIG. 33 shows an illustrative GLW portion of the player profile.

FIG. 44 also shows the awarded points being displayed as a large mouth bass.

DESCRIPTION

Persons of ordinary skill in the art will realize that the following description is illustrative and not in any way limiting. Other embodiments of the claimed subject matter will readily suggest themselves to such skilled persons having the benefit of this disclosure. The various illustrative embodiments will now be described more fully with reference to the accompanying drawings. It should be understood that this disclosure and the claims may be embodied in many different forms and should not be construed as limited to the embodiments set forth herein. Additionally, those familiar with computing systems shall appreciate that there are many variants possible for the described systems, depending on the nature of the available networks, legal frameworks, which can open or restrict the types of locations in which the system can be operated, advances in server and networking technologies, etc.

The gaming systems and methods presented herein include a mobile wagering and entertainment system that is designed to be used in wagering applications within legal gaming frameworks. More specifically, the gaming systems and methods presented herein support centralized control of wagering that takes place in multiple wagering venues and provides an integrated broadcast capability so that an entertaining complement to the wagering can be presented on television screens in the gaming venues.

A gaming venue includes a charity, a casino and any other such authorized or licensed gaming venue. Additionally, a gaming venue includes a church, hotel, bar, restaurant, convenience store and other such locations that support licensed gaming activity. Note, that the term "gaming" refers to games of chance or games that include a chance component, in which a wager is received, and the awarded prize is dependent on the outcome of the game of chance or of the chance component As described in further detail herein, the gaming system and method includes a Mobile Wagering Sub-system (MWS) and a Video Presentation Sub-system (VPS). The gaming system is communicatively coupled to a plurality of remote gaming venues, in which each remote gaming venue has at least one mobile client device that supports customer wagering. Additionally, each remote gaming venue may include one or more Point-of-Sale stations that manage player funds. Furthermore, each remote gaming venue may include one or more television monitors that broadcast content complementary to wagering activities. In the illustrative embodiments presented herein, the various elements of the gaming system are communicatively and operatively coupled to one another with a network structure that includes the Internet as the backbone and at least one secure Wi-Fi network within each gaming venue.

Figure 1:
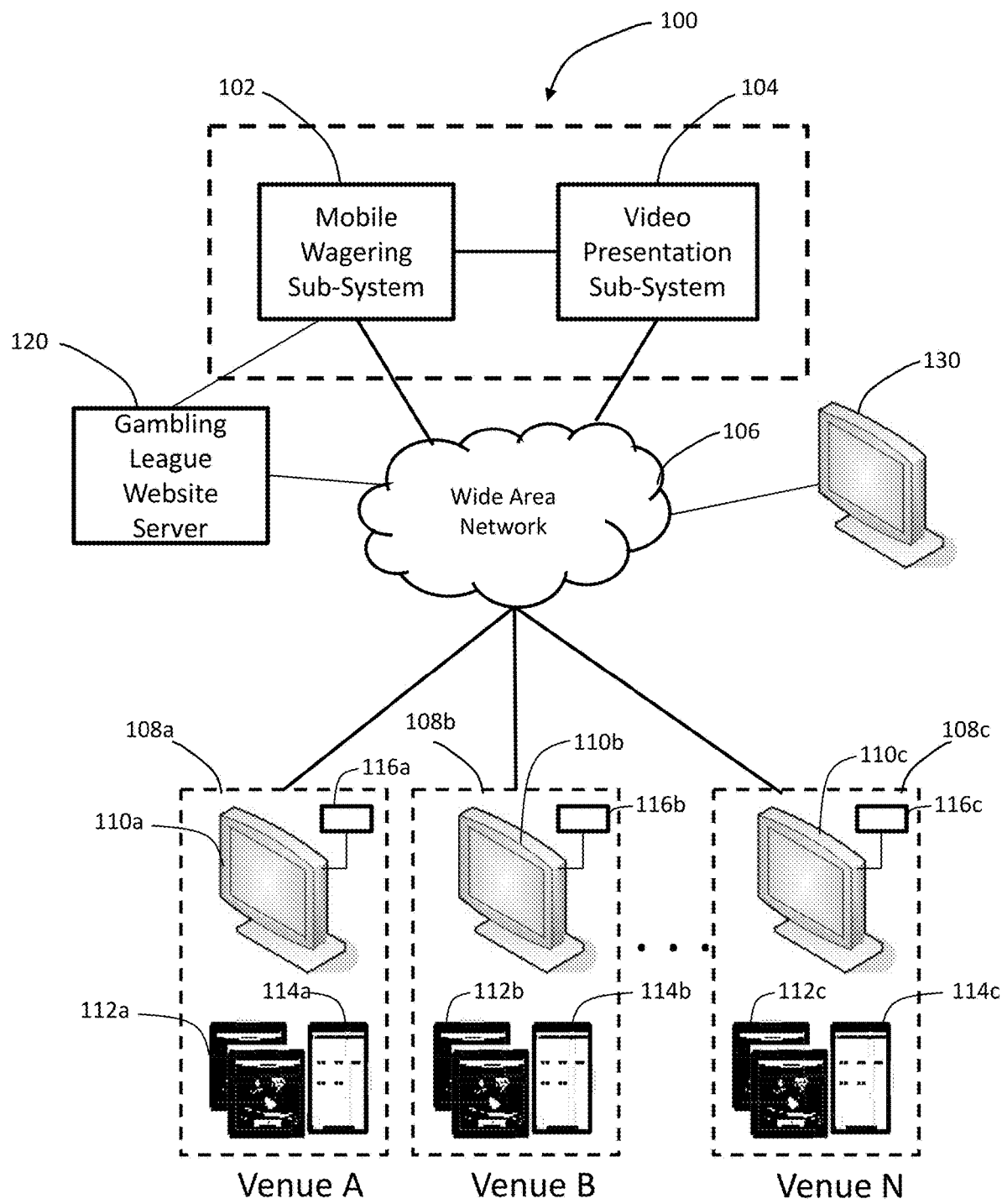
FIG. 1 shows an illustrative centralized gaming system.

Referring to FIG. 1, there is shown an illustrative centralized gaming system. The centralized gaming system 100 includes a mobile wagering sub-system 102 and a video presentation sub-system 104. The mobile wagering sub-system 102 and the video presentation sub-system 104 are communicatively coupled to one another. Additionally, the mobile wagering sub-system 102 and the video presentation sub-system 104 are communicatively coupled to a Wide Area Network 106, e.g. Internet, which is communicatively coupled to a plurality of gaming venues, namely, gaming illustrative Venue A 108a, Venue B 108b and other such gaming venues as represented by Venue N 108c. Each of the plurality of gaming venues 108a, 108b and 108c include a stationary monitor 110a, 110b and 110c, respectively. Each stationary monitor 110a, 110b and 110c is communicatively coupled to the video presentation client 116a, 116b and 116c, respectively. The video presentation clients 116 are also communicatively coupled to the video presentation subsystem 104. The combination of the stationary monitor 110 and the video presentation client 116 may also be referred as a "stationary monitor client," and as such reference to "stationary monitor client" refers to the combination of the stationary monitor 110 and the video presentation client 116.

Within the system architecture each gaming venue may be associated with a sponsoring organization, e.g. a charity, and an additional business entity, e.g. a distributor. The types of venues, sponsoring organizations and other business entities will vary according jurisdictional statures and regulation.

Additionally, each of the gaming venues 108a, 108b and 108c include a plurality of authorized mobile devices 112a, 112b and 112c, respectively. Further still, each of the gaming venues includes a Point-of-Sale (POS) device 114a, 114b and 114c. The illustrative authorized mobile devices 112 and the POS devices 114 are client devices configured to communicate with each other and the mobile wagering sub-system 102. In operation, the authorized mobile devices 112 and POS devices 114 are registered with the mobile wagering sub-system 102, which includes a database (not shown) that associates the authorized mobile devices 112 and POS devices 114 with a designated gaming venue 108. Thus, authorized mobile devices 112 and POS devices 114 are not allowed to interact with the centralized gamine system 100 when the client devices are not located at the designated gaming venue.

The illustrative authorized mobile devices 112 operate as wireless client devices that are communicatively coupled to the centralized gaming system 100. Additionally, the centralized gaming system 100 may be communicatively coupled to authorized non-mobile clients. Furthermore, other client devices such as non-mobile clients may be disposed in the gaming venues and these non-mobile clients may be communicatively coupled to the centralized gaming system 100. These authorized non-mobile client devices include, but are not limited to, wired devices such as gaming machines, slot machines, PCs, stationary monitors, Internet appliances, Internet of Things (IoT) devices and other such non-mobile devices with hardwire connections or wireless connections to the Wide Area Network 106. The non-mobile client devices may be configured to participate in the games presented herein including, but not limited to, the tournament games described hereinafter.

Operationally, client devices must comply with the system-centric gaming requirements in which all gaming and accounting activity are controlled by the mobile wagering sub-systems servers 102, and have the communications infrastructure, directly or by proxy, to interact with the server in a manner consistent with the operations of the authorized mobile devices 112 described herein.

The illustrative gaming system 100 includes a plurality of server applications that are configured to provide high-availability and redundancy, process all inputs and generates outputs. The illustrative gaming system 100 includes three different types of network communications. Firstly, there are network communications between the internal server components, namely, the mobile wagering sub-system 102 and the video presentation sub-system 104. Secondly, there are network communications between the server components 102/104 and the remote gaming venues 108a, 108b and 108c, as well as the Gambling League Website server 120. Thirdly, there are network communications within the gaming venues 108a, 108b and 108c.

With respect to network communications between the internal server components, the illustrative server components operate as a single network, in which the servers can communicate with one another using service requests. By way of example and not of limitation, the illustrative internal server components have two internet protocol addresses, namely, a Private IP used to maintain the server network and ensuring secure server-to-server communication, and a Public IP that is bound to the Internet and that provides access to server services through high security communications such as HTTPS. The internal server components use their private IPs for server-to-server communication so that these services are not exposed to the Internet, the game application running on the authorized mobile devices and the POS devices.

By way of example and not of limitation, each server is configured with an SSL certificate which supports HTTPS calls. The illustrative server is configured to forward some requests it receives through HTTPS to a local port, and the requests that are allowed to pass are only those available to authorized "Game" and "POS" devices. This illustrative configuration ensures that only very specific requests are allowed from the public IP.

By way of example and not of limitation the servers are implemented using the Linux operating system using Restful programming techniques using Java as the programming language with Jersey RS support. Database structures are contained in a MySQL database.

Communication between the server components, namely, the mobile wagering sub-system 102 and the video presentation sub-system 104, and the remote client devices is performed over a wide-area network 106. As described above, these network communications are performed using secure SSL communications over the Internet.

Figure 2:
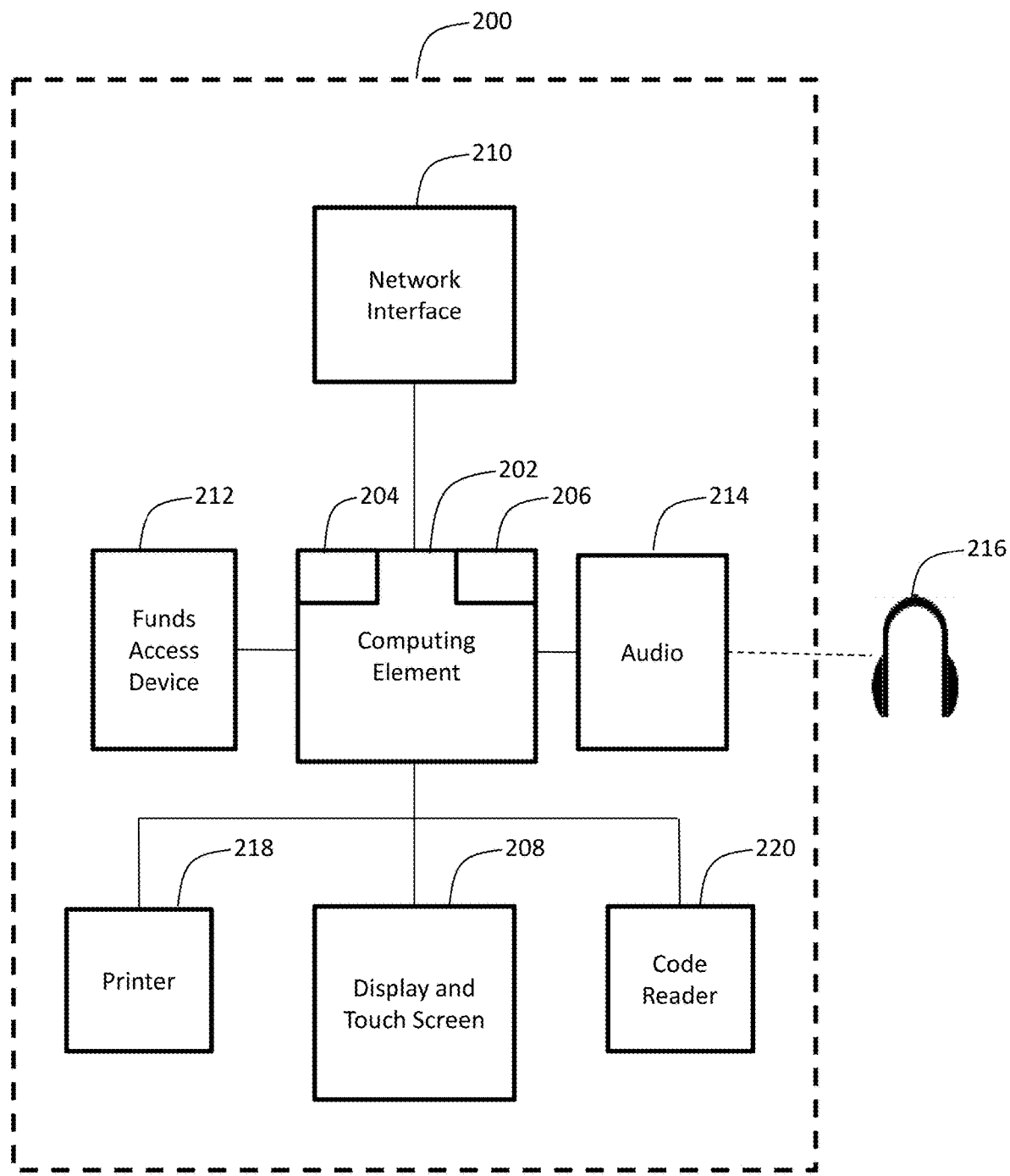
FIG. 2 shows an illustrative authorized mobile device or point-of-sale device.

The authorized mobile devices 112a, 112b and 12c are also referred to as a "player interface unit." An illustrative authorized mobile device is presented in FIG. 2. Operationally, each authorized mobile device 112 in an illustrative embodiment is associated with a player account.

By way of example and not of limitation, the player account is described as a short-term, anonymous entity tied to the client device being used by the player, and which expires when the fund balance drops to zero. However, it is possible in other embodiments to have player accounts which may exist for longer time periods and be tied to a player.

Additionally, it should be noted that while the illustrative embodiments presented herein generally describe financial transactions such as adding funds or cashing out at the POS device 114, in different regulatory environments or with different technology, such player accounts can have financial transactions originating at the player device or any other client device that may be configured to support POS transaction. Also, the financial transactions may be supported at a system level with a server component or server module that provides a web portal functions for financial transactions. Thus, the financial transactions may be performed by the client device, a server component, a server module, or any combination thereof. Depending on regulatory issues and available technology, financial transactions may be based on cash, credit cards, debit cards, digital currency or other mediums of finance.

Referring now to FIG. 2, there is shown an illustrative authorized mobile device or point-of-sale device. The illustrative authorized mobile device 200 may be one the plurality of authorized mobile devices 112 that are associated with each venue. The illustrative authorized mobile device 200 includes a central computing element 202 with a processor 204 and memory storage 206. One or more games may be pre-installed on the authorized mobile device 200 before the authorized mobile devices are deployed in a gaming venue or other such production environment. Alternatively, the illustrate game title files may be stored in a remote server, e.g. an "App" store, and the authorized mobile device 200 may configured to download the game title file, run the game title file and enable the user to interact with the corresponding game title.

The authorized mobile device 200 also includes a color display with a touch-screen 208 and a network interface component 210, which provides network access to a local area network, a wide area network or any combination thereof. By way of example and not of limitation the network interface component supports a wireless local area network such as a Wi-Fi network, which is based on IEEE 802.11 standards. Additionally, the authorized mobile device 200 may communicate with the wide area network 106 via the illustrative Wi-Fi network. The communication between the authorized mobile device 200 and the mobile wagering sub-system 102 may be performed using the illustrative HTTPS protocol or other such secure networking protocol that allows game session inputs, commands and outputs to be communicated securely across the Wide Area Network.

In an illustrative embodiment, the authorized mobile device 200 may be a tablet computing devices running iOS or Android operating systems. The illustrative authorized mobile device may also include a Funds Access Device module 212 that may be configured to have a custom locked profile to evade security-bypassing attempts. The Funds Access Devices (FAD) 212 may also provide alternative methods for starting customer account sessions or adding funds to existing account sessions. By way of example and not of limitation, the Funds Access Device module 212 may include currency readers and debit/credit card readers such as a magnetic stripe reader, a smart-card reader, an infra-red reader, a Near-Field-Communications reader and other such financial transaction readers.

The authorized mobile device 200 may also include an audio system component 214 that enhances the game-playing experience for the players. The audio system component 214 may also include a standard audio jack so that player can use wired or wireless headphones 216 to improve the game audio environment without disturbing others.

In one illustrative embodiment, the authorized mobile device 200 may include a printer 218 and a code reader 220. By way of example and not of limitation, the printer 218 generates vouchers. The illustrative code reader 220 may be embodied as a bar-code reader that is configured to read vouchers generated by the printer.

By way of example and not of limitation, the authorized mobile device 200 may be configured to include a "HELP" button in the game client that also dispatches a signal to the POS to notify the operator that the player is requesting assistance. The authorized mobile device 200 may also be configured to include a text-to-speech functionality to aid a visually impaired player. Additionally, the authorized mobile device 200 may include a gaming application that downloads files, decompresses the downloaded files if they have been compressed, and caches all assets inside the authorized mobile device 200. The authorized mobile device 200 supports dynamic updates without the need to update the game client itself.

Referring now to FIG. 1 and FIG. 2, the mobile wagering sub-system 102 is communicatively coupled to a plurality of authorized mobile device 112 such as illustrative player interface unit 200 presented in FIG. 2. In one illustrative embodiment, the mobile wagering sub-system 102 receives a wager input for a game session from the illustrative player interface unit 200. In another illustrative embodiment, the mobile wagering sub-system 102 receives the wager input for a game session from a plurality of authorized mobile devices 112, which may be disposed at one or more venues as presented in FIG. 1.

The illustrative authorized mobile device 200 presents a user interface on touch screen 208 that shows a plurality of game content associated with different types of game sessions. In the illustrative embodiment, the authorized mobile device 200 may also accept player inputs that are associated with a game session. The game session may perform various operations as described in further detail below.

In the illustrative embodiment, the video presentation sub-system 104 is communicatively coupled to the mobile wagering sub-system 102, the video presentation client 116, and the stationary monitors 110 disposed in the different gaming revenues. The video presentation sub-system 104 generates entertainment output associated with ongoing activity in the mobile gaming system.

One or more of the stationary monitors 110 then receives the entertainment output generated by the video presentation sub-system. The stationary monitors 110a, 110b and 110c then proceed to display the entertainment output generated by the video presentation sub-system 104.

In the illustrative embodiment, a first plurality of authorized devices 112a associated with a first gaming venue 108a includes a first stationary monitor 110a and first video presentation client 116a. Additionally, a second plurality of authorized mobile devices 112b associated with a second gaming venue 108b includes a second stationary monitor 110b and second video presentation client 116b. The first stationary monitor 110a and the second stationary monitor 110 are both communicatively coupled to video presentation sub-system 104. The video presentation sub-system 104 may have stored thereon an entertainment output, such as a video, that is associated with wagering activity. The video presentation sub-system 104 communicates the output, e.g. video, to the first stationary monitor 110a and the second stationary monitor 110b via the video presentation client 116a and 116b, respectively.

By way of example and not of limitation, for an illustrative bingo tournament game that includes a bingo game session, the various stationary monitors 110a, 110b and 110c may present a bingo video related to the bingo tournament game. Thus, a plurality of different authorized mobile device 112 from different gaming venues 108 can participate in the bingo tournament game and share a similar video experience.

Figure 3:
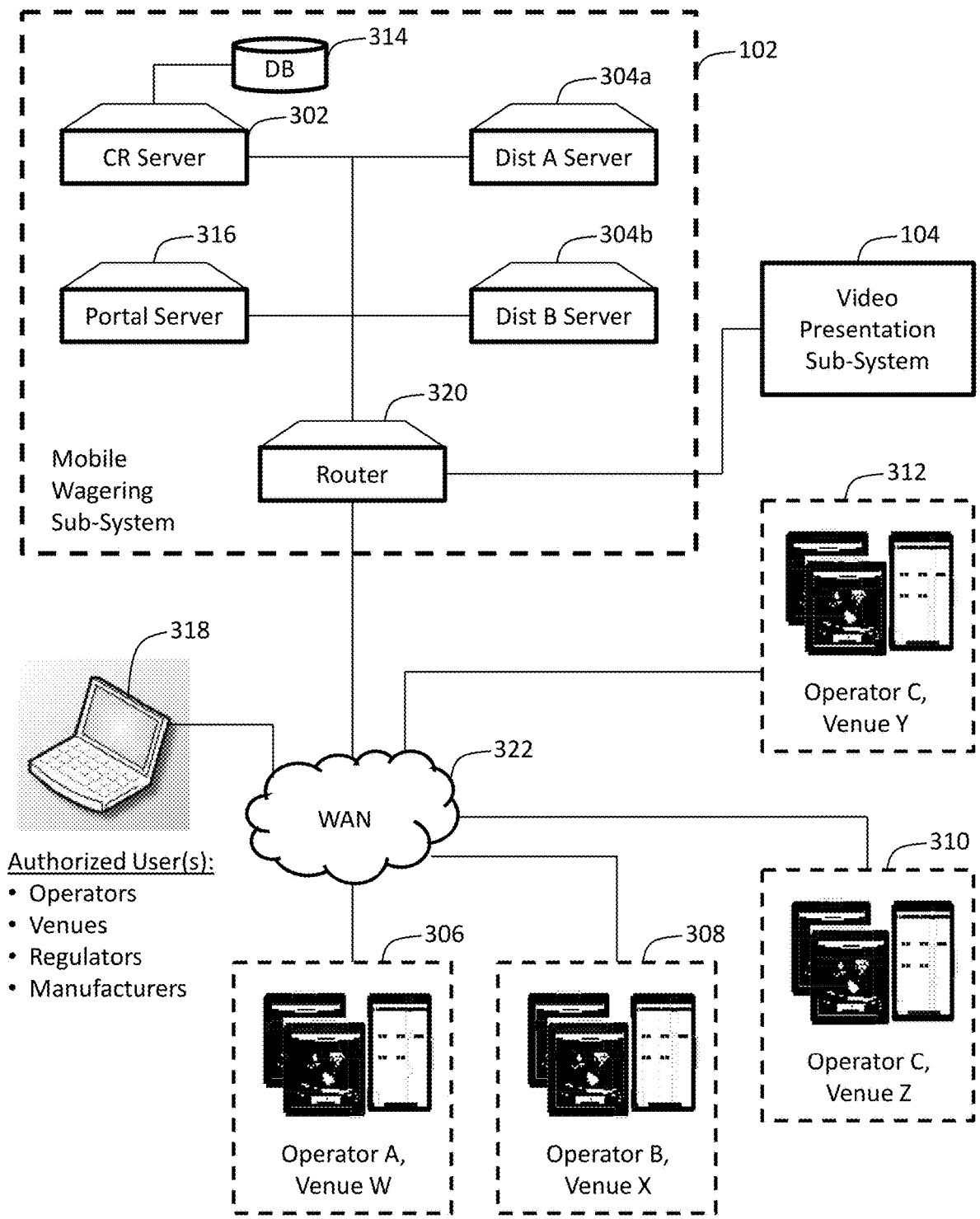
FIG. 3 shows detail of the mobile wagering sub-system.

Referring to FIG. 3, there is shown further detail for the mobile wagering sub-system 102 communicatively coupled to different venues. In an illustrative embodiment, the mobile wagering system functionality is distributed on multiple servers, including those that provide database 314 functionality. The illustrative mobile wagering sub-system 102 includes a centralized resource/manufacturer server 302 that performs as a coordinating entity for system operation and maintains authority over game operations controlled by the centralized gaming system 100. The mobile wagering sub-system 102 also includes a distributor server 304 that is communicatively coupled to the centralized resource server 302.

In the illustrative embodiment presented in FIG. 3, a first distributor server 304a and second distributor server 304b are also communicatively to the centralized resource server 302. Each of the illustrative distributor servers is configured to manage and control the game operations and cashier operations performed at a set of gaming venues that are associated with a distributor who is responsible for sales and support of a multiplicity of venues.

For example, a first set of gaming venues 306 and 308 are configured to communicate with first distributor server 304a, which manages and controls the game operations at gaming venues 306 and 308. Additionally, for a second set of gaming venues 310 and 312 are configured to communicate with the illustrative second distributor server 304b manages and controls the game operations at gaming venues 310 and 312. Thus, multiple gaming venues may require additional distributor servers.

A variety of tasks may be performed by the centralized resource server 302. For example, one of the tasks performed by the centralized resource server 302 includes providing a central routing operation for each of the authorized mobile devices 112 so that each authorized mobile device 112 is routed to the proper distributor server 304a or 340b upon activation each authorized mobile device. By way of example and not of limitation, the first request generated by an authorized mobile device 200 may direct the authorized mobile device 200 to an illustrative distributor of the authorized mobile device 200.

Additionally, the centralized resource server 302 may be configured to provide a central routing operation for cashier authentication. Thus, a cashier device may be authenticated by the appropriate distributor server 304, which may then forward an authentication to an illustrative mobile device distributor.

The centralized resource server 302 may also be configured to operate as a central authority for generation of finite decks of predetermined electronic pull-tab results.

Furthermore, the centralized resource server 302 may be configured to manage and control financial information. The centralized resource server 302 may include a centralized database 314 that stores data generated by the cashiers, authorized mobile devices, and the various gaming venues. The centralized database 314 provides a central repository for accounting data, game play data, system configuration data, and other such data types.

The illustrative distributor servers 304 are communicatively coupled to the centralized resource server 302. Each of the distributor servers 304 may be configured to manage finances for the player accounts that are associated with the authorized mobile devices. Additionally, the illustrative distributor servers 304 may be responsible for generating logs and reports required for the POS devices. Furthermore, the illustrative distributor servers 304 may be configured to manage game play operations, wagers and prizes. Further still, the illustrative distributor servers 304 may manage cashier operations including customer sales and redemptions. Further yet, the distributor servers 304 may be configured to maintain the financial status for the authorized mobile devices, including the actual credit balance on each player device.

In an alternative embodiment, the operations performed by the centralized resource server 302 and the distributor server 304 may be performed by a centralized resource software module (not shown) and a distributor software module (not shown) that may be associated with a client-server architecture, a distributed architecture, a peer-to-peer architecture, a hierarchical architecture, a "cloud" architecture or any combination thereof.

The mobile wagering sub-system 102 may also include an illustrative web portal server 316. The web portal server 316 provides a web interface to access system accounting and operational data, as well as to maintain and configure the system. The web portal server 316 is configured to support creating, editing and removing entities like distributors, operators, venues, cashiers, devices, game parameters and others as required. All actions performed on the portal are logged for auditing purposes. This action log can be access on the portal itself if the user has the necessary system privilege.

By way of example and not of limitation, the web portal server may be accessed from personal computers or tablet devices 318 over the internet. Authorized users having "administrator" privileges may access system reports and controls based upon their operational needs and organizational affiliation. The web portal server 316 supports a variety of different authorized users having different roles with different levels of access to the mobile wagering sub-system 102. For example, the web portal server may be configured to support the following roles: regulator, manufacturer, distributor with access to multiple operators, operator with access to multiple venues, a particular venue, a particular cashier and other such preconfigured roles.

An illustrative router 320 is disposed within the mobile wagering sub-system 102. The router 320 is communicatively coupled to a wide area network 322, e.g. Internet, which is communicatively coupled to the various venues and authorized users. Additionally, the illustrative router 320 is communicatively coupled to the portal server 316, the video presentation sub-system 104, each distributor server 304 and the centralized resource server 302. The router 320 forwards data packets to the appropriate server, network, internet appliance, sub-system and other such destination. Additionally, the router 320 may include a firewall that supports secure communications with the mobile wagering sub-system.

Figure 4:
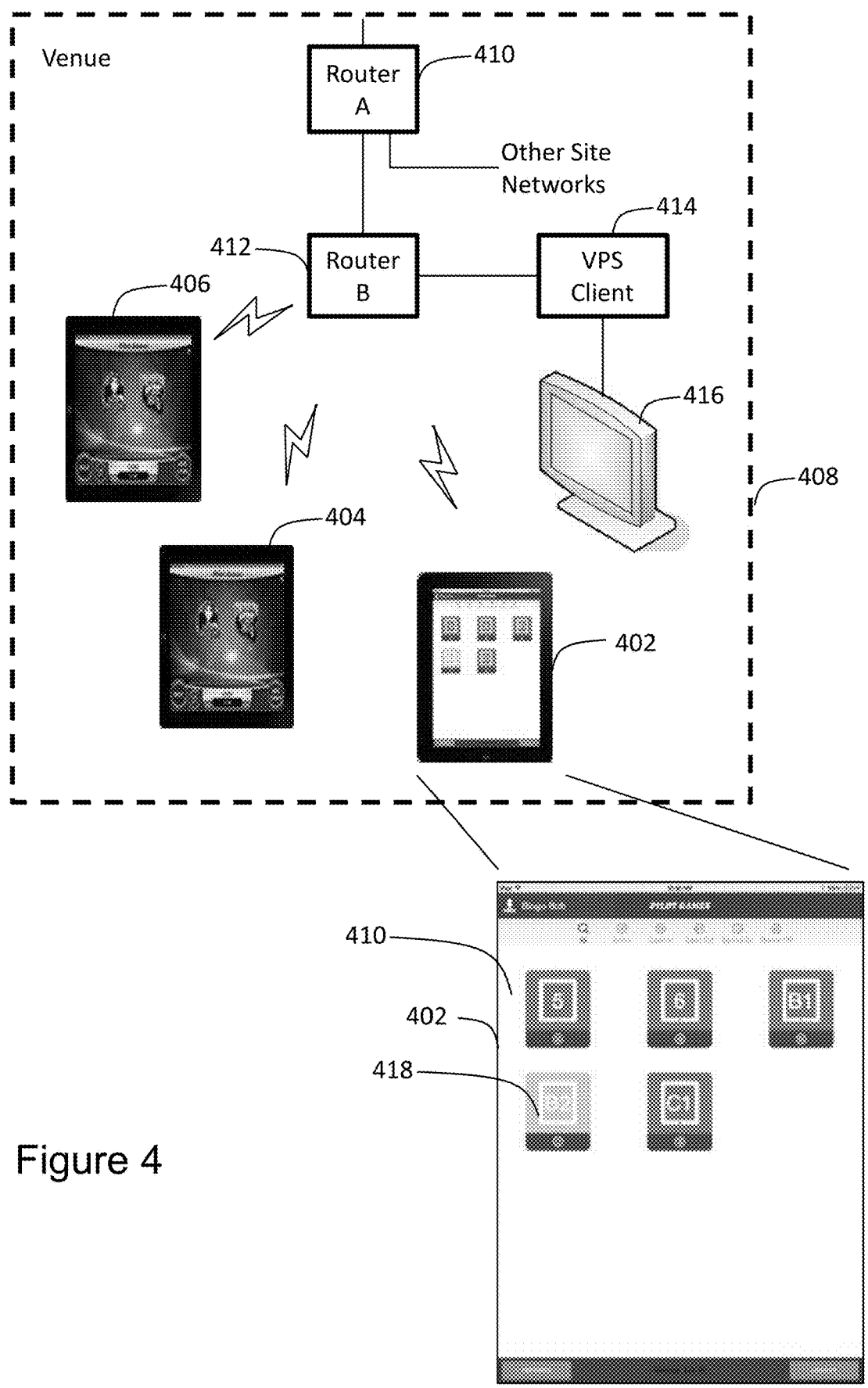
FIG. 4 shows an illustrative point-of-sale (POS) device communicatively coupled to authorized mobile devices in a gaming venue.

Referring now to FIG. 4, there is shown an illustrative point-of-sale (POS) device communicatively coupled to authorized mobile devices in a gaming venue. The illustrative POS device 402 is communicatively coupled to one or more authorized mobile devices 404 and 406 in gaming venue 408. By way of example and not of limitation, the illustrative POS device 402 is communicatively coupled to authorized mobile devices with a native Socket implementation inside a Local Area Network. An exploded view of an illustrative user interface 410 corresponding to POS device 402 is also shown.

The point-of-sale device 402 is configured to manage all cash operations such as cash-in operations and cash-out operations. The cash-in and cash-out operations may be requested by the authorized mobile device 404, the authorized mobile device 406, the POS 402 or any combination thereof.

The illustrative point-of-sale (POS) device 402 and authorized mobile devices 404 and 406 may be embodied as a mobile device as described above in FIG. 2. The illustrative POS device 402 is a client device configured to receive and operate an illustrative proprietary POS Application. The authorized mobile devices 404 and 406 are client devices configured to receive and operate a proprietary Game Application. The illustrative POS device 402 and authorized mobile devices 404 and 406 are communicatively coupled with the mobile wagering sub-system 102. In the illustrative embodiment, the client devices communicate with the mobile wagering sub-system 102 for each transaction. More generally, all wagering and accounting information is monitored and stored in the centralized gaming system 100 and the client devices always reflect the information received from the centralized gaming system 100. For reasons of security and consistency all game play decisions and financial data is hosted in the centralized gaming system and only visually reflected in the client devices.

As shown in FIG. 4, the illustrative wide area network 106, e.g. Internet, (shown in FIG. 1) is communicatively coupled to the illustrative gaming venue 408. In the illustrative embodiment, the illustrative wide area network terminates at Router A 410. The illustrative Router A 410 may be a pre-existing router located at the venue 408 and usable for multiple purposes, depending on the needs of the venue. For example, Router A 410 may be a component of a cable TV system. In the illustrative embodiment, a second Router B 412 is also communicatively coupled to router A 410. Illustrative Router B 412 is configured to support the requirements for communications with the mobile wagering sub-stem 102 and video presentation sub-system 104.

In the illustrative embodiment, router B 412 establishes two private Wi-Fi SSIDs to be used only at a specific site. Each Wi-Fi SSID includes a security key that is unique to that site and is not available to site personnel. One SSID may be used for the exclusive use of the mobile wagering system 102 and a second SSID may be provided for exclusive use of the video presentation system 104. Router B is also communicatively coupled to video presentation client 414, which is communicatively coupled to the monitor 416.

The illustrative POS 402 tablet is an electronic device that may be operated cashier in a venue. The POS device 402 provides control over financial activity within the venue. The illustrative POS Application program runs on a tablet device and supports the following illustrative operations, namely, a cash-in operation (sales), a cash-out operation (redemption) and a reporting operation.

In the illustrative embodiment, the cashier logs into the POS application program by providing a cashier user name and password. During the set-up process, the cashier name is associated with a cashier role that is associated only with a particular venue. After a successful login, the POS client retrieves relevant system information from an illustrative distributor server 302, which presents the user interface 410.

The illustrative user interface 410 associated with POS client 402 presents colored icons, in which each icon represents one of the authorized mobile devices (such as authorized mobile devices 404 and 406) in the venue 408. Note that the illustrative authorized mobile devices 406 and 408 may also be referred to as "a registered gaming client." By way of example, each icon 418 has a short identifier representing the local identification of the device, which is unique within that venue. For example, a grey icon may identify that the authorized mobile device has been registered with the mobile wagering sub-system; however, the authorized mobile device is not currently available for game play. Another illustrative icon may be a yellow icon, which represents that the authorized mobile device is present and available. A green icon may represent that the authorized mobile device has credit and is involved in a game session. A red icon may represent that a player input has been received that relates to a HELP button input command, a cash input command or a cash output command.

In operation, an illustrative cashier that is interactive with the user interface 410 may select an icon associated with a particular authorized mobile device. After selecting the appropriate authorized mobile device, the cashier may interact with another user interface that enables the cashier to add cash to the authorized mobile device, to enable a player cash-out from the authorized mobile device, to display a log of recent play and transactional activity, which may be retrieved from the illustrative centralized resource server, the distributor server or any combination thereof.

A variety of other user interfaces may also be presented in the point-of-sale device. For example, a user interface may be presented that allows the illustrative cashier to access reports and to log-out from the POS device. For example, a reports screen may be presented that summarizes the business activity of the current day, the previous day or a historical period. The reports may include data regarding cash-in sales (in dollars), awarded prizes (in US Dollars) and net revenue, which is the difference between the cash-in sales and the awarded prizes. The illustrative reports screen may be refreshed in real time or in pseudo real time.

By way of example and not of limitation, a player may interact with the centralized gaming system 100 by purchasing play credits, e.g. funds, at the POS device 402. For example, the illustrative player requests an amount of credit and pays the cashier at POS device 402. Subsequently, a POS session is established with the central database 314 (shown in FIG. 3) when the illustrative distributor server 304 receives a cash-in message from the POS client device 402. The illustrative cash-in message identifies the player account session amount, the identification of the authorized mobile device to which the POS player session amount is linked and the identity of the POS device initiating the transaction. The distributor server 304 acknowledges that POS transaction and provides update information to the specific game client indicating the amount of available at credit. In addition, a player may elect to add credit to an existing player account balance by purchasing such credit from a cashier, who may use a POS ADD CASH function to record the transaction in the server database and update the available credit total.

Figure 5:
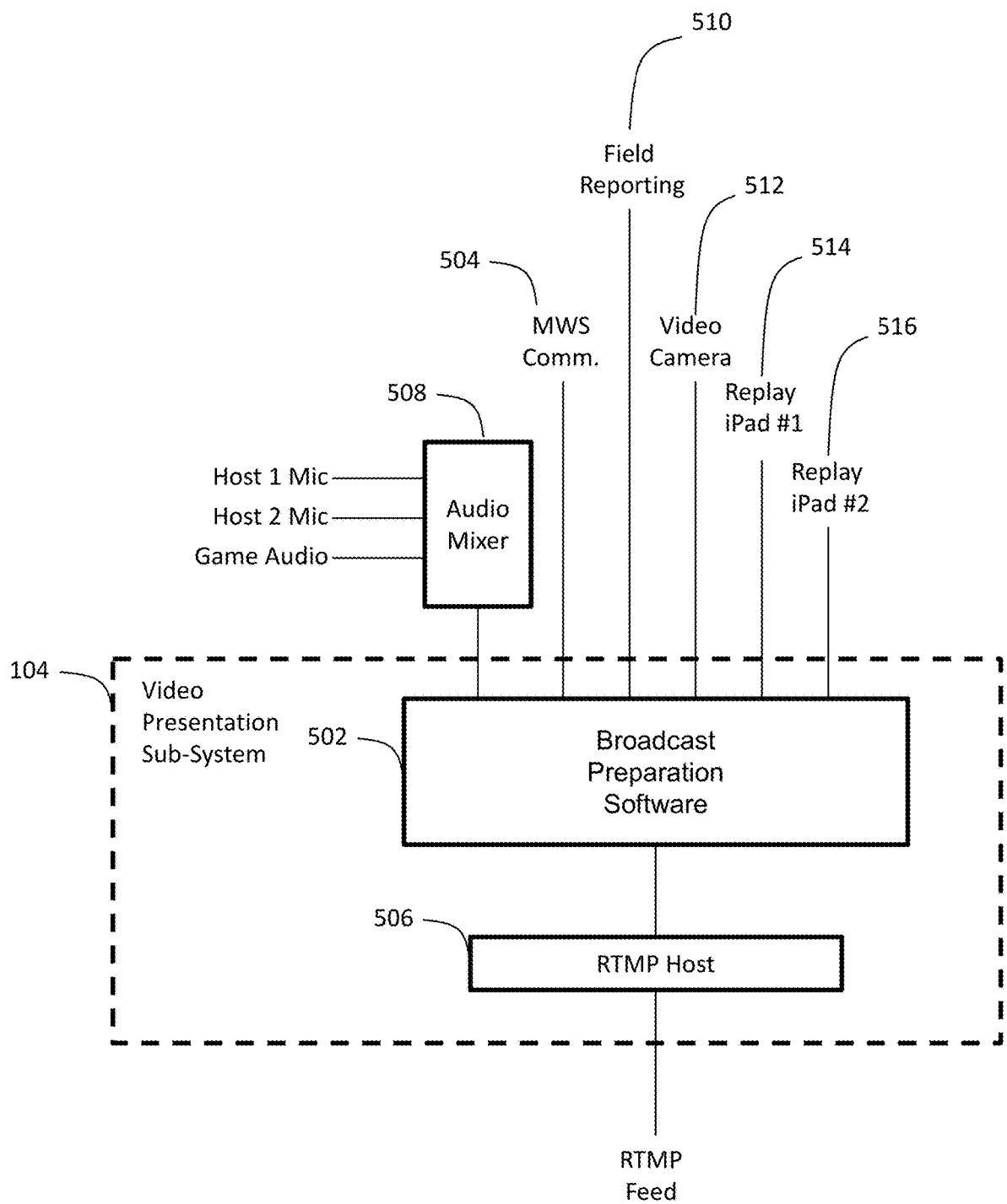
FIG. 5 shows an illustrative Video Presentation System.
Figure 6:
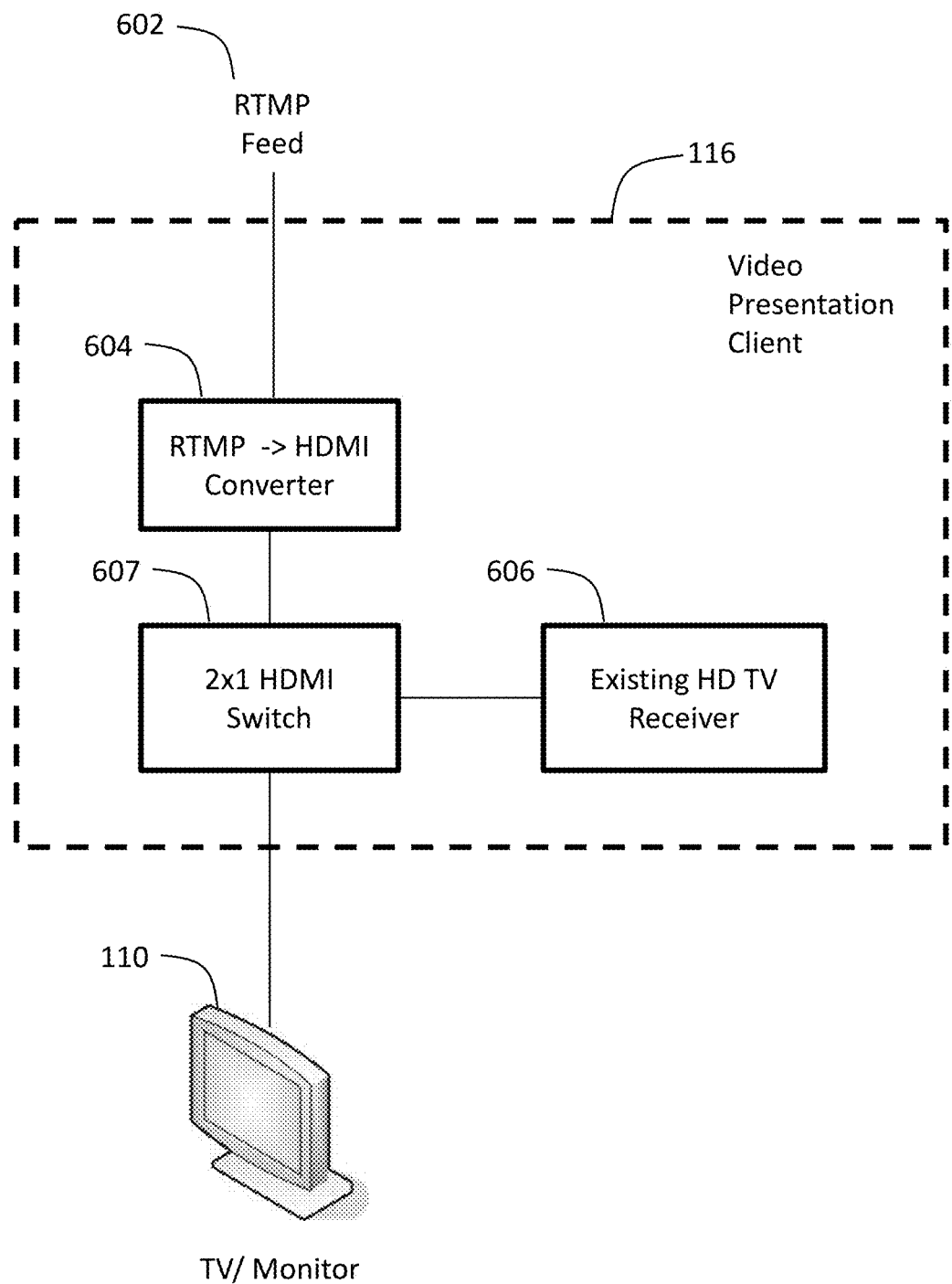
FIG. 6 shows a more detailed view of an illustrative video presentation sub-system (VPS) client.

Referring to FIG. 5, there is shown an illustrative Video Presentation System (VPS). In the illustrative embodiment, the video presentation system (VPS) 104 delivers television content to venues communicatively coupled to the centralized gaming system 100 shown in FIG. 1. The illustrative VPS 104 is communicatively coupled to a VPS client 116, which is also shown in FIG. 6 below.

By way of example and not limitation, the VPS 104 may be associated with linked bingo tournament (LBT) games. This content presented on illustrative monitors 110 (shown in FIG. 1) complements the game experience on the authorized mobile devices 112. Additionally, the content presented on monitors 110 is configured to involve other patrons at participating venues who are not participating in the games. This may create a social gaming environment that may appeal to a broad spectrum of players.

The illustrative VPS 104, shown in FIG. 5, includes a plurality of inputs that the system may incorporate into broadcast content. For example, communications with the MWS 102 may include a data feed generated by the MWS 102, which provides real time data on the status of an illustrative tournament. The illustrative data feed may include player names, player scores, remaining plays for player game sessions, time remaining in the tournament, prize values and other such tournament information.

A broadcast preparation software module 502 is configured to integrate a plurality of inputs into a broadcast data stream. In the illustrative embodiment, the integration is performed by a suite of commercial products such as Open Broadcaster™, Quicktime™ and proprietary software products. The tasks performed by the broadcast preparation software module 502 includes formatting an illustrative mobile wagering sub-system data feed 504. Note, the mobile wagering sub-system data feed 504 is generated by the mobile wagering sub-system 102. The mobile wagering sub-system data feed 504 includes information such as the tournament leader information, which can be converted into an easily readable display format.

For example, the mobile wagering sub-system data feed 504 may be transmitted over the Internet to a Real Time Messaging Protocol (RTMP) host 506, which may then transmit the data signal from the illustrative RTMP host 506 using an RTMP protocol over the Internet to the illustrative VPS client 116.

The broadcast preparation software module 502 may also be configured to interface with an illustrative audio mixer 508, which accepts a variety of audio feeds. The illustrative audio feeds received by the audio mixer 508 include host microphones and audio from selected live game play; a wide variety of such devices are commercially available. Additionally, the broadcast preparation software module 502 is configured to provide live field reporting 510 from game locations using a tool such as Facetime™. Live field reporting 510 may add excitement to the broadcast. Furthermore, the broadcast preparation software module 502 is configured to interface with various video signals that include studio video cameras 512 and live images captured from illustrative authorized mobile device and replayed as feed 514 and feed 516.

Referring to FIG. 6, there is shown a more detailed view of an illustrative video presentation sub-system (VPS) client 116. In the illustrative embodiment, the VPS client 116 is communicatively coupled to the video presentation sub-system 104 via an illustrative wide area network, e.g. Internet, and a local wireless connection, e.g. local Wi-Fi. The illustrative RTMP feed 602, which is generated by the RTMP host 506, is received by the VPS client 116. The VPS client is also operationally coupled to the illustrative stationary monitor 110.

The RTMP feed 602 is received at an illustrative gaming venue and the RTMP feed 602 is routed to the VPS client 116. By way of example and not of limitation, the RTMP feed 602 is communicated using a dedicated and secure Wi-Fi channel. In the illustrative embodiment, the RTMP feed 602 includes a streaming video data steam, which is converted to a video display signal. For example, the RTMP feed may be converted to an HDMI video signal with an RTMP/HDMI converter appliance 604. For example, the RTMP/HDMI appliance 604 may be implemented with special purpose firmware inside an embedded computing element, such as a Raspberry PI™. The resulting video signal generated by the RTMP/HDMI appliance 604 is then sent directly to a compatible television or sent to the television using a commercial 2×1 switch 607, such as the Fosman 8024™, which may also be coupled to an existing HDTV data source such as receiver 606.

The illustrative converted HDMI video signal is then presented the stationary monitor 110. This allows for a variety of installation models. Where there is a television dedicated to use with the VPS the output of the special purpose converter 604 may be left permanently connected to the television 110. If the television is used for different purposes at different times the data feed to the television can be switched on or off with the introduction of the 2×1 HDMI switch 604, allowing normal use of the television when the VPS data feed is not in use.

The centralized gaming system 100 described in FIG. 1 through FIG. 6 supports a variety of different types of games and game play. For the illustrative mobile wagering sub-system 102, a game session is initiated after a wager is received and the game session ends when game play is completed, when a prize is awarded, or according to any other predetermined game mechanic that reflects the game session has ended.

A variety of different game mechanics may be associated with each game session. For example, a tournament game awarding a limited number or prizes may present player rankings for prizes awarded to the ranked players.

The player rankings may then be presented on one or more of the authorized mobile devices 112. Additionally, the player rankings may result in the video presentation sub-system 104 generating a player rankings tournament session output that is presented on the stationary monitors 110.

Figure 7A:
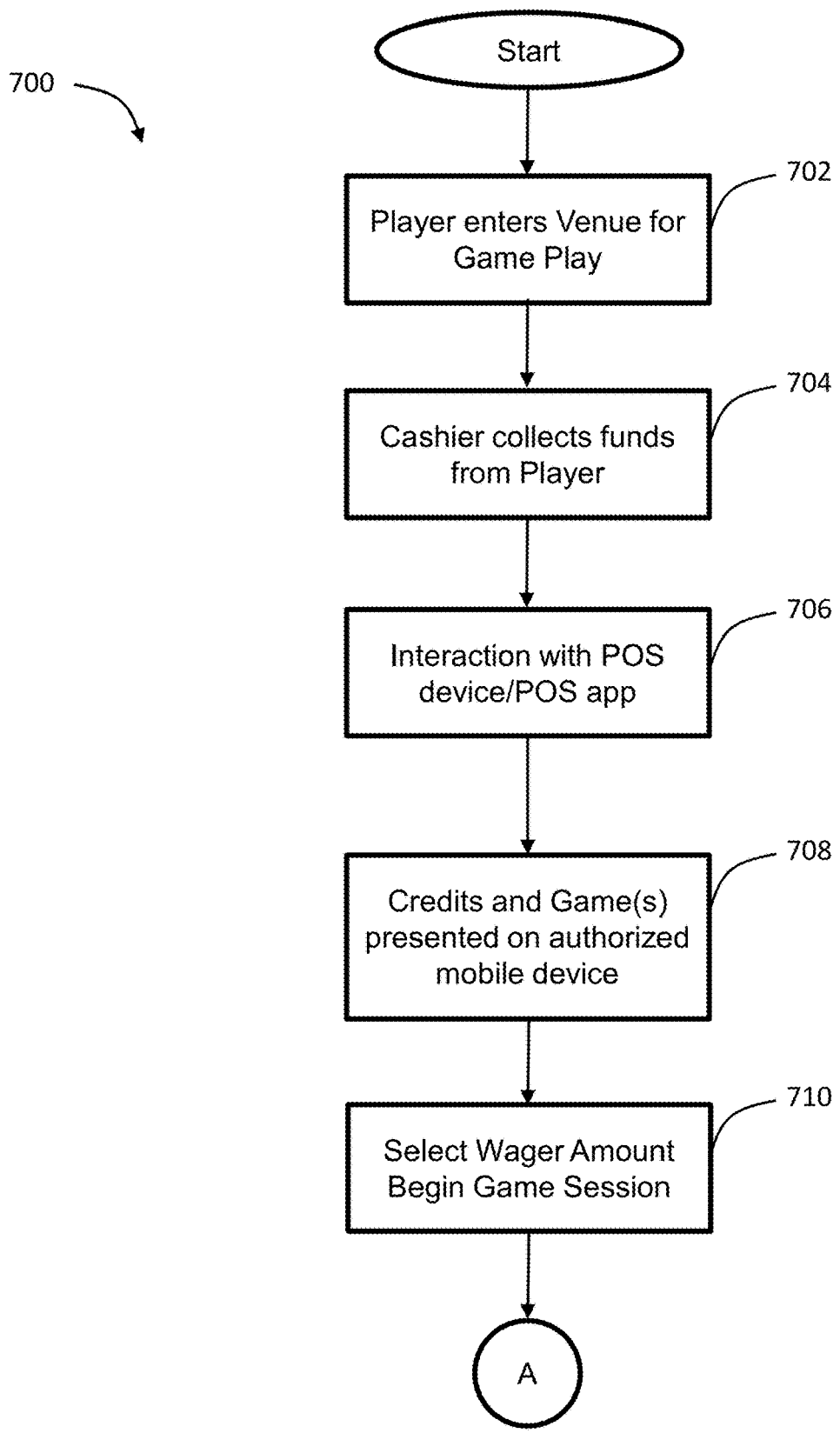
FIGS. 7A and 7B show an illustrative centralized gaming method that describes the various steps performed by a player interacting with the gaming system.
Figure 7B:
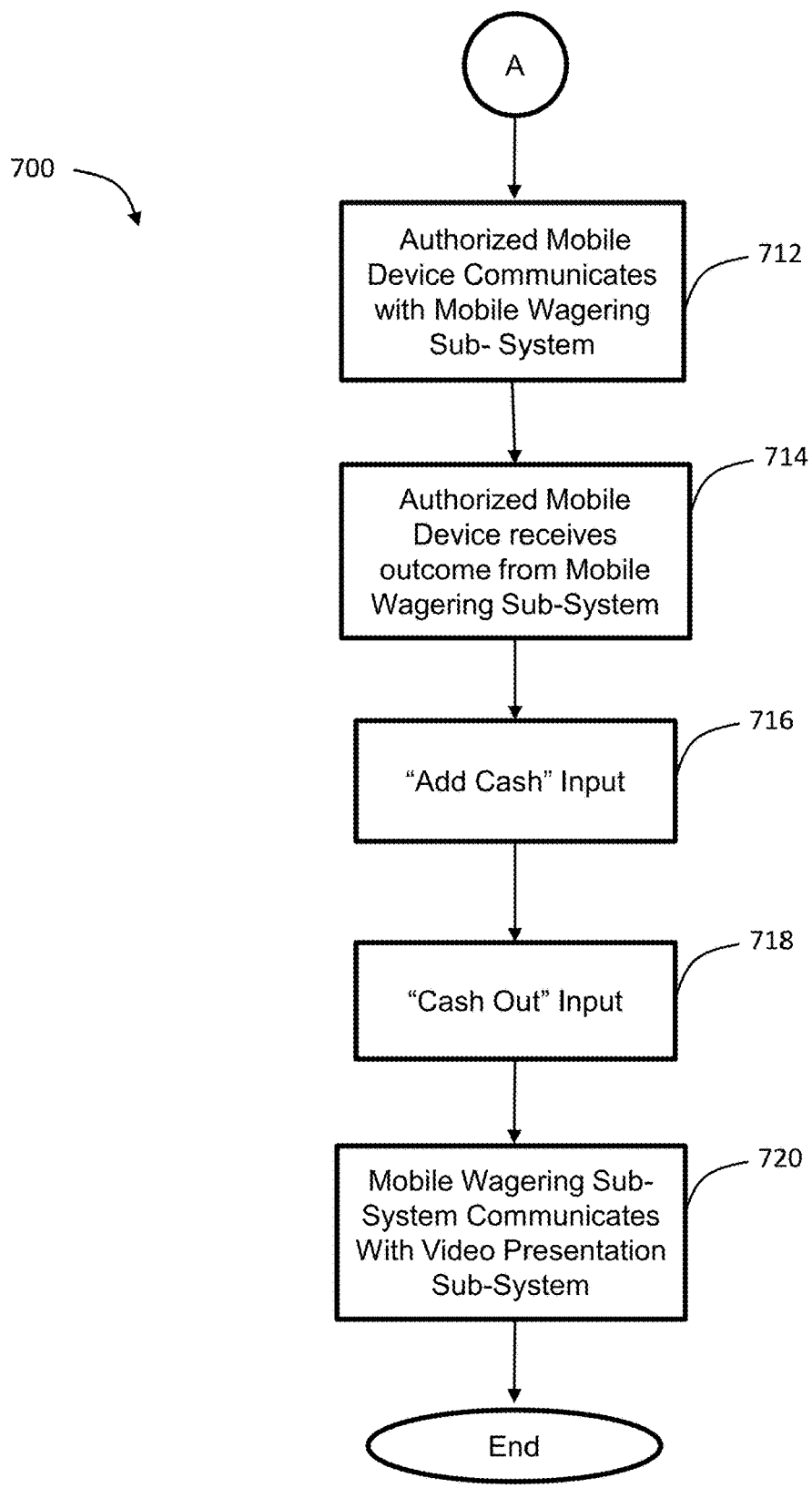

Referring to FIG. 7, there is shown an illustrative centralized gaming method that describes the various steps performed by a player interacting with the gaming system. The illustrative centralized gaming method 700 is at block 702 where an illustrative player enters one of the venues and indicates to the cashier or similar venue employee that the player wants to initiate game play with the centralized gaming system 100. The method then proceeds to block 704 where the illustrative cashier collects monetary funds such as cash, e-money, debit card, credit card and other such monetary funds as are appropriate depending on jurisdictional regulatory requirements.

At block 706, the illustrative cashier then proceeds to interface with a Point-Of Sale (POS) application on a device such as POS device 114. In another embodiment, the player may interface with a kiosk version of the POS device 114 without the need to interact with a venue employee. In yet another embodiment, the POS application may be running on an authorized mobile device 112 and the player may interact directly with the POS application.

While interfacing with the POS device or POS application at block 706, the illustrative cashier identifies the authorized mobile device 112 associated with the player. The illustrative cashier then proceeds to enter the amount of credits to add to the authorized mobile devices. This amount of credits is stored in illustrative central database 314 (shown in FIG. 3).

At block 708, the total credits, which correspond to the collected funds, are presented on the authorized mobile device 112. The player may then interact with a game application running on the authorized mobile device. The player may also select from a variety of different game applications, which may be presented as a menu of games displayed on the authorized mobile device 112 screen. In operation, various game screens corresponding to the chosen game are presented to the player.

At block 710, the player can select a wager amount for a particular game session. In the illustrative embodiment, the wager amount includes the number of credits the player has selected to be wagered. Depending on jurisdictional requirements wager amounts can be expressed in dollars and cents (or other local currency) or in terms of credits, where each unit of credit has a monetary value. By way of example and not of limitation, the player may then initiate a game session by pressing a PLAY button, which is an illustrative game input received by the authorized mobile device 112.

At block 712, a game request is sent from the authorized mobile device 112 to the mobile wagering sub-system 102. The mobile wagering sub-system 102 processes the game request. In the illustrative embodiment, the mobile wagering sub-system 102 determines a prize result and a graphic representation (or representations) of the prize result. Additionally, the mobile wagering sub-system 102 logs the transaction, updates database game information, and updates an accounting module to reflect the amount spent and player winnings corresponding to the game session. Furthermore, the mobile wagering sub-system 102 sends a response message (or messages) to the authorized mobile device specifying the information to be displayed and the new value of the player account.

The method then proceeds to block 714 where the authorized mobile device 112 receives the outcome(s) from the mobile wagering sub-system 102. For example, the authorized mobile device 112 is configured to present animations and other results associated with the game session. The authorized mobile device 112 may also include an updated accounting of total credits and the prize amounts awarded. After the game session is completed, the player can return to the game menu at any time and select a different game to play or can start a new game session for the chosen game type and denomination.

At block 716, the authorized mobile device receives an "Add Cash" input. By way of example, the player decides to add funds to their play amount by providing the "Add Cash" input, which alerts the illustrative cashier that the player wants to add cash to their player account session total. The cashier then proceeds to interact with the POS device 114 or POS App (not shown). The illustrative cashier then proceeds to enter the amount of credits to add to the authorized mobile devices and the credits are stored in the illustrative central database 314.

At block 718, the authorized mobile device receives a "Cash Out" input. For example, when the player has finished a game session and wants to "Cash Out" the player presses a "Cash Out" button on the authorized mobile device 112. In the illustrative embodiment, after the authorized mobile device receives the "Cash Out" input, the illustrative cashier is notified that the player desires to "Cash Out." Using the POS device 114 of the POS App (not shown), the illustrative cashier selects the "Cash Out" input and obtains the total credits remaining on the authorized mobile device after has completed one or more game session. The remaining player account total information is received from the mobile wagering sub-system 102. The cashier pays the player the amount due and confirms the payment at the POS. The client device is then available for use by another player.

The method then proceeds to block 720 where mobile wagering sub-system 102 is configured to communicate with the video presentation sub-system 104. At block 720, the video presentation subsystem 104 receives game play information and integrates it with other data sources as described above. The video presentation sub-system 104 generates a video presentation that is broadcast via a private network to participating gaming venues. As described above a stationary monitor 110 is communicatively coupled to the video presentation sub-system 104 via the video presentation client 116. The stationary monitor client is configured to receive and present the game output generated by the video presentation sub-system. In one illustrative embodiment, the video content is designed to provide enhanced content to the players and to increase the interaction between the players and the games. Additionally, the video content adds interest and excitement to the games. In addition to game-specific content, such as broadcasting a live tournament, the system can be used for a multitude of purposes, including, but not limited to, announcements and pictures on winners, informational videos about sponsoring charities, announcements of new games and upcoming events, advertising, etc.

Figure 8:
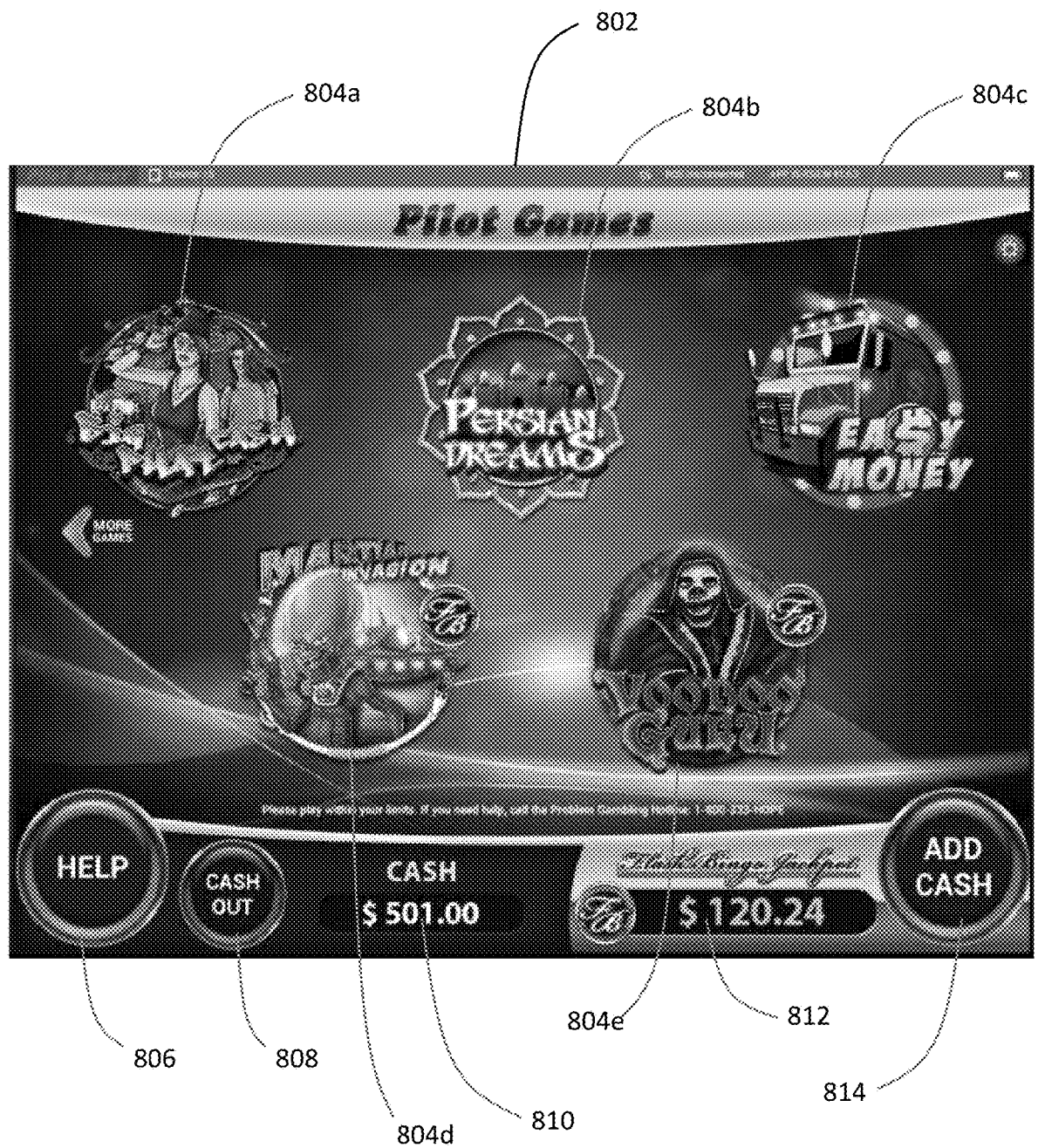
FIG. 8 shows an illustrative menu of games.

Referring to FIG. 8 there is shown an illustrative menu of games. In the illustrative screenshot 802, an array of icons 804*a* through 804*e* representing the menu of available games is presented. The player can then touch one of the game icons before beginning a game session. The game session may differ depending on the class or type of game selected. Types of games that can be supported include electronic pulltabs, bingo, electronic high-speed bingo, electronic high-speed bingo tournaments and other such games of chance. Each game session involves communications with the mobile wagering sub-system 102, which determines the prizes awarded and selects the winners. More detail on individual types of game play is provided below.

The illustrative screenshot 802 also includes a "Help" button 806 which is used to alert the illustrative cashier interacting with the POS device 114 that some assistance is required.

Additionally, the screenshot 802 includes a "Cash Out" button 808, which may initiate a redemption transaction at the POS device 114. A "Cash Out" input is received by the authorized mobile device when a player desires to conclude interacting with the authorized mobile device 112. Alternatively, the illustrative player may go directly to the cashier that interacts with the POS device and player can directly request a "cash-out" from the cashier. The illustrative cashier then proceeds to interact with the POS device (or POS app) by selecting the authorized mobile device 112 that is associated with player. After the POS device receives a cash-out input corresponding to the player's authorized mobile device 112, a cash-out request message is communicated to the appropriate distributor server 304. In the illustrative embodiment, the distributor server 304 communicates to the POS device the player account session balance 810 that is presented on the authorized mobile device. The POS device 114 is configured to receive a POS device cash-out input that confirms the actual amount, credits or funds indicated on the authorized mobile device 114. The POS device cash-out input is then communicated to the appropriate distribution server 304, which then proceeds to communicate that all player interactions with the authorized mobile device have been terminated; and the authorized mobile device displays a player account session balance of $0.00.

The player account balance output 810 is presented as a "cash" balance; however, "cash" is not stored on the authorized mobile device. The "cash" balance presented in the player account session balance output 808 represents credit or monetary value that is available for wagering, depending on jurisdictional requirements. If required, the credits may then be converted to fungible cash or other type of financial proceeds, e.g. chips or tickets, when the player cashes out.

The illustrative screenshot 802 also includes a jackpot value 812, which may correspond to a progressive prize. Progressive prizes are prizes that grow in real time as a function of game play. Some progressive prizes may accumulate prizes within a venue. More generally, progressive prizes accumulate prizes from multiple play locations.

An "Add Cash" button 814 provides an input that triggers a communication to the illustrative POS device 114, which notifies the illustrative cashier that the player accessing the authorized mobile device 112 wants to add credits or funds to the to the authorized mobile device for game play. The process of adding credits or funds to the authorized mobile device is described above.

By way of example and not of limitation, the types of games supported by the centralized gaming system 100 includes include electronic pull-tab games, bingo, electronic high-speed bingo, electronic high-speed bingo tournaments and other such games of chance.

Electronic pull-tab games are finite pool games that comply with jurisdictional rules limiting prize values and restricting types of permissible video animation. Typically, electronic pull-tab games have small finite-pool sizes, low wager denominations and low prize values compared to casino slot machines. Each game/denomination combination is associated with a different pull-tab deck. Electronic pull-tab games include at least one deck that is always open for each available game. Additionally, electronic pull-tab games include a deck serial number which is displayed on the client game screen as well as in an illustrative Game Information Screens. Typical pull-tab games are available in $0.25, $0.50, $1, $2, and $5 denominations. Available denominations and prize limits are generally controlled by jurisdictional regulations. Operators are able to select which games and denominations are active for each venue and to be able to close any deck.

Referring to FIGS. 9A through 9D there is shown a plurality of screen shots for an illustrative electronic pull-tab game. A variety of control buttons provide player inputs that are received by the authorized mobile device 112.

Figure 9A:
FIGS. 9A through 9D shows a plurality of screen shots for illustrative electronic pull-tab games.

The player inputs shown in the FIG. 9A screen shot 900 includes an "Add Cash" control button 902, a "Menu" control button 904, a "Game Info" control button 906, a "Denomination" amount control button 908, a "Cash" credit counter 910, a "Win" credit counter 912, a "Play" control button 914.

More specifically, the "Add Cash" control button 902 is associated with a player input that allows the player to signal to the POS device 114 that the player wants to add more cash to the player account session. The "Menu" control button 602 allows the player to return to the game selection menu screen. The "Game Info" control button 906 provides access to screens which define prizes and rules of play. The "Denomination" amount control button 908 displays the current denomination and repeated presses of the Denomination amount control button may change the displayed denomination and cause the game to switch to a different finite pool. The "Cash" credit counter 910 displays the available cash credit balance that is available for game play. The "Win" credit counter 912 displays the amount won in the prior game session. For the illustrative pull-tab game, the "Play" control button 914 initiates a game session.

Figure 9B:
Figure 9B:

Referring now to FIG. 9B there are shown two screen shots associated with an illustrative game session. Screen shot 920 shows an unrevealed state corresponding to the pull-tab game before the authorized mobile device receives the "Play" game input. After receiving the "Play" game input, the illustrative game session is initiated and then the pull-tab game outcome is presented in a fully-revealed state as shown in screen shot 922.

As stated throughout, the mobile wagering sub-system 102 determines the outcome that is presented in the fully-revealed state presented in screen shot 922.

The pull-tab games presented herein include an auto-close option that may be selected by the operator, for any game played at a particular venue. The auto-close option automatically replaces a finite game pool with a new pool when all prizes exceeding a predetermined value for the deck have been exhausted and the game may no longer be desirable by players. When the auto-close option is turned "ON," a deck may automatically close and be replaced by a new deck when prizes over a game specific value set in the portal are gone. For example, a game may have 3 large value prizes and when the last prize is awarded, the deck may close and a new deck may open. By way of example and not of limitation, the auto close option is identified in the client game information when it is active, so players may know that it is active. A notification may also be given to all active clients when a new deck is open. This feature is attractive to players because they are always assured that there are always some valuable prizes remaining in a deck they may be playing.

There are a variety of other game features for the illustrative pull-tab games that include providing a reveal mechanism that displays the symbols in portions of the screen to create player anticipation. Another game feature includes background music that is unique to the game theme. Another game feature may include a sound that is triggered when each symbol is revealed; and the sound may be different for each game. A further game feature includes a prize rollup sound which is common to all games. Yet another game feature includes a celebration sound on all big wins. Additionally, game features may include a change in music during bonus rounds. Another game feature may include a prize rollup on the base game screen after a bonus round. A still further game feature may include symbols that slide in from the side or other such animated presentation. Yet another game feature includes game specific math that complies with jurisdictional Rules and Statutes.

Figure 9C:
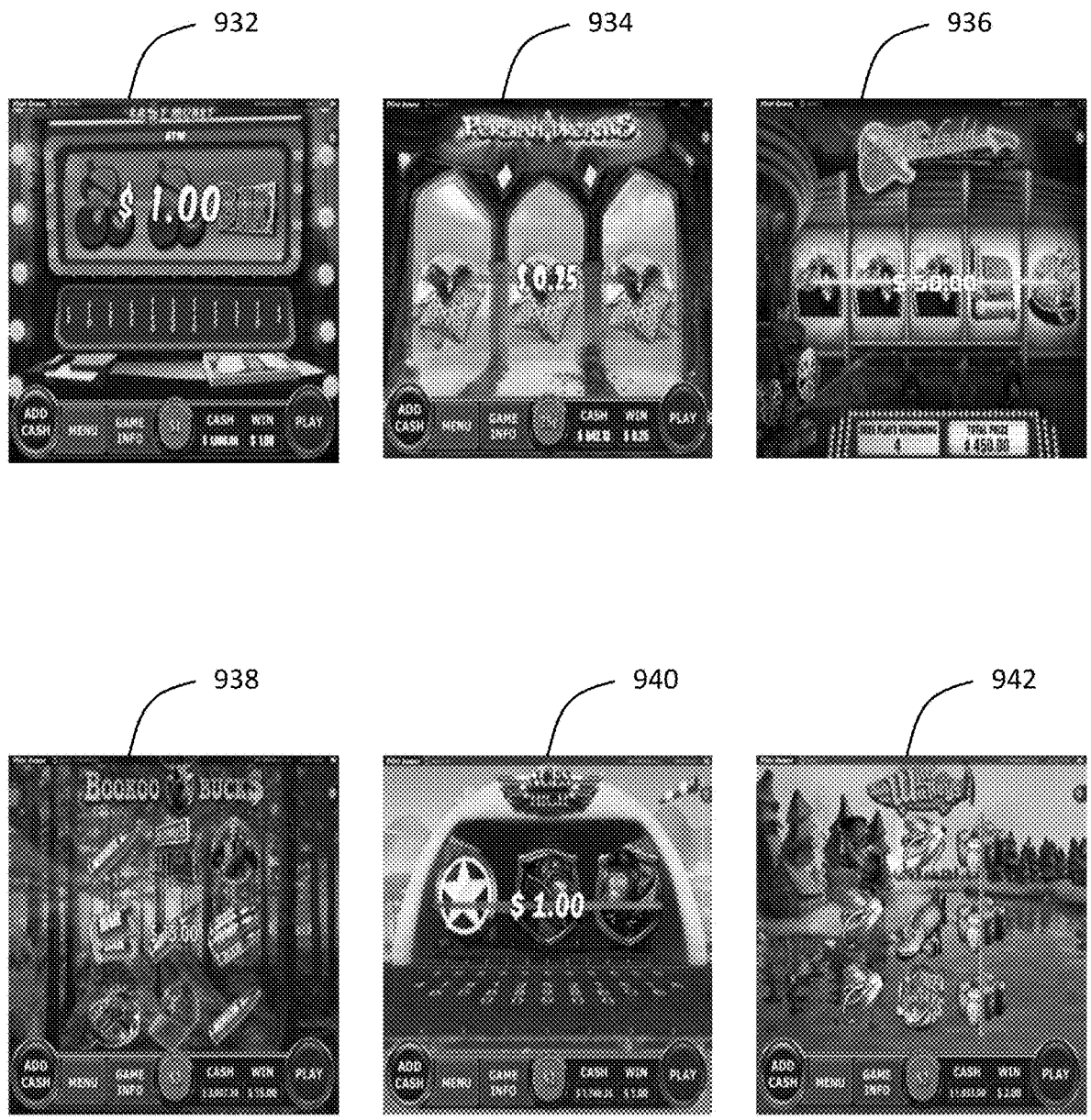

Referring to FIG. 9C there is shown some illustrative screenshots of electronic pull-tab games that include EA$Y MONEY™ 932, PERSIAN DREAMS™ 934, ROCK'N'GOLD™ 936, BOOKOO BUCK$™ 940, ACES HIGH™ 942 and WILD WALLEYE™ 944. Other titles include ANCIENT PHARAOH™, BIG PHAT CASH™ and VEGAS VEGAS™.

Figure 9D:
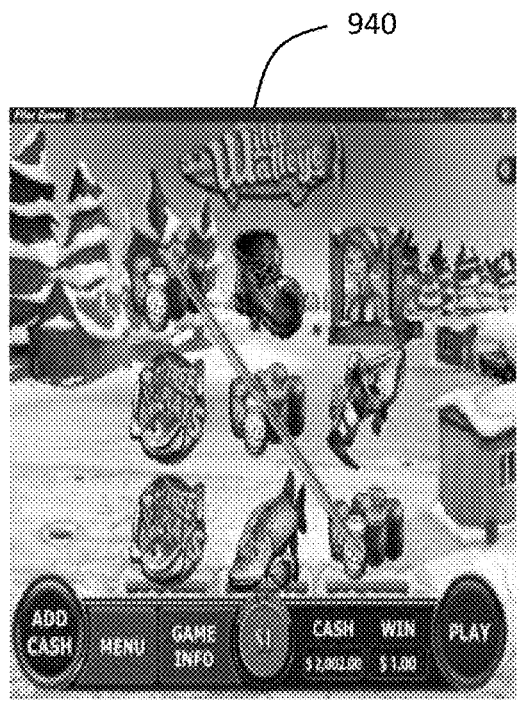
Figure 9D:
Figure 9D:
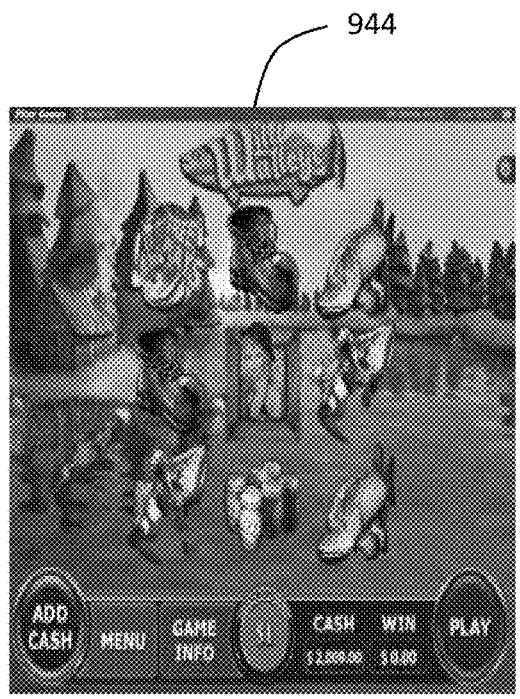
Figure 9D:
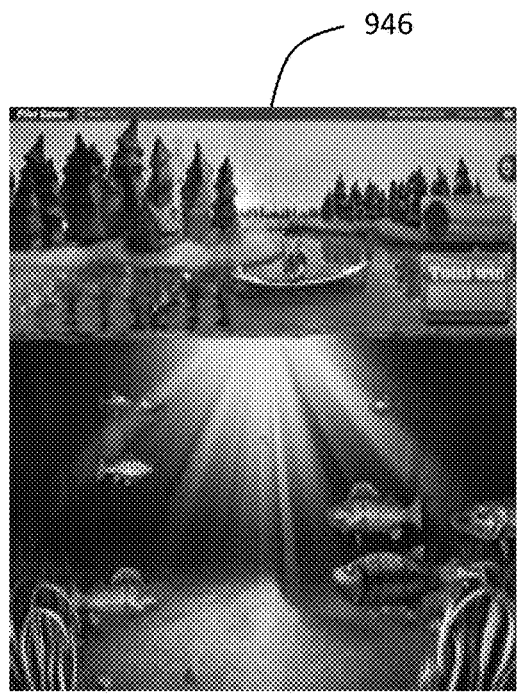

Referring to FIG. 9D there is shown some illustrative screenshots that changes the background graphics based on seasonal changes in the weather. For example, in the illustrative WILD WALLEYE™ shown in FIG. 9D, the graphic background presentation changes based on the seasonal changes in the calendar. Screenshots 940 and 942 present background graphics associated with a calendar period between November 1 and April 1, which depict ice-fishing graphics. Screenshots 944 and 946 are associated with the remainder of the year, and the graphics reflect summer boat fishing.

Figure 10B:
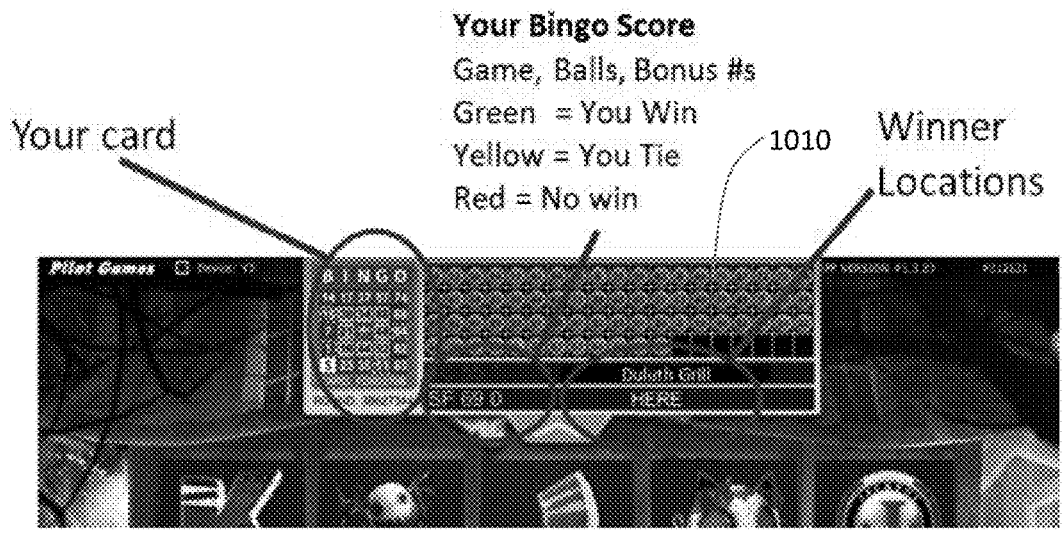
FIG. 10B shows further detail of the results summary line.
Figure 10A:
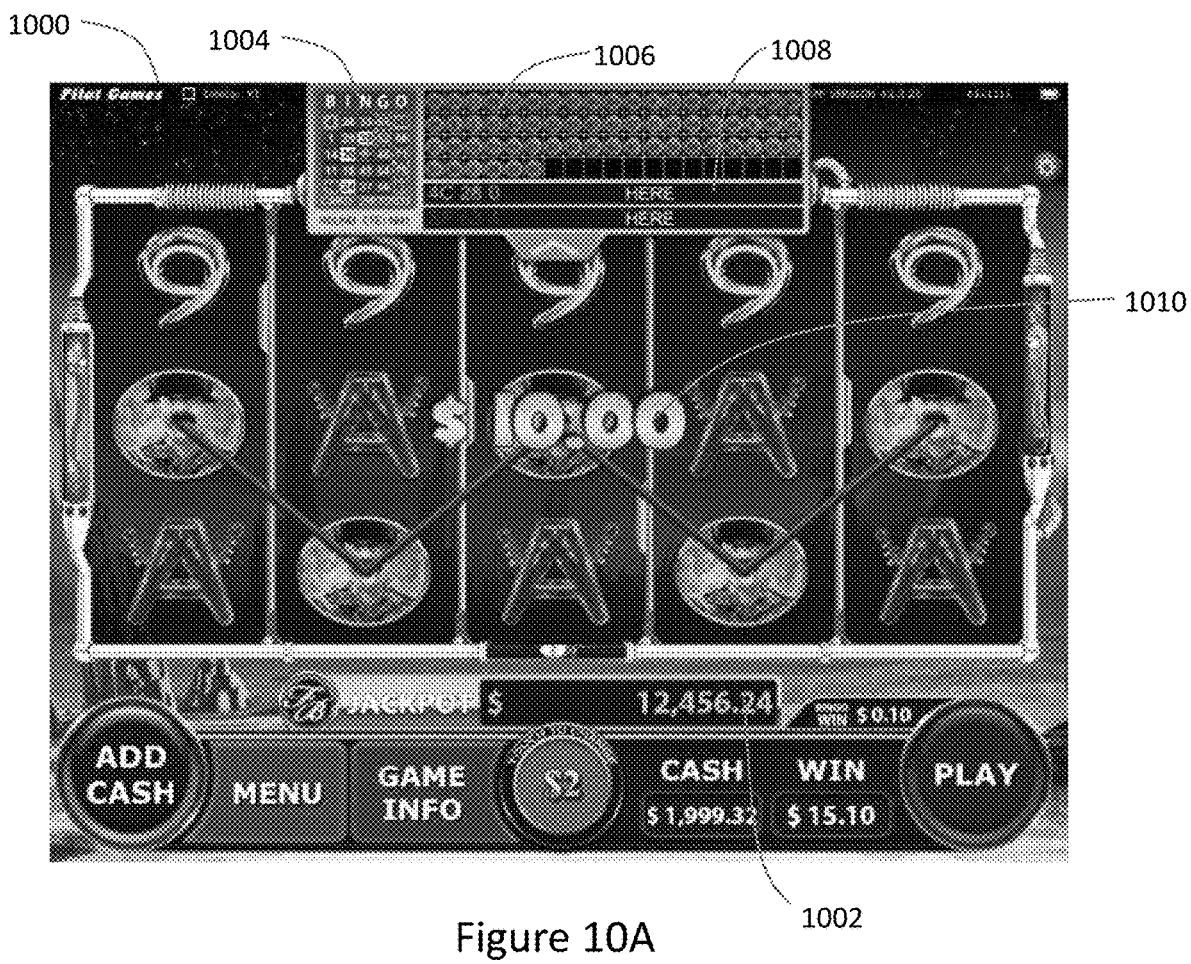
FIG. 10A shows a screenshot of an illustrative high-speed bingo game.

Referring to FIG. 10A there is shown screenshot of an illustrative high-speed bingo game. The screen shot 1000 is for an illustrative high-speed bingo game that may be referred to as FLASH BINGO™. The panel displayed on the game screen is similar to the one displayed for the pull-tab games, with the addition of a Jackpot Display 1002, which presents the current value of a progressive game jackpot. In the illustrative embodiment, the jackpot size increases every play for the bingo game by a percentage of the wager amount; the percentage may be set as one of the portal control functions.

Additionally, the screenshot includes an image of a bingo card 1004 that is assigned to the player by the mobile wagering sub-system 102. The illustrative bingo card 1004 includes twenty-four (24) numbers, a free space in the middle and four (4) randomly located bonus squares. The panel also has a space for displaying ball draw results 1006 from a set of 75 bingo numbers. Additionally, the panel includes a results display area 1008 for displaying bingo game results. The largest portion of the illustrative screenshot 1000 includes an entertainment display which is animated and displays the results of the bingo game in an entertaining format. In the embodiment shown the entertainment display portion includes a symbol matrix display 1010, where matching sets of symbols are used to equate to prize values generated from the bingo game.

The illustrative high-speed bingo game is played between players across the network who desire to play the game at approximately the same time. The illustrative high-speed bingo game is played by having the authorized mobile device 112 communicate with the mobile wagering sub-system 102, and the results generated by the mobile wagering sub-system 102 are communicated to the authorized mobile device 112, which presents the bingo game results in an entertaining manner that awards a prized that matches the bingo win.

In the illustrative embodiment, the high-speed bingo game includes two winning patterns, a Four Corner pattern, which is won by the first player (or players) to get all four corners of their bingo card called, and a Small Frame, which is won by the first player (or players) to complete the set of eight squares surrounding the center square. The illustrative game session for a high-speed game is initiated when a player touches the PLAY button to initiate the game session. The next game event includes having the bingo display area 1006 "drop down" and shows a blank bingo card and draw. A message is sent to the mobile wagering sub-system 102 requesting the initiation of a game session. The mobile wagering sub-system 102 determines if other players have made a similar request. If no other player is found in a specified time period, then the initial play request is aborted and the cash balance in the player account is refunded the play amount.

If at least one other player is found within a specified wait time, then a bingo card is assigned to each player and the game is played rapidly by the mobile wagering sub-system 102. As an example, the total time for the MWS to process the wager may be under one second. The mobile wagering sub-system 102 then sends game information and results to each participating client. The game information broadcast by the mobile wagering sub-system 102 may include bingo card numbers, the location of bonus squares, color coded ball draw results (green for completion of the Four Corner (4C) game and blue for completion of the Small Frame (SF) game), results summary lines, prize value for each authorized mobile device and other such bingo game information.

Referring to FIG. 10A, the illustrative mobile application running on the authorized mobile device 112 displays the bingo card and bonus squares. Additionally, the illustrative mobile application displays the ball draw in sequence and indicates squares on the bingo card image that have been called. The authorized mobile device also displays the results summary line 1008, which shows the results of the illustrative four corner competition and the status of the small frame competition.

Referring to FIG. 10B there is shown further detail of the results summary line. By way of example and not of limitation, the results summary line 1010 includes a) an abbreviation for the pattern type (4C or SF). Additionally, the results summary line 1010 includes b) the number of balls that it took to win the pattern. Furthermore, the summary results line 1010 includes c) the number of bonus squares that were in the winning pattern and the venue name(s) of all the participants(s). Note that fields a, b, c are color coded. Green means that this player was a winner. Red means that another player was the winner and yellow means that the player was tied with another player or players for the win.

The illustrative authorized mobile device 112 includes a touch sensitive display with visual elements that can be pulled or retracted or retracted from the touch sensitive display. For example, a tab may be "up" and not visible as it moves down during the game session to enable the player to see the bingo play and then automatically moves upwards and out of sight when the entertainment display begins. If the player touched the tab to "pull down" the display it may remain down during all phases of the play cycle.

In one example of the Flash Bingo game called Martian Invasion, the prize structure includes prizes for being the first card to complete a winning pattern such as a four (4) Corner Winner may receive 2.5% of the total wagered on the game by all participants and the Small Frame winner may receive 2.5% of the total wagered on the game by all participants. The illustrative Martian Invasion $2 theme may also have bonus prizes as follows:

| Number of Balls | Bonus squares in the winning pattern | Prize |
|---|---|---|
| 4 Corner Bonus prizes (all winners of the 4-corner game are eligible) | | |
| 5-10 | 1 | $200.00 |
| 5-10 | 0 | $150.00 |
| 11-15 | 1 | $100.00 |
| 11-15 | 0 | $ 70.00 |
| 16-20 | 1 | $ 50.00 |
| 16-20 | 0 | $ 40.00 |
| 21-30 | 1 | $ 25.00 |
| 21-30 | 0 | $ 15.00 |
| 31-35 | 0 | $ 10.00 |
| 36-40 | 0 | $  6.00 |
| 41-45 | 0 | $  3.00 |
| 46-75 | 0 | $  1.00 |
| Small Frame Bonus Prizes (all winners of the Small Frame game are eligible) | | |
| 8-35 | 1 | $260.00 |
| 8-35 | 0 | $500.00 |
| 36-40 | 1 | $ 75.00 |
| 36-40 | 0 | $ 98.00 |
| 41-50 | 0 | $ 24.00 |
| 51-55 | 0 | $ 11.00 |
| 56 or more | | No Bonus Prizes |

Progressive prizes may also be associated with high-speed bingo game presented in FIG. 10. All players playing the same denomination, regardless of the Flash Bingo game theme chosen, participate in the same progressive jackpot game, with the same contribution percentage and the same probability of winning that prize. For example, the probability of winning that prize, which occurs when the 4-corner pattern is covered in 4 balls, is 0.00000082, or odds of 1 in 1,215,450. The game provider may provide a jackpot seed amount, and the jackpot may accumulate based on a percentage contribution from all Flash Bingo play. Although all players playing the same denomination contribute to and are competing for the same progressive jackpot prize, bingo games are specific to a particular game theme, so a player that has selected one game theme may only compete with another player or players who select that same theme. For example, the progressive jackpot for the $2 game denomination may have an initial prize of $5,000, or more. Player contributions may be set to 2%.

Figure 11A:
FIG. 11A shows an illustrative lobby with an icon labeled "MegaSota Game Nite," which identifies access to a Linked Bingo Tournament (LBT).

Referring to FIG. 11A there is shown an illustrative lobby with an icon labeled "MegaSota Game Nite," which identifies access to a Linked Bingo Tournament (LBT). The MegaSota icon 1102 identifies the data and time of the next scheduled tournament. If the next scheduled tournament is close, then the timer may perform a count-down to the actual game start.

A Linked Bingo Tournament (LBT) is a variation of high-speed electronic bingo, in which players win prizes based on a series of bingo games played against other players for prize points during a predetermined interval. In the illustrative linked bingo tournament (LBT), players are charged a fee to enter the tournament. Similarly, to the high-speed bingo game described above, all bingo games in the tournament are played against other tournament players. In the LBT bingo game winners are awarded points, instead of cash. At the end of the predefined tournament play period, cash prizes are given out to the players that have achieved the highest and/or lowest point scores during the course of the tournament. A pre-determined percent of the entry fees may be allocated for prizes to players.

In the illustrative embodiment, the linked bingo tournament (LBT) sessions are held on scheduled days of the week at specific times. For example, Tuesday evenings between 7:00 and 9:00 may be the schedule time slot for the LBT sessions. Using the Tuesday example, LBT games could begin at 7:00, 7:30, 8:00 and 8:30. The dates and times are scheduled using portal functions that create schedule files in the database of the central system and may be changed from time to time. Notifications of upcoming LBT times may be given to players on their game client devices.

Figure 11B:
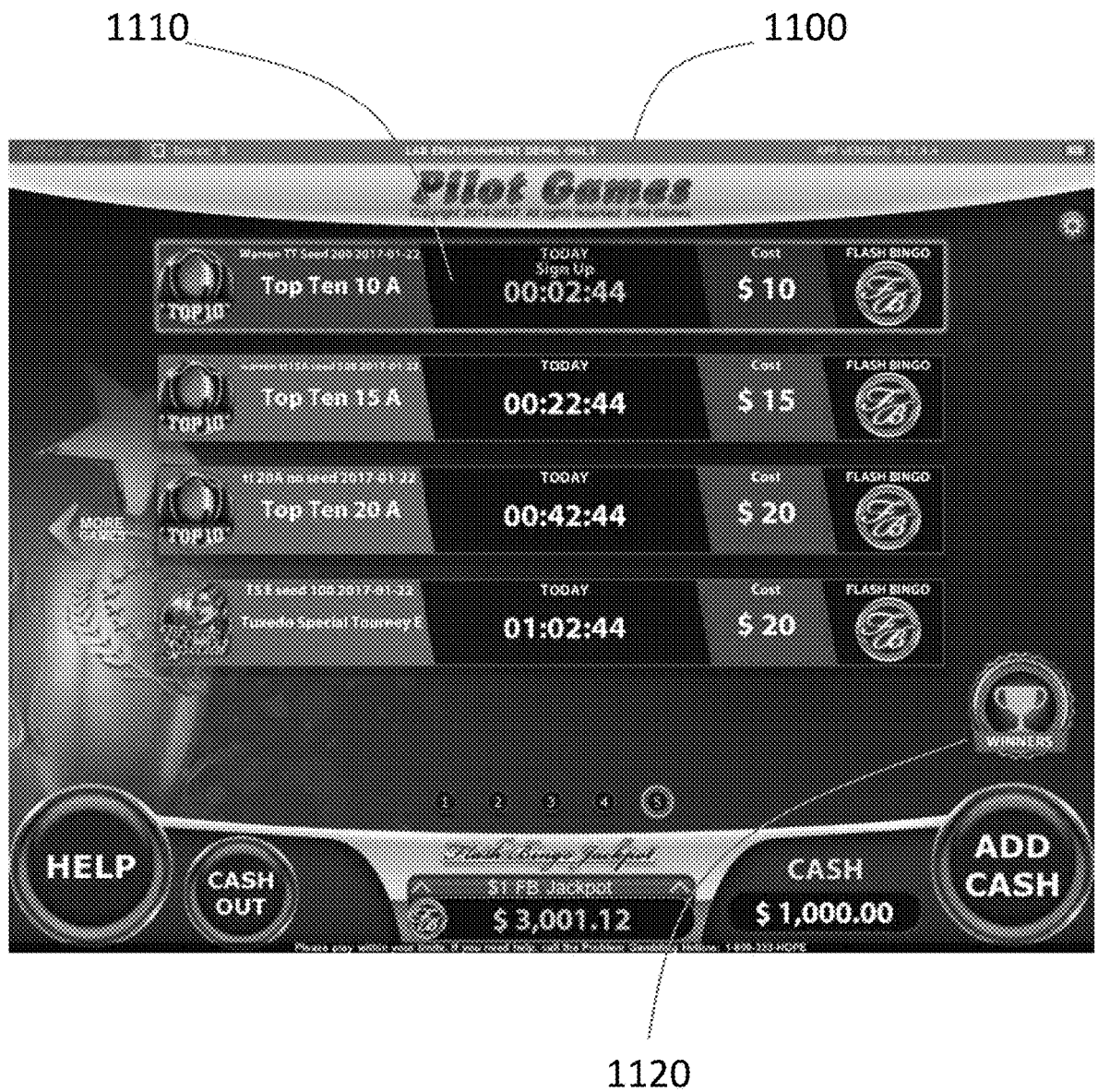
FIG. 11B shows the schedule of tournaments presented to the player that correspond to the MegaSota Game in FIG. 11.

With reference to FIG. 11A, when a player touches the LBT icon, labeled MegaSota Game Nite 1102 in the illustrative example, the schedule of games shown in FIG. 11B may be shown to the player. This schedule may be available at all participating venues on all enabled devices. Players can participate in a common game experience across a wide geography. In one example, participating venues can be located all across the state of Minnesota, so many participants may be able to compete in real-time.

With reference to FIG. 11B, a player may select a scheduled tournament. The menu item shows the date and time that the LBT is scheduled for. If the LBT is scheduled in the current business day, then the time is shown in the form of a countdown. If the LBT is in the pre-scheduled enroll period, then the color of the time changes. The menu description also includes a name for the LBT, the name of the game theme being played, and the cost of entry. Another item on the LBT Menu screen is the WINNERS icon 1020.

Figure 12:
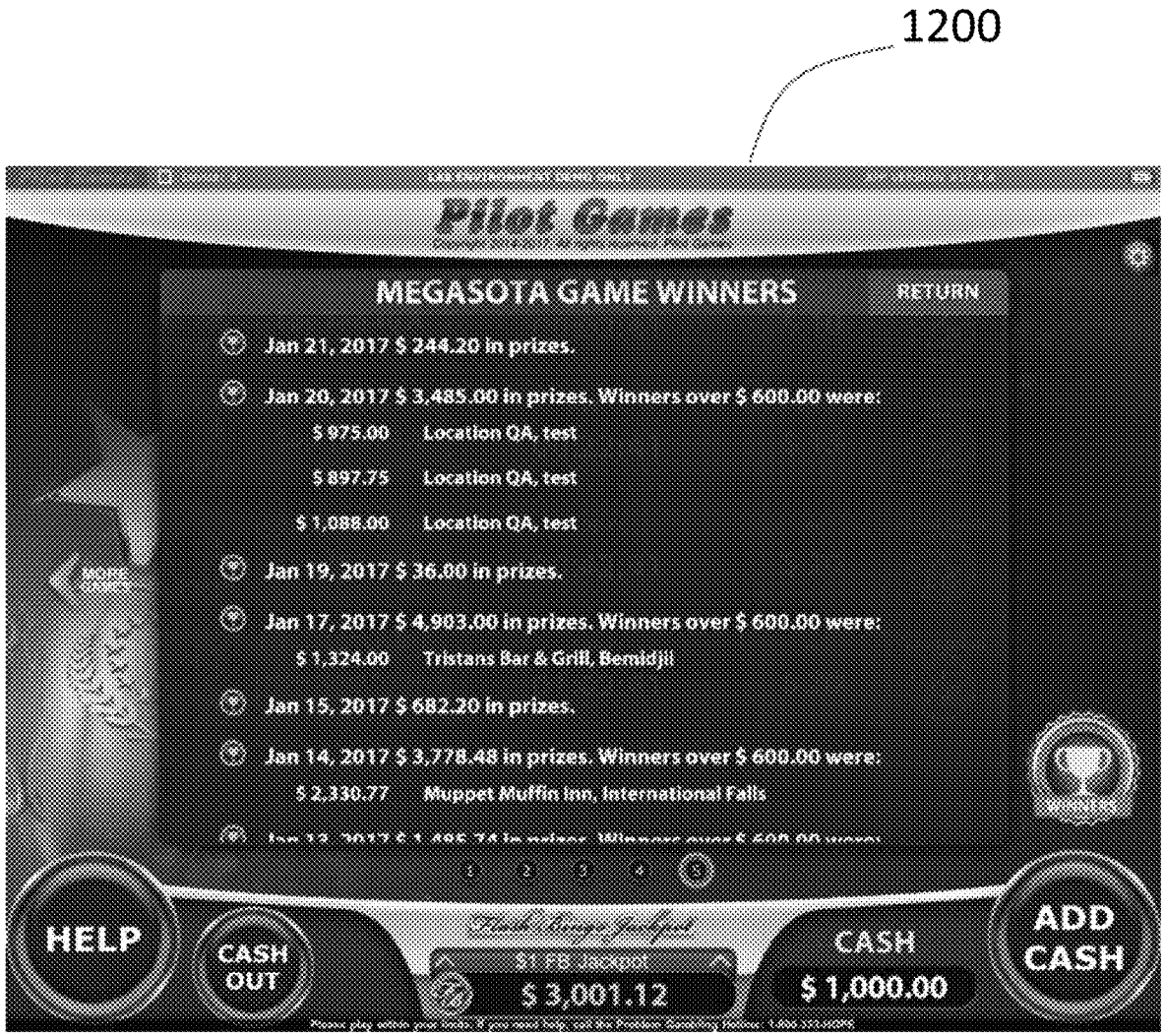
FIG. 12 shows a list of recent tournament recent tournament winners associated with a linked bingo tournament (LBT).

Touching the Winner icon brings up a list of recent tournament winners as shown in FIG. 12. This may include LBTs and/or Bingo games.

Figure 13:
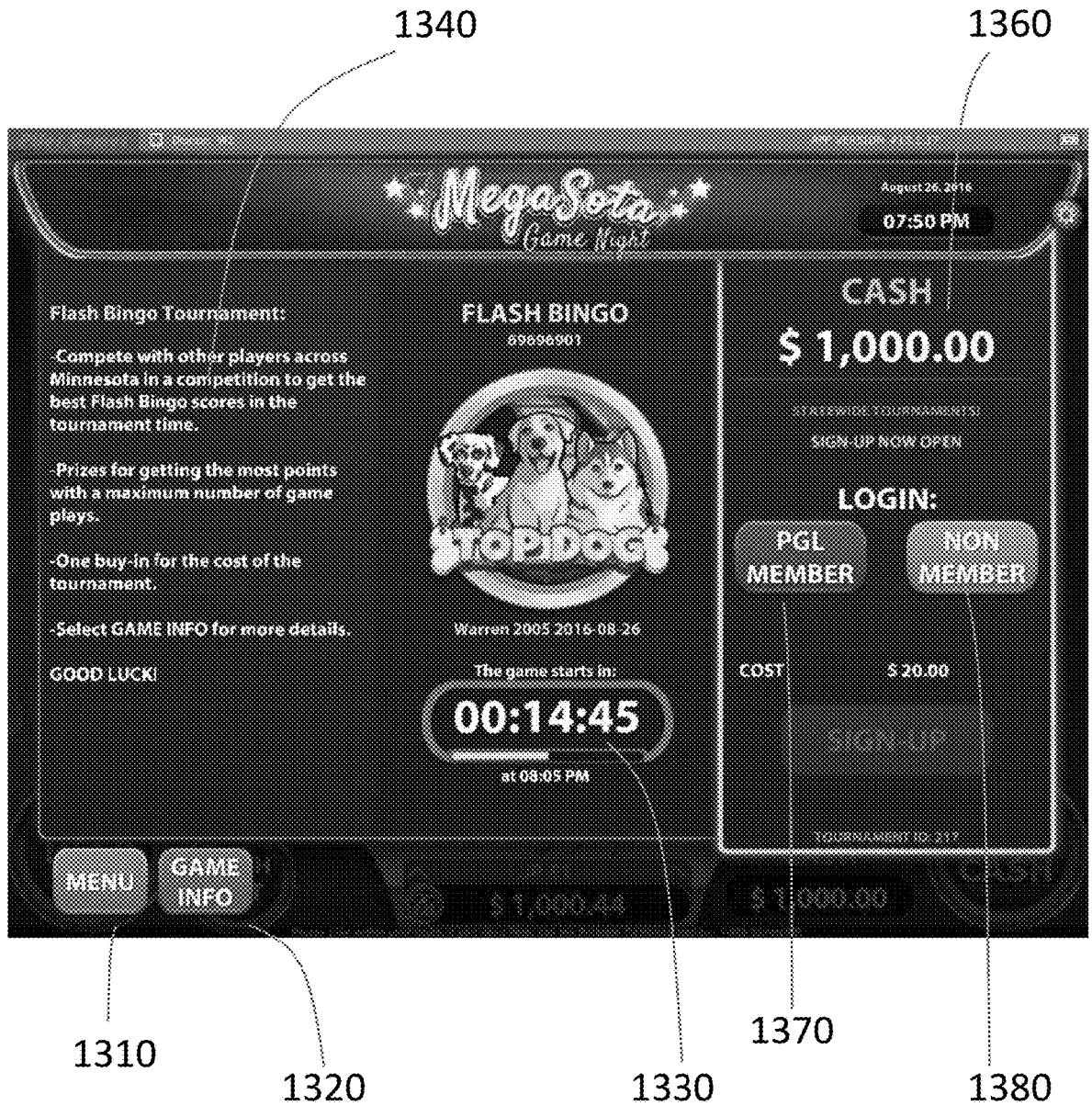
FIG. 13 shows a login screen.
Figure 14:
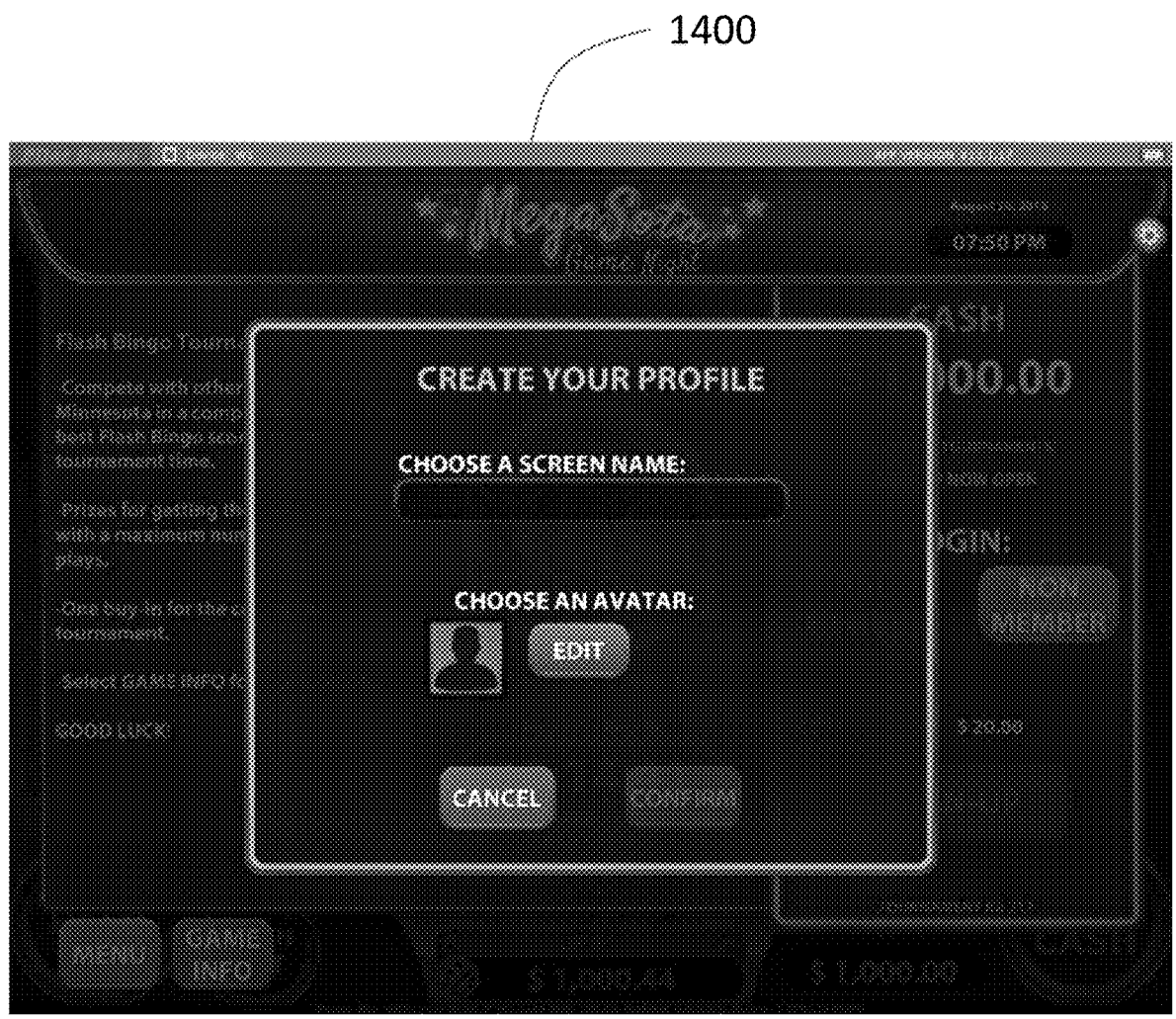
FIG. 14 shows a screen where a player chooses a screen name for a tournament.
Figure 15:
FIG. 15 shows an avatar selection screen.
Figure 16:
FIG. 16 shows a sign-up screen for a linked bingo tournament.

When the player selects a menu item 1110 as shown on FIG. 11B, the player is presented with the enrollment screen shown in FIG. 13. More specifically, FIG. 13 includes a Menu button 1310 that allows the player to return to the tournament menu screen. The Game Info button 1320 takes the player to descriptive information describing the play of the electronic high-speed bingo game, the points that can be won, rules for play, and the prizes available for final point score rankings. The screen also may have alternative buttons for logging in as a member of a group (PGL) or as an unaffiliated player (Non PGL). In either case, the player may be taken to a player profile screen as shown in FIG. 14. The player may be asked to enter a screen name, using an iOS or Android pop-up keypad and also to use the Edit button to bring up the avatar selection screen illustrated in FIG. 15. With reference to FIG. 16 once the player has selected an avatar and screen name they may be presented with the opportunity to sign up for the LBT using the SIGN UP button 1610 as shown in FIG. 16. In addition to those requirements the LBT must be in its pre-scheduled enrollment period and the player must have enough cash in his player account as shown on the screen 1620.

Figure 17:
FIG. 17 shows a successful sign-up screenshot.

When the player sign-up is successful FIG. 17 may be shown until the tournament starts. In one implementation the player may leave this screen using the Menu button and play other games, such as electronic pulltab games or Flash Bingo games until the tournament starts. If a player is enrolled in an upcoming tournament and is playing another game a special icon may appear on those games, similar to the one shown as 1720. Touching that icon may bring the player back to the tournament.

Figure 18:
FIG. 18 shows a tournament start screenshot.

The screen shown in FIG. 18 may show when the tournament starts. It shows the number of players in the tournament in all venues 1830, and also shows the total revenue 1820 which may determine prizes which may be a percentage of the LBT revenue. The Play button 1810 may take the player to the tournament game screen.

Figure 19:
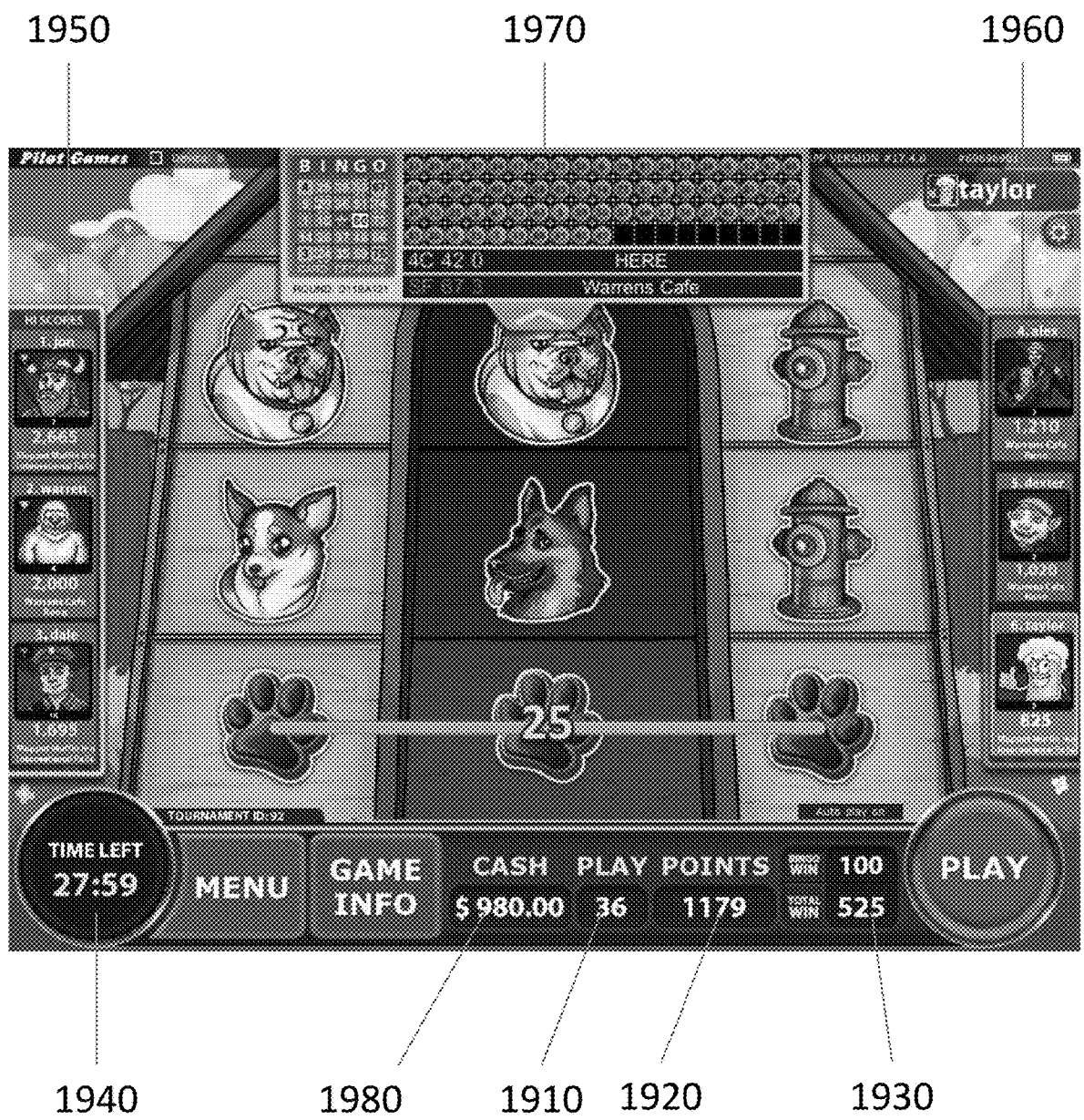
FIG. 19 shows an illustrative screenshot for an LBT game called Top Dogs.

FIG. 19 is an illustrative LBT game screen. It is a game them called Top Dogs, but many game themes are possible. As with Flash Bingo all prize wins are determined by the result of a high-speed electronic bingo game 1970. In the case of the LBT the prizes are expressed in points. After the bingo game is complete the screen may be animated with symbols and the final position of the symbols may have values that add up to the total points awarded in the bingo game. The graphic entertainment is intended to make the game more interesting and entertaining for the player. The play count 1910 shows the number of plays left that the player has which decrements with each play from the starting point which is a predefined play total that is determined when the tournament is scheduled. The Points meter 1920 shows the total point accumulated by the player in the tournament. The Win meters 1930 show the points won by winning the bingo patterns and by winning bonus points. The clock 1940 show tournament time left and ticks downward from the starting value which is the pre-scheduled length of the tournament. On the left and right side of the screen are sets of screen names. Points, avatars and locations 1950 and 1960. These are a critical element in establishing the social nature of the competition. They give the screen names of the players of who they are playing against and where they are. The icons on the left 1950 are the 3 highest point earners. If the player on the device is not one of the top 3 point getters then the players position may be shown in the 3 icons on the right 1960, which may show the player's position and the players nearest to him or her.

Figure 20A:
FIGS. 20A and 20B show tournament play screenshots, in which all players have completed their allotted number of plays or the tournament time expires.
Figure 20B:

Tournament play continues until all players have completed their allotted number of pays or the tournament time expires, at which time a screen appears as shown in FIG. 20A. More specifically, FIG. 20A provides a screenshot 2000 associated with having completed the player's rounds and an instruction to wait until the end of the tournament to obtain the tournament results. FIG. 20B provides an illustrative screenshot 2002 that the tournament has ended that the player has been awarded a prize.

A special provision may be made to cover the case where a player is trying to play a game and cannot complete it because bingo requires a competitor, and all other players may have completed their allotted games. In one illustrative embodiment, the player in that condition receives a predetermined allotment of points.

Figure 21:
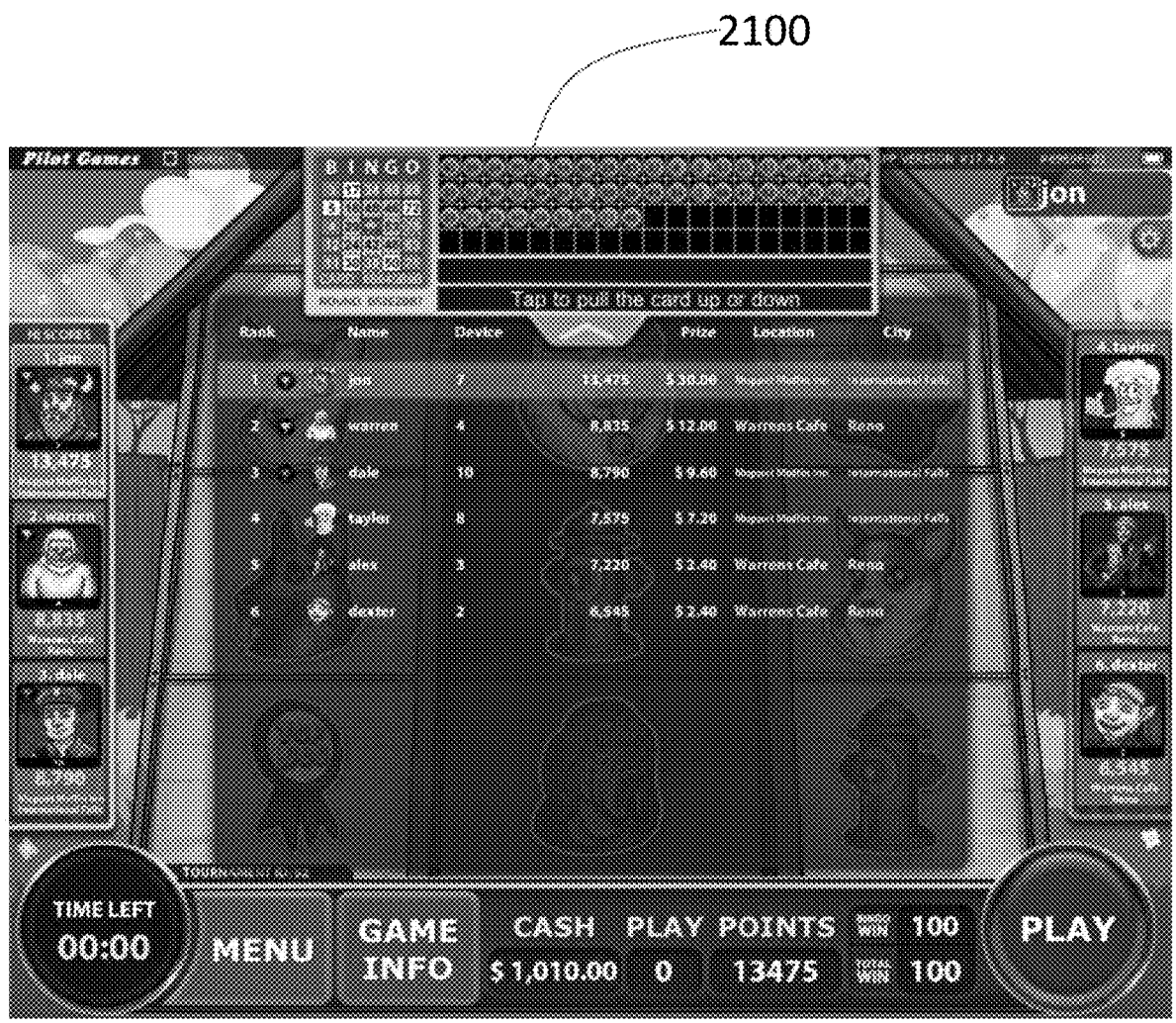
FIG. 21 shows a summary screenshot of players who won prizes.

FIG. 21 illustrates an implementation of a final screenshot 2100 showing all participating players a summary of all players who won prizes, including their screen name, point totals, prizes won, and location. For example, the top prize winner is "Jon," and Jon was playing at the Muppet Muffin Inn where he achieved 13,425 points in tournament play and won a prize of $30.00.

If the player interacting with the authorized mobile device 112 is a winner, the prize amount may normally be added to the players Cash, unless jurisdictional or IRS rules require special handling. After the tournament session is completed, the player may cash-out to redeem their prize or continue playing any offered games. Note, large prizes may be subject to reporting and claim procedures to comply with federal or jurisdictional reporting requirements.

Excitement and player enthusiasm for the illustrative linked bingo tournament (LBT) games are greatly enhanced when the basic game is combined with the video presentation sub-system (VPS) 104, a VPS monitor 110 and broadcast content that includes player ranking information during the LBT game tournament. For example, the video presentation sub-system 104 may be configured to combine output from the mobile wagering sub-system 102 with commentary from a broadcaster and visual images of the games in play. The video generated by the VPS 104 and presented on the venue VPS monitor 110 converts an individual bingo gaming experience to a group bingo experience, in which many people in a venue can watch or participate. It may be expected that when a player in a venue is doing very well and competing against players in other venues in other towns in a visible way, that the local players may enthusiastically support their own player. Expanding the degree of involvement provides a significant way of converting individual game play into a social event that attracts other players.

By way of example and not of limitation, linked bingo tournament (LBT) games have a short duration, e.g. 15 minutes. LBT game count-downs may be shown on the authorized mobile device 112 and the venues VPS monitor 110. In the illustrative embodiment, the venue's VPS monitor 110 may be activated at least 30 minutes before the LBT tournament session begins and through the duration of the LBT tournament and for at least 30 minutes after the completion of each LBT tournament.

By way example and not of limitation, an illustrative tournament may include a game buy-in of $20 so that if a player elects to play the tournament, $20 may be transferred to the authorized mobile device 112 with a POS device 114 as described above. In the illustrative tournament, there may be 500 players participating and, thus, based on a fee of $20 per player, the total LBT game sales are: $20×500 persons=$10,000. If a further assumption is made to support an 85% prize pool, the total LBT game prizes awarded may be $8,500. Some of the LBT Game Prizes may be configured to contribute to an LBT Linked Tournament Jackpot, and players participating in an LBT may have an opportunity to win those prizes based on achieving a threshold total prize level, or other criteria. That jackpot could be a progressive and the pool would enlarge from tournament to tournament until a player met the winning criteria.

Multiple variants of the LBT may be available for schedule. Some tournament games may have a pay structure similar to the schedule presented below:

| Players in game | | 200 | 250 | 300 | 500 |
|---|---|---|---|---|---|
| Entry Fee | | $ 20.00 | $ 20.00 | $ 20.00 | $ 20.00 |
| Total Fees | | $4,000.00 | $5,000.00 | $6,000.00 | $10,000.00 |
| Total Prizes | | $3,400.00 | $4,250.00 | $5,100.00 | $ 8,500.00 |
| 1st prize | 30.00% | $1,020.00 | $1,275.00 | $1,530.00 | $ 2,550.00 |
| 2nd Prize | 15.00% | $ 510.00 | $ 637.50 | $ 765.00 | $ 1,275.00 |
| 3rd Prize | 15.00% | $ 510.00 | $ 637.50 | $ 765.00 | $ 1,275.00 |
| 4th Prize | 10.00% | $ 340.00 | $ 425.00 | $ 510.00 | $ 850.00 |
| 5th Prize | 8.00% | $ 272.00 | $ 340.00 | $ 408.00 | $ 680.00 |
| 6th Prize | 6.00% | $ 204.00 | $ 255.00 | $ 306.00 | $ 510.00 |
| 7th Prize | 5.00% | $ 170.00 | $ 212.50 | $ 255.00 | $ 425.00 |
| 8th Prize | 3.00% | $ 102.00 | $ 127.50 | $ 153.00 | $ 255.00 |
| 9th Prize | 2.00% | $ 68.00 | $ 85.00 | $ 102.00 | $ 170.00 |
| 10th Prize | 1.00% | $ 34.00 | $ 42.50 | $ 51.00 | $ 85.00 |
| 11th Prize | 1.00% | $ 34.00 | $ 42.50 | $ 51.00 | $ 85.00 |
| 12th Prize | 1.00% | $ 34.00 | $ 42.50 | $ 51.00 | $ 85.00 |
| 13th Prize | 1.00% | $ 34.00 | $ 42.50 | $ 51.00 | $ 85.00 |
| 14th Prize | 1.00% | $ 34.00 | $ 42.50 | $ 51.00 | $ 85.00 |
| 15th Prize | 1.00% | $ 34.00 | $ 42.50 | $ 51.00 | $ 85.00 |
| TOTALS | 100.00% | $3,400.00 | $4,250.00 | $5,100.00 | $ 8,500.00 |
| Prize Return | | 85.00% | 85.00% | 85.00% | 85.00% |

In the event of a tie prizes may be divided equally among the players. For example, using the above prize structure, and assuming there are 200 players, and that the 4th and 5th place are tied, then the prize won by each of those players would be: ($340+$272)/2=$306. Rounding rules may be subject to jurisdictional regulations.

In the illustrative tournament bingo session, the player's entry fee of $20 allows a fixed number of plays (e.g. 80). For each play, the players "Plays" meter 1306 may be decremented by 1. If a player wins a prize, the prize points are added to the "Points" meter 1204. All games are played against another tournament player for each round. Players may randomly compete versus different players on each card, based on timing of game starts. Only winners of the Small Frame or Four Corner games may receive any points. As in regular Flash Bingo, points may be awarded for winning those games and meeting criteria for winning bonus points associated with those wins.

In operation, LBT tournaments may be identified by a specific game icon on the game client Menu screen. Activation of the game requires that the player have sufficient credits to play according to the game rules. Also, a minimum number of participating players entering into the prize pool may be required to initiate a linked bingo tournament game. In the illustrative embodiment, each bingo tournament game session includes of at least two (2) players playing modified Flash Bingo with a standard 24 number bingo card numbered 1 through 75, B-I-N-G-O with a FREE space in the middle. Games are activated by a player pressing PLAY, which initiates play and selects auto-daubing for each round.

Figure 22:
FIG. 22 shows an illustrative screenshot for a VPS broadcast of a Flash Bingo Tournament that is presented on the venue-based VPS video monitor.
Figure 23:
FIG. 23 shows an image reflecting the player experience at an illustrative venue.

During the roll-up period prior to the commencement of a linked bingo tournament (LBT) session, information regarding the total number of player participants and total prize pool for that specific tournament may be exhibited on the player screen and VPS video monitor as shown in FIG. 22 and FIG. 23.

Referring to FIG. 22, there is shown an illustrative screenshot for a tournament game coverage as implemented on the VPS) and is presented on the venue-based VPS video monitor. The video screenshot 2200 includes a host 2202 that is presenting the tournament event, an updated leader board 2204, a banner with local site data 2206, and a background screen 2208 showing an illustrative tournament game from selected devices playing at selected venues.

The illustrative screenshot 2200 may be presented on a VPS monitor 110. During the illustrative tournament game, the venue-based VPS video monitor 110 may be configured to present a leader board 2204 to players on a real time basis. The VPS output may also be configured to show the point totals for leading players and identifies the city and venues where the players are playing 2204. Additionally, the VPS video monitor 110 may display the time remaining in the tournament. In the illustrative embodiment, leading players are identified by a chosen screen name and player selected avatars. The centralized gaming system 100 incorporates a commercially available software filter to avoid use of improper names or initials on the leader board. As described above, the leader board may also be available on player's client devices.

In another illustrative embodiment the video presentation sub-system 104 provides streaming content to support mobile wagering sub-system 102 games, including Tournament Bingo. The video presentation sub-system 104 may be broadcasting 60 minutes, for example, prior to the illustrative linked bingo tournament (LBT) and 30 minutes following the conclusion of tournament sessions. By way of example and not of limitation, the content presented on the VPS video monitor may include: games promotional videos, streaming Flash Bingo Jackpot information, charity promotional videos, advertising and the actual sports-style coverage of the LBT games and bingo games themselves. It should be understood that the time period for a broadcast may be determined by the producers and can be any suitable length of time.

Referring now to FIG. 23 there is shown is an image reflecting the player experience at an illustrative venue. The VPS broadcast is shown on an illustrative TV monitor 2300, identified also in FIG. 6 as item 606, and gaming clients 2302 and 2304 are shown on a counter. An objective of the VPS system is to provide a social interaction that greatly enhances the interest and enjoyment in the play of the games. In addition, since the broadcast is designed for a large-format visual representation in the gaming venue, it is also visible by non-players and may advertise the game and in many cases find non-players in the venue rooting for the success of the active players in their location. This interactivity is a major component of generating a social quality to the game which may be especially attractive to desirable younger-generation players.

During the linked bingo tournament session, the leader board information may scroll to show the top scores in the network on a "real-time" basis. This leader board information may be expected to cover a state, or more, depending on the jurisdiction hosting the game. The leader board updates may occur frequently, e.g. every 10 seconds. At the end of the LBT game, the winners, the venue where they played and the prizes won may be broadcast. This information may scroll and could remain on a split screen for a period of time. The top winner(s) may be celebrated. As described above, the prize meter indicates the total prize pool for an upcoming game based on the volume of players enrolling in the LBT.

By way of example and not of limitation, for an illustrative Tournament Bingo games the player is advised in real-time of information about the status of the tournament, including size of the jackpot pool, number of players, leaders (identified by a "handle" and location), and time remaining in the tournament. This data may be enhanced with visual representations and comments from a moderator and field reports. Thus, the player obtains a sense of community and competition which cannot be gained from the client game interface itself.

Another game style related to the Linked Bingo Tournament is Bingo. This is a more traditional style of bingo as compared to the high-speed bingo that is the basis for Flash Bingo and the Linked Bingo Tournaments.

Bingo games may be scheduled in the tournament menus interspersed with linked bingo tournaments. In one example, a tournament series may be scheduled that has four (4) events, namely, two (2) Flash Bingo Tournaments and two (2) Linked bingo games. Each event may take 30 minutes, so the entire session, supported by the VPS would be a two-hour session.

The following describes an illustrative implementation of a bingo tournament session. From the tournament menu illustrated in FIG. 11b a player may select a bingo game.

Figure 24:
FIG. 24 shows an illustrative bingo game enrollment screen for an illustrative bingo game.

Referring to FIG. 24 there is shown an illustrative bingo game enrollment screen for an illustrative bingo game. An illustrative embodiment may present a broad array of bingo variations, distinguished by graphic theme, jackpot possibilities, winning patterns, wagering denomination and prize structures. In the illustrative embodiment, different customizable bingo games may be scheduled and configured through the management system portal. The illustrative enrollment screen 2400 requires that a player select a screen name in space 2410, which is performed with a pop-up keypad. A jackpot value, if appropriate to the bingo variant, is displayed in space 2420. Space 2430 indicates a countdown to the game start. The purchase price and control of the number of cards to be purchased is presented in space 2440. Players can purchase a minimum number of cards which may be as low as one and vary between bingo game variants up to a maximum number which may be set by jurisdictional regulations. The system may support incremental sales, allowing a player to make a purchase and then add to it. Alternatively, there is also allowance for a player to cancel a sale.

Figure 25:
FIG. 25 shows a screenshot of bingo game play.

Referring now to FIG. 25, there is shown a screenshot 2500 of bingo game before the player initiates game play. In the illustrative embodiment, the player may be required to touch the PLAY button 2510 to enter the game after the game countdown goes to zero. When it is time for the game to start, the number of players enrolled in the game and the total revenue 2530 may be displayed on the right side of screenshot 2500. Additional game information including rules and prizes may be provided by having the player touch the "Game Info" button 2540. When the bingo game play is occurring, the status 2550 indicates that the bingo game is being played and the player should press the PLAY button 2530 to join the game. When the game is joined, FIG. 25 illustrates the main game screen which may display up to 5 cards. If the player has more than 5 cards in play the screen can be scrolled or moved to show the additional cards, 8 to a screen.

Figure 26:
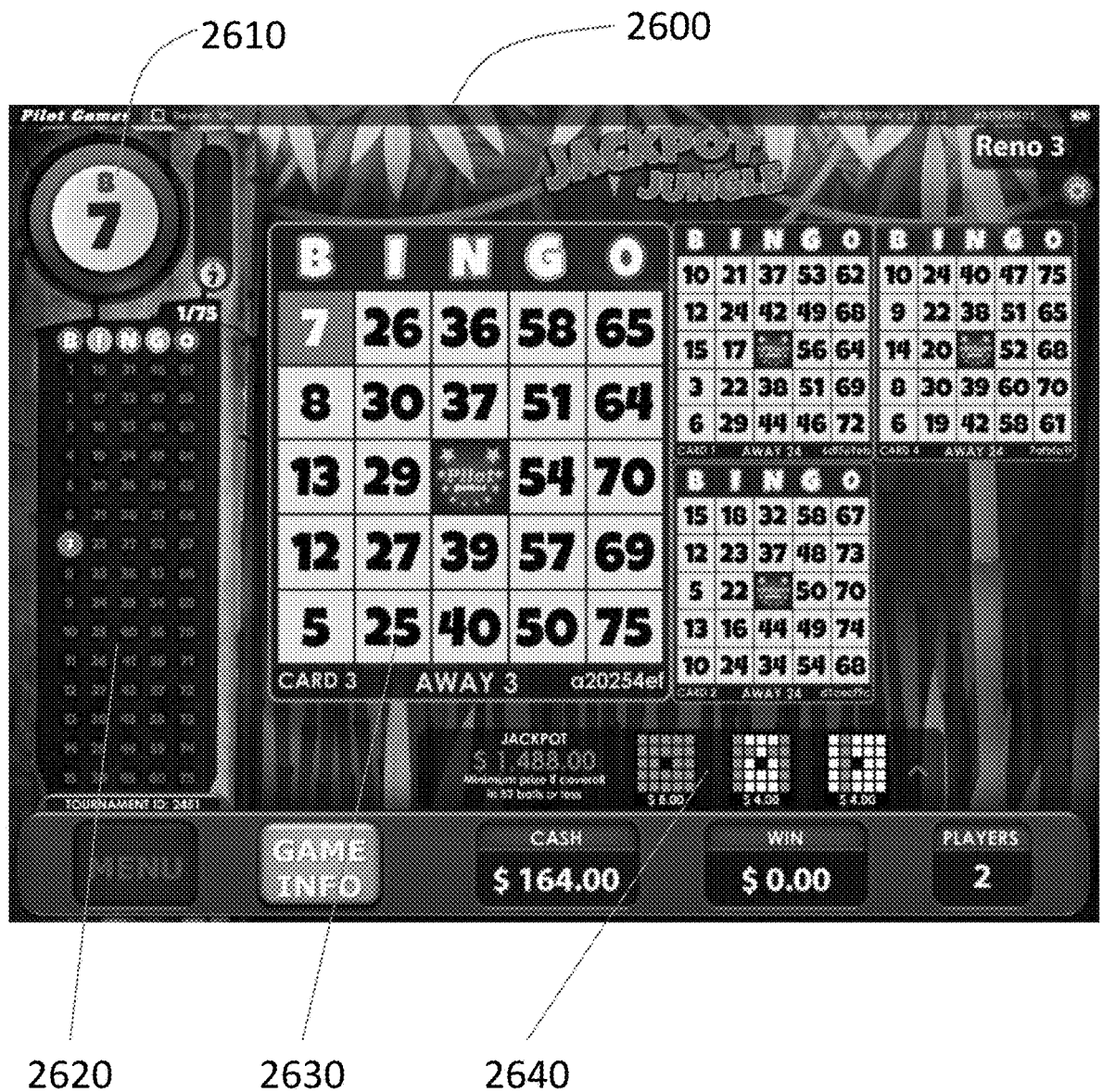
FIG. 26 shows an illustrative screenshot of bingo game play with multiple bingo cards.

Referring still to FIG. 26, there is shown an illustrative screenshot of bingo game play with multiple bingo cards. In the illustrative embodiment, the large card on the first screen is always the one that is closest to getting the next winning pattern. Each card face at the bottom says AWAY X, where X is the number of spaces that need to be filled on the card to get the next winning pattern.

In operation, the central system 100 sends down messages with the ball draws. As each ball draw is revealed the ball is shown on the screen in space 2610. The game board 2620 displays all called numbers and all player cards are marked on the screen as each ball is called. Balls are called at a settable rate in the central system 100. A typical rate may be one ball each 10 seconds, which is similar to the familiar rate that a ball "caller" in a traditional bingo hall might announce balls as they are drawn. A jackpot value may be displayed in space 2630 and the winning patterns and associated prizes are displayed in area 2640. During the ball call the game client may include audio simulating the voice of a caller calling the balls. In the illustrative embodiment, the game displayed has three winning patterns—a straight line, a large M, and a coverall or "blackout", meaning that all 24 fillable spaces are called.

Figure 27:
FIG. 27 shows an illustrative screenshot for a winning bingo pattern.

Referring to FIG. 27 there is shown an illustrative screenshot for a winning bingo pattern. In the illustrative screenshot 2700, the winning bingo pattern is a large M and the awarded prize 2720 is $4.00. As each prize is awarded, the corresponding authorized mobile device presents the awarded prize, e.g. $4.00. If a player is not awarded a prize, then the corresponding authorized mobile device presents a message indicating that another player has been awarded the prize, including the amount, player screen name, and location.

Figure 28:
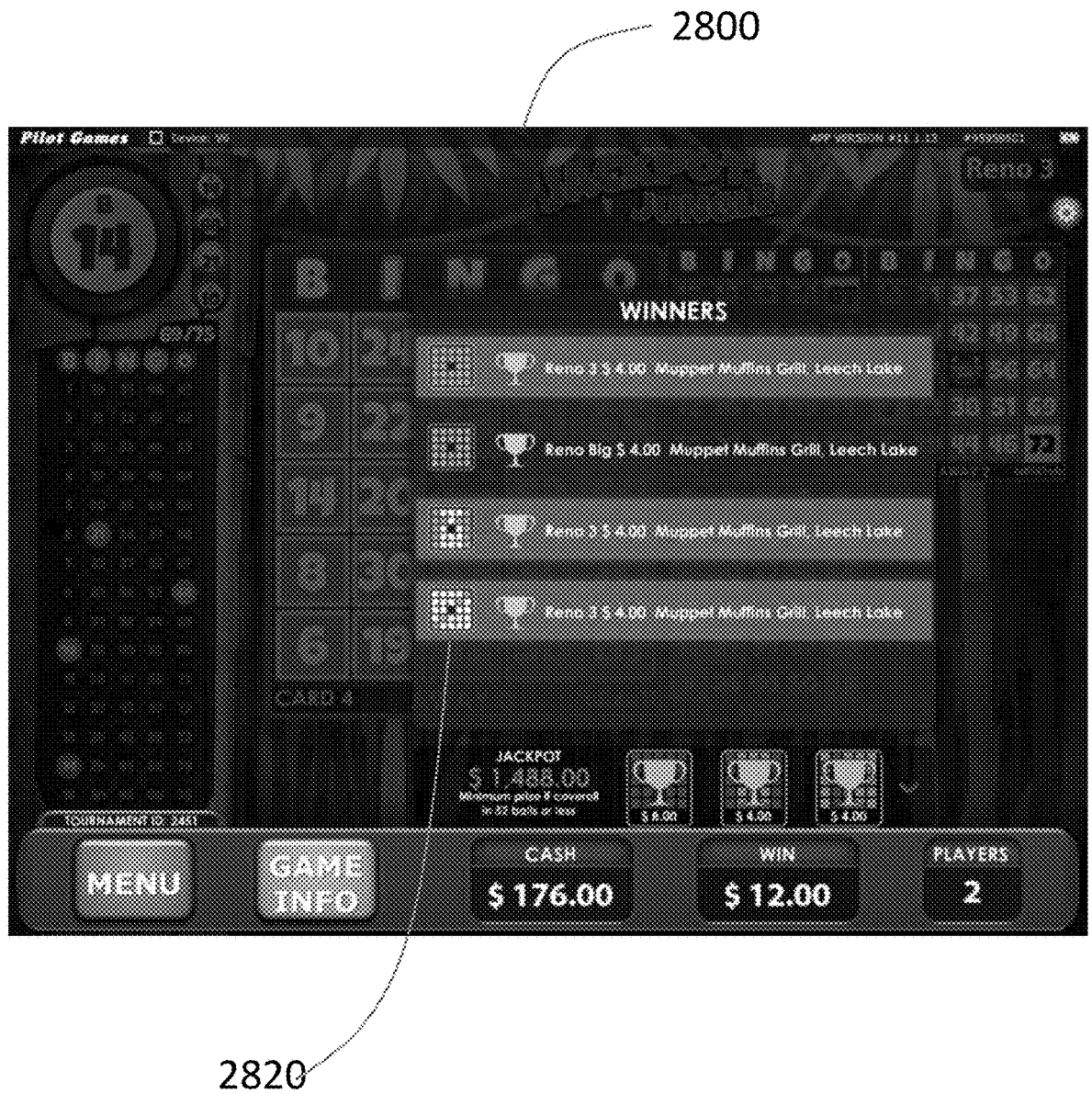
FIG. 28 shows an illustrative winner summary screenshot indicating that all prizes have been awarded for the bingo the game.

Referring to FIG. 28, there is shown an illustrative winner summary screenshot indicating that all prizes have been awarded for the bingo the game. In the illustrative embodiment, the illustrative bingo game continues until all patterns are complete. At the end of the bingo game, a list of prize winners is presented to each participating player as shown in the winner summary screenshot 2800. The location, player screen name and amount for each prize awarded are presented in the winner summary screenshot 2800. Prizes may be directly added to the player account balance, except where regulatory or IRS regulation require specific processes.

Figure 29:
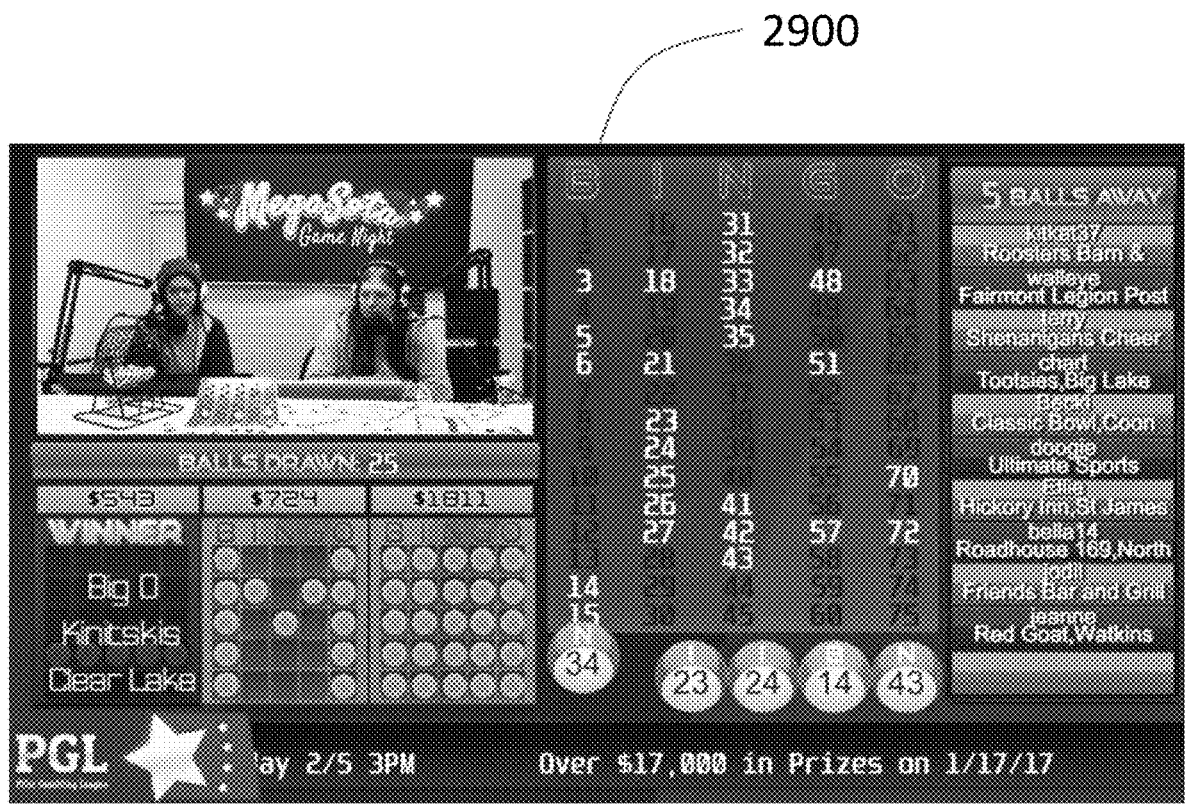
FIG. 29 shows an illustrative VPS broadcast for the bingo game.

Referring to FIG. 29 there is shown an illustrative VPS broadcast 2900 as it might be shown during a bingo game. The player enjoyment of the bingo games is significantly enhanced by the associated presentation on the VPS broadcast. Not only is there the human interest supplied by live hosts, but a competitive element is supplied by listing cards that are getting close to a winning pattern.

Figure 30:
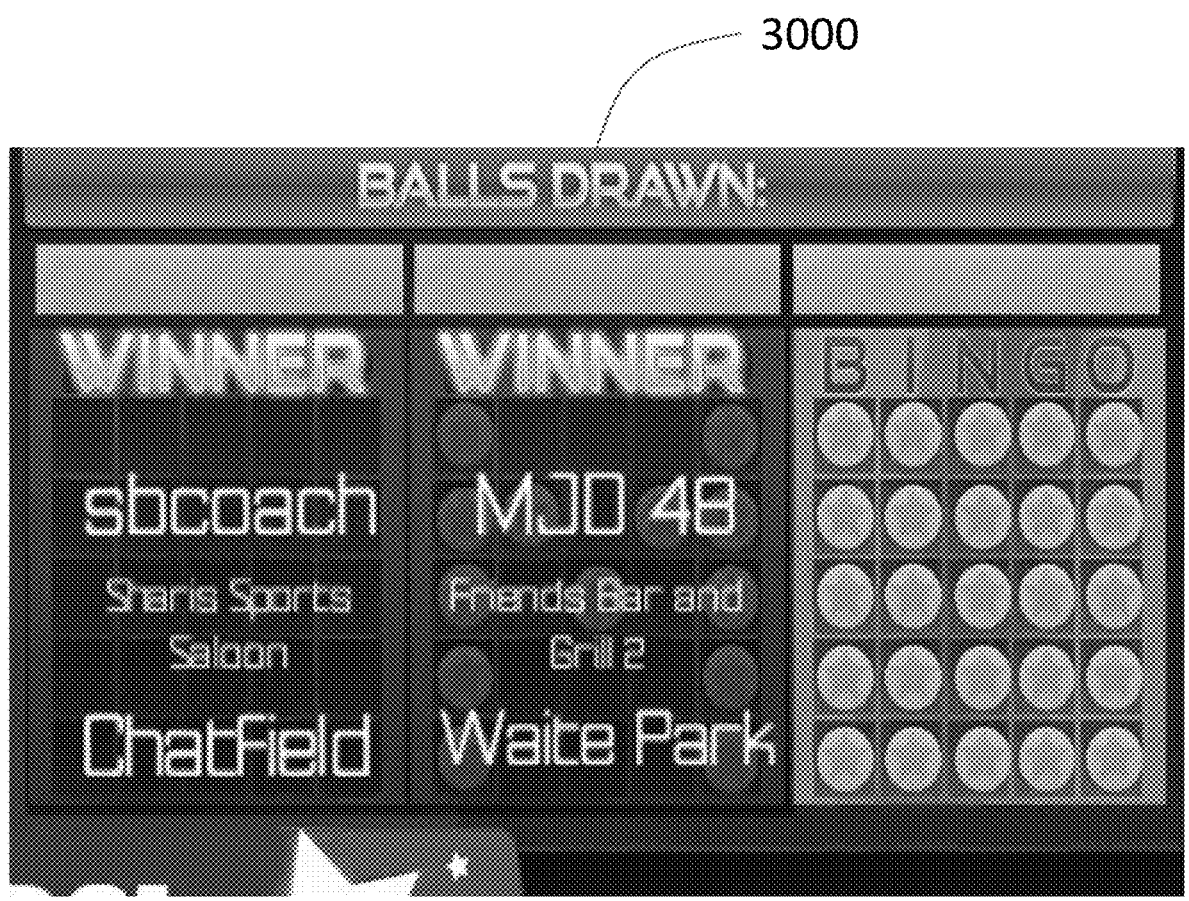
FIG. 30 shows an illustrative screenshot of graphics for a large VPS stationary display.

Referring to FIG. 30, there is shown an illustrative screenshot of a VPS broadcast focusing on winner data during a bingo game. The screenshot 3000 provides an increased awareness of the winner or winners because the large screen identifies the winning players, their venue and location in real-time during bingo game play.

Figure 31:
FIG. 31 shows an illustrative Gaming League Website (GLW) main screen.

Referring to FIG. 31, there is shown an illustrative main screen 3100 for a Gaming League Website. The system and methods presented herein support a Gambling or Gaming League Website (GLW), which is a web-based sub-system that interfaces with and is complementary to the Mobile Wagering Sub-System 102 shown in FIG. 1. In the illustrative embodiment, the illustrative gambling league website is commercially identified as the PILOT GAMBLING LEAGUE™ (PGL). The illustrative PILOT GAMBLING LEAGUE™ provides functionality intended to promote player competition between players playing the same game, but in a multiplicity of venues that could be separated by hundreds of miles, and thereby enhancing the feelings of a community event and increasing interest in the associated wagering activity.

Referring back to FIG. 1, there are two technical components of the illustrative Gambling League Website. The first component is referred to as a GLW website server 120, which is accessed with a common browser, e.g. Internet Explorer, Chrome, Safari, or other such browser. Additionally, the GLW website server 120 may be accessed using a computing device 130 that is configured to run a custom Android or iOS "APP." The computing device may be wired or wireless and includes, by way of example, a PC, tablet or other such computing device that provides Internet access.

The illustrative GLW website server 120 includes a SQL Server database and a software architecture based on .NET, C# and other such computing languages. The illustrative GLW website server 120 is also communicatively coupled to the mobile wagering sub-system (MWS) 102 with an interface that allows players to log into the GLW 120 or the MWS 102 with the same screen name and password. Additionally, the GLW 120 and MWS 102 both support the common use of player-chosen avatars. Note, in the illustrative embodiment there is no requirement for players on the MWS 102 to login with a password, so that anonymous play is fully supported. However, if players do desire to identify themselves to the MWS 102 with their GLW 120 screen name and password, then they can have the benefit of having aspects of their play transferred to their GLW account. Information that may be transferred from the GLW 120 to the MWS 102 includes scores of tournament, prize winnings, play totals, play locations, number of play sessions, and other such game information.

In operation, periodic tournament scores may be tracked based on the results from the MWS 102 activity. Additionally, the periodic tournament scores are also available to each player that accesses the GLW website server 120. The type of data collected, and the corresponding data attributes may vary based upon jurisdictional regulations. In the illustrative embodiment, players may be identified by their chosen screen name and general location. The illustrative website server 120 presents the top players in each region and their corresponding scores and home town.

Figure 32:
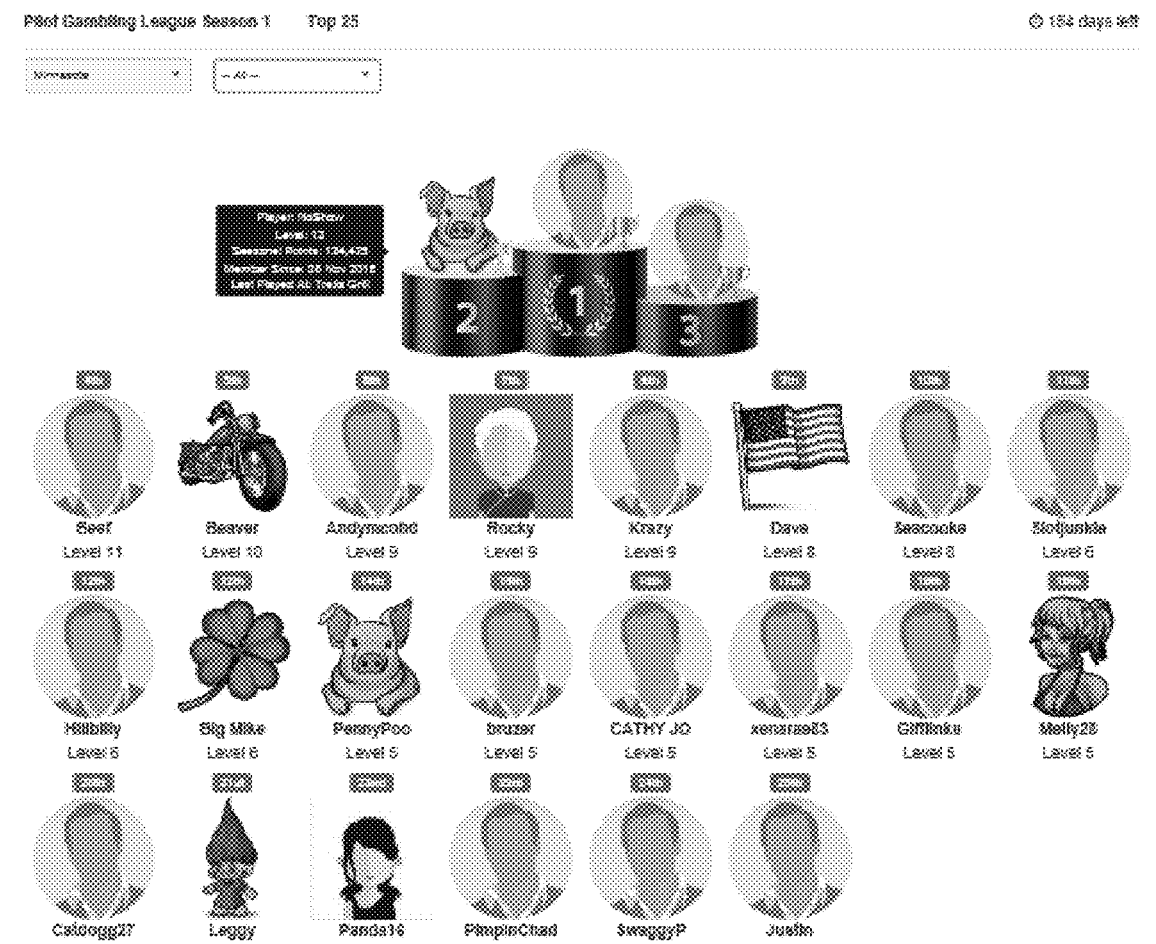
FIG. 32 shows an illustrative GLW screenshot of player standings in a regional or system competition.

FIG. 32 shows an illustrative screenshot of player standings in a regional or system competition. The illustrative screenshot 3200 includes the top players in a particular region.

Figure 33:
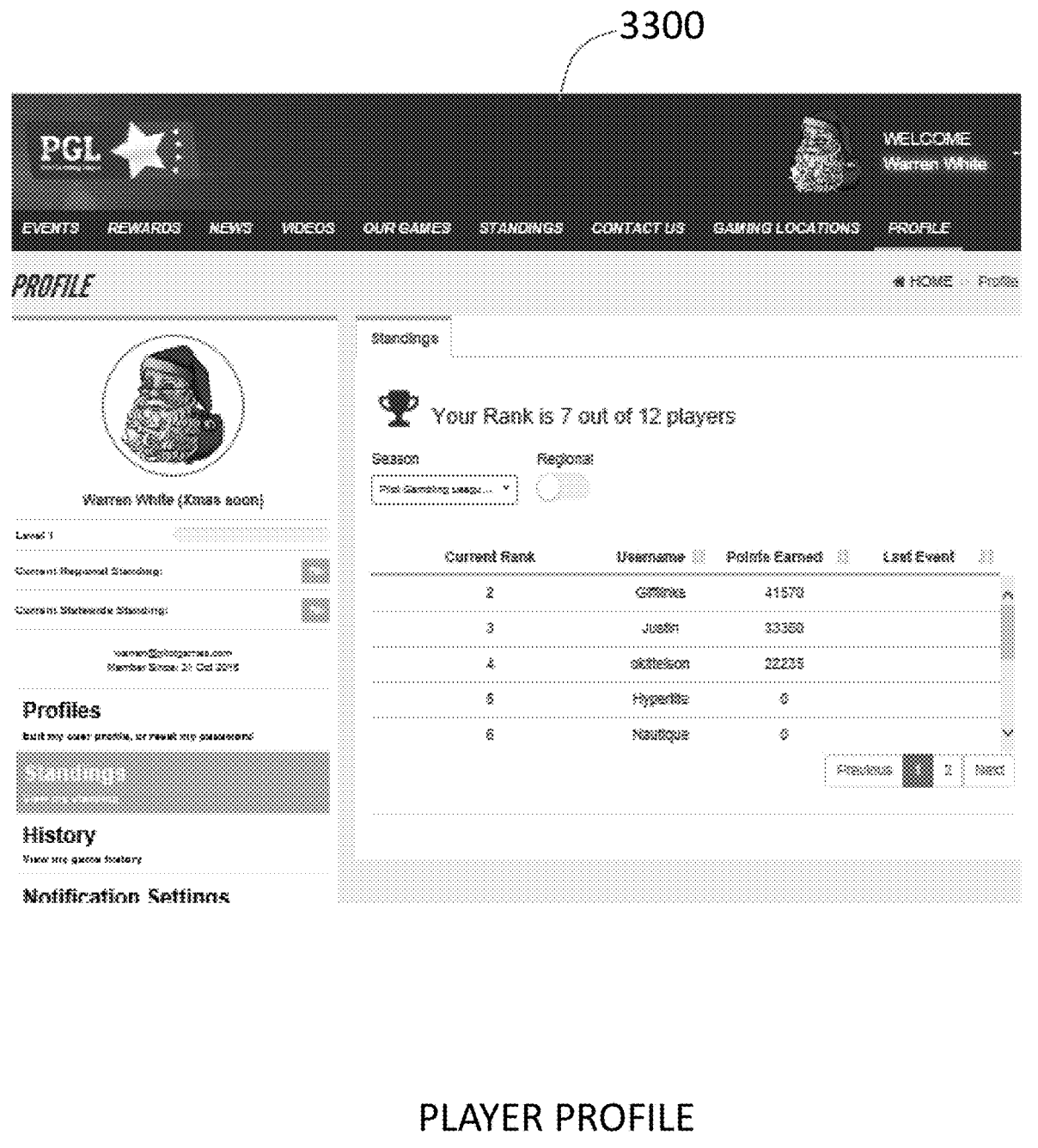

Referring to FIG. 33 there is shown a screenshot 3300 of an illustrative portion of the player profile. The screenshot includes the particular player's ranking and additional profile information including profiles, standings, history and notification settings.

Figure 34:
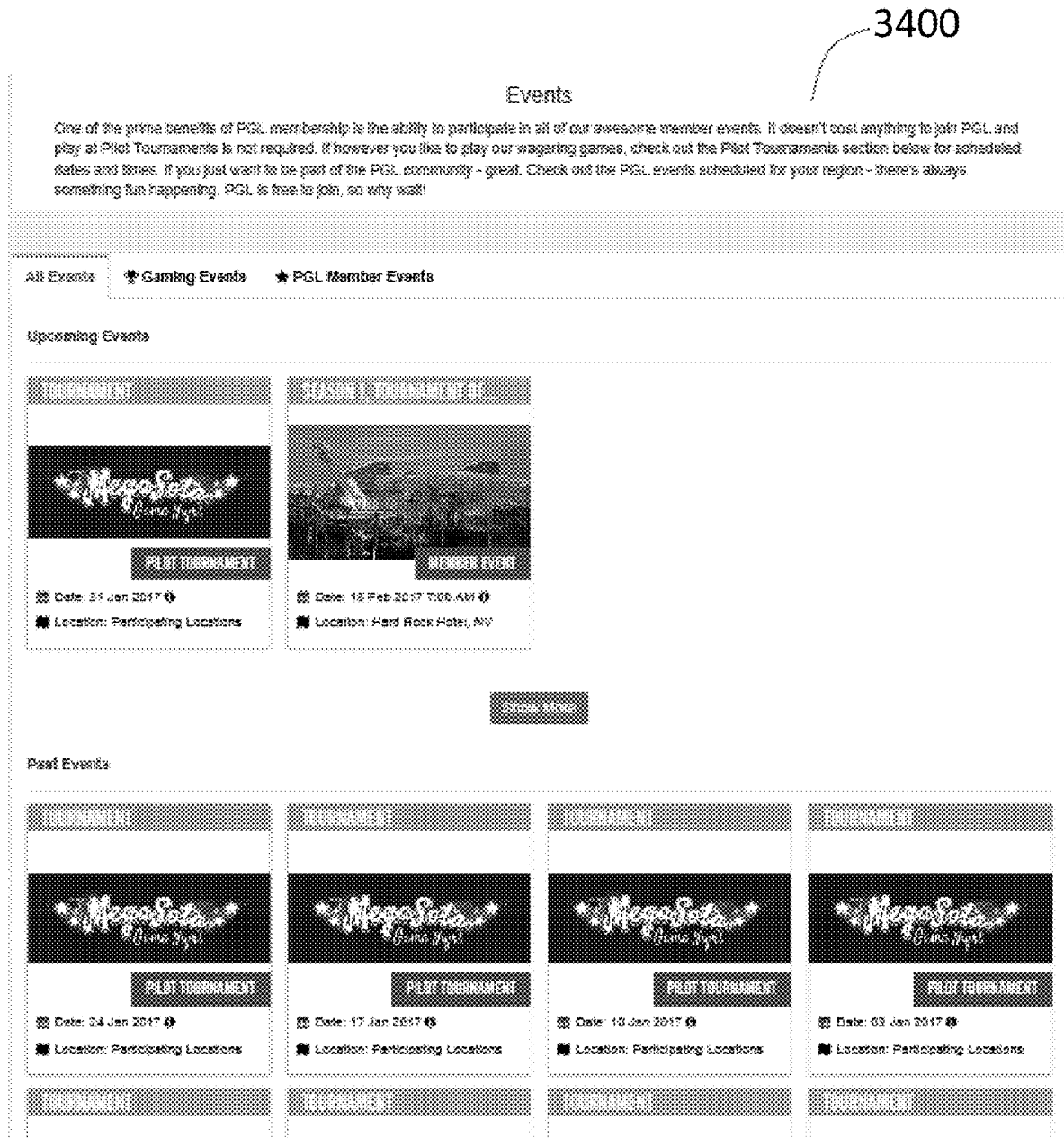
FIG. 34 shows illustrative GLW past events and future events.

Referring to FIG. 34 there is shown illustrative screenshot 3400 of past events and future events. By way of example and not of limitation, the past and future events are tournament events as described above.

Figure 35:
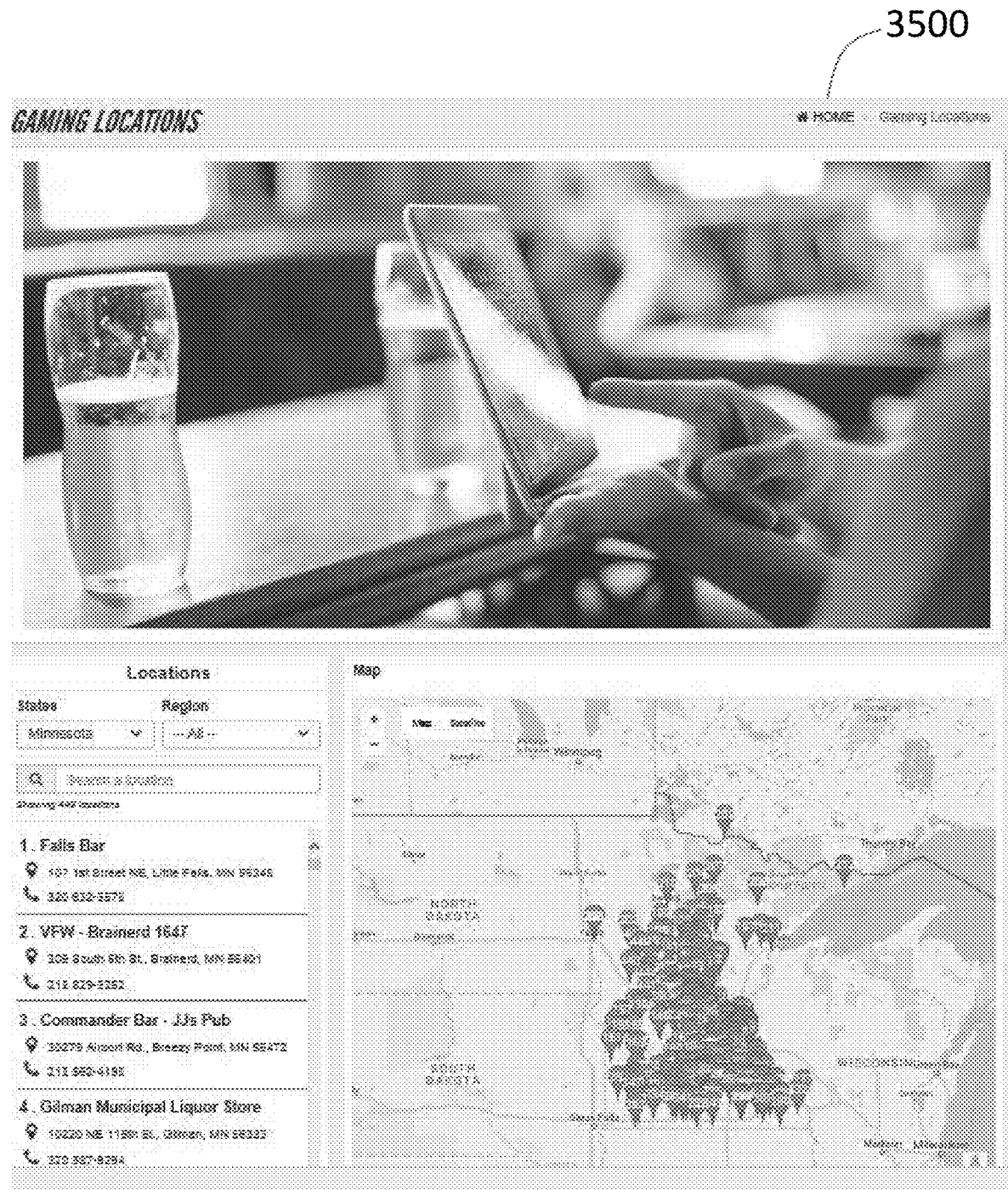
FIG. 35 shows a GLW web page that includes gaming venues that are communicatively coupled to the mobile wagering sub-system locations.

Referring to FIG. 35 there is shown a web page that includes gaming venues that are communicatively coupled to the mobile wagering sub-system locations. The players may access this "locations" web page 3500 to locate venues for game play that support the systems and method presented herein.

Figure 36:
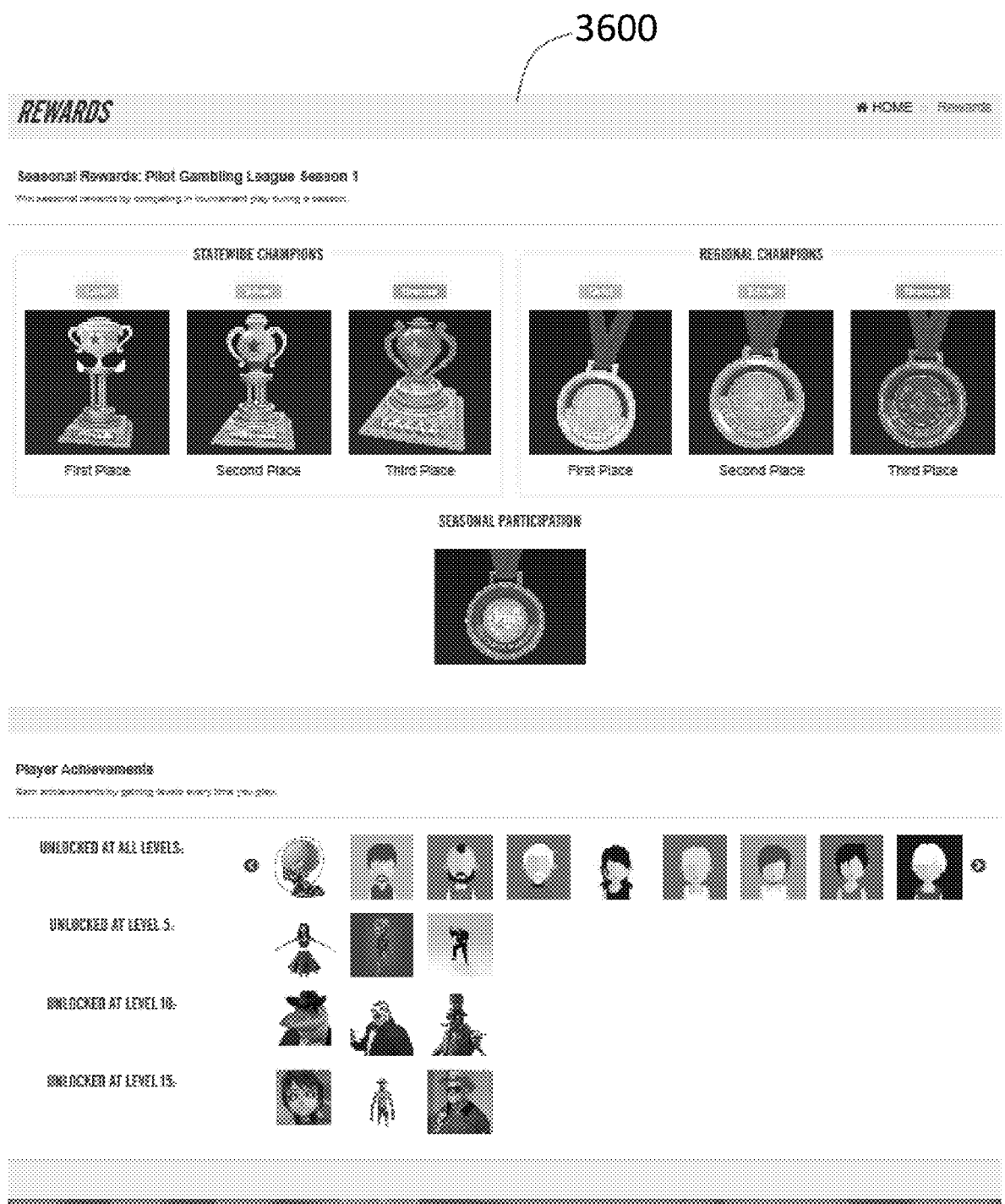
FIG. 36 shows an illustrative GLW screenshot of a player's available virtual rewards.

Referring to FIG. 36 there is shown an illustrative screenshot 3600 of a player's virtual rewards. For example, players may also qualify for "vanity awards." These vanity awards may be granted based on player performance. The vanity awards may provide an expanded choice of avatars, a graphic trophy or trophies that are associated with their screen names, and other such virtual items or awards. The vanity awards may be presented in at least one of the GLW website server 120, the mobile wagering sub-system 102 and the Video Presentation System 104. For example, if a player has won a regional virtual gold trophy prize, then the virtual gold trophy prize may be displayed on the VPS television 110 when the player plays in a new tournament. The player's chosen screen name, avatar and the virtual gold trophy may be displayed on the various VPS television 110, which may be located in hundreds of participating venues.

Figure 37:
FIG. 37 shows an illustrative GLW screenshot of news, blogs and tweets.

Referring to FIG. 37 there is shown an illustrative screenshot 3700 of news, blogs and tweets for the Gaming League Website. The illustrative screenshot 3700 may be used to periodically invite GLW members to a regional tournament at a venue in the region. Additionally, non-wagering competitions may be set up at those venues where actual promotional prizes may be awarded. Furthermore, winners of regional tournaments may be invited to a Tournament of Champions, which will take place at a premium location. Further still, a Grand Prize winner may also be selected for a promotional cash or merchandise prize. These competitions or events may be shown live or on video to all players in their normal gaming venues using the Video Presentation System 104.

Figure 38:
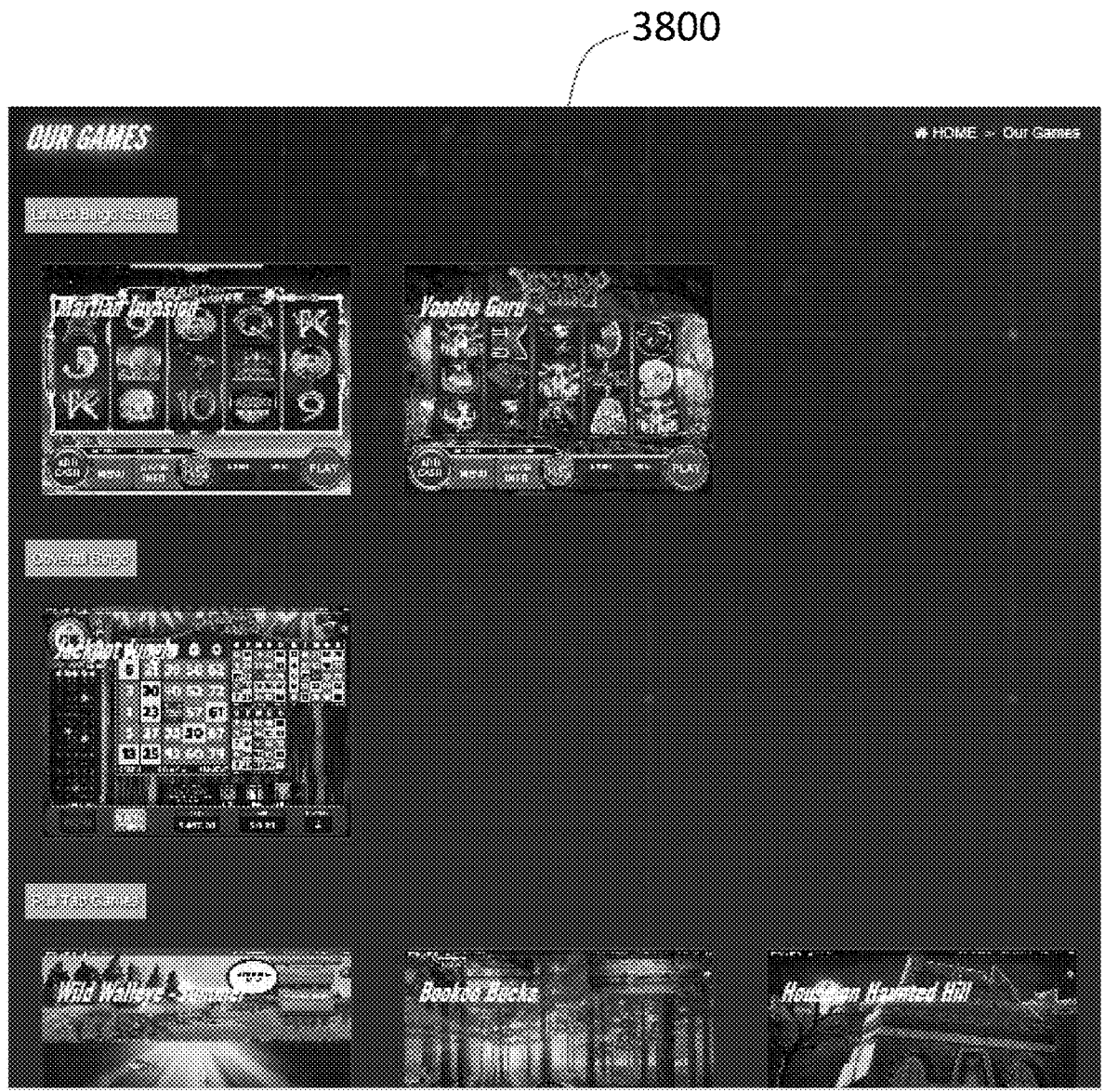
FIG. 38 shows an illustrative GLW embodiment of MWS game libraries presented to players.

Referring to FIG. 38 there is shown an illustrative screenshot of the MWS 102 game libraries presented to players. The screenshot 3800 shows that there are three different game types, namely, tournament bingo games, coverall bingo and pulltab games.

The GLW 120 and MWS 102 systems are communicatively coupled to the VPS 104, which is communicatively coupled to the VPS video display 110 as shown in FIG. 1. The VPS display 110 provides the opportunity to highlight GLW players and the GLW events. The VPS display 110 may be used to highlight regional standings, announce regional winners, show live or video clips of regional events, show live or video clips of the Tournament of Champions, show Interviews with PGL players, and other such GLW information. This close interaction between the VPS 104, MWS 102 and GLW 120 creates the social atmosphere and spirit of competition and accomplishment improve the success of the wagering enterprise.

Figure 39:
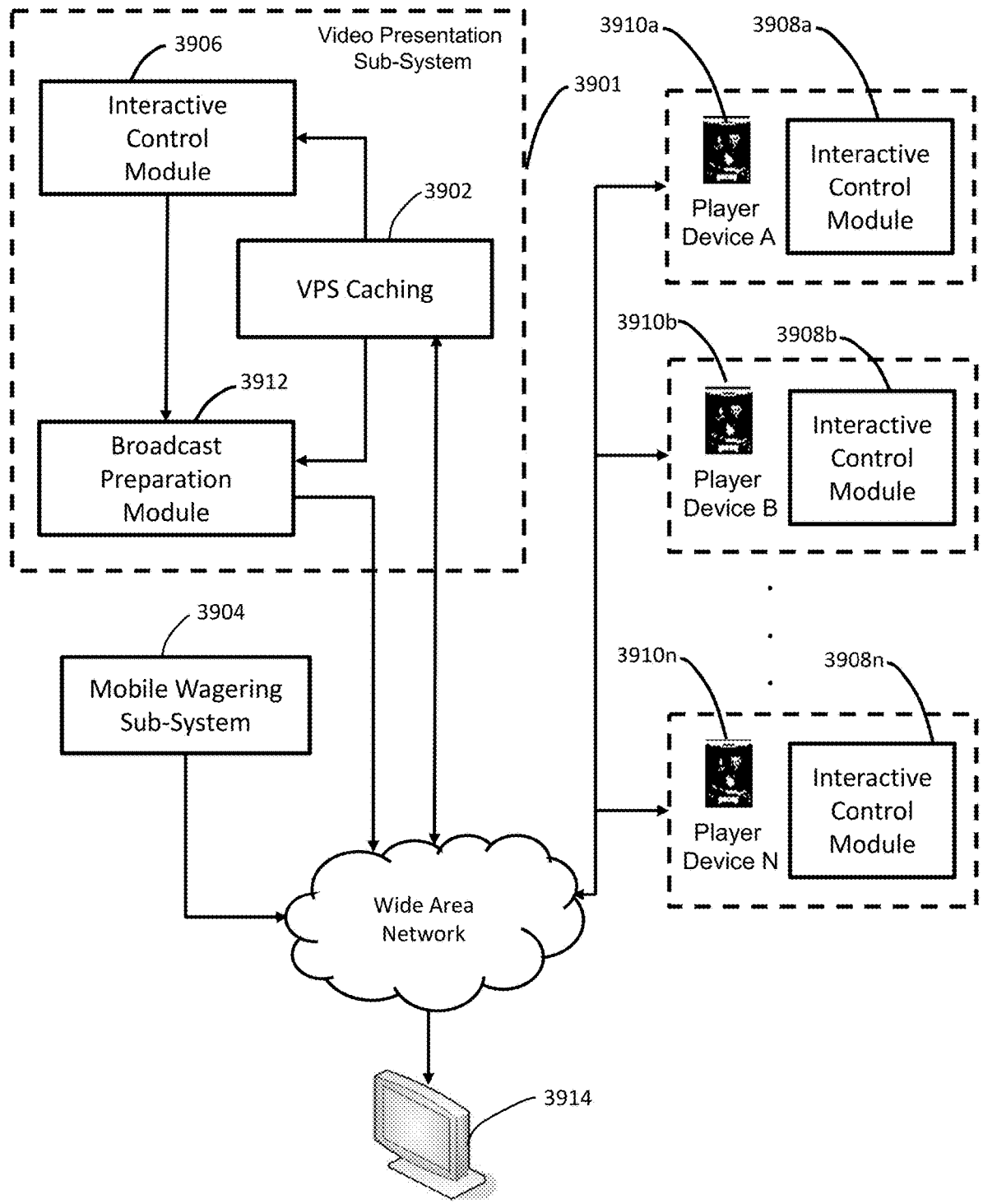
FIG. 39 shows an illustrative centralized gaming system that supports virtual game representation.

Referring to FIG. 39 there is shown an illustrative centralized gaming system that supports virtual game representation. The centralized gaming system includes a video presentation sub-system (VPS) 3901 and a mobile wagering sub-system 3904. The mobile wagering sub-system 3901 and the video presentation sub-system 3904 are communicatively coupled to one another.

The video presentation sub-system includes a video presentation sub-system (VPS) caching component 3902, a server-based interactive control module 3906 and a broadcast preparation module 3912. The VPS caching component 3902 may be embodied as a memory or other logic component capable of caching content associated with the VPS 3901. The server-based interactive control module 3906 provides a virtual game representation that may be combined with other content at the broadcast preparation module 3912.

The mobile wagering sub-system 3904 and the video presentation sub-system 3901 are communicatively coupled to a Wide Area Network, e.g. Internet, which is communicatively coupled to a plurality of player devices such as Player Device A 3910a, Player Device B 3910b and other such gaming devices that are represented by Player Device N 3910n. The player devices 3910 are also communicatively coupled to the video presentation subsystem 3901. The stationary monitor 3914 may also be referred as a "stationary monitor client" as described above with reference to FIG. 1.

In the illustrative embodiment, the player devices 3910 include a plurality of authorized mobile devices as described above in FIG. 1. Additionally, authorized mobile device may be communicatively coupled to Point-of-Sale (POS) device and the mobile wagering sub-system 3904 as described above in FIG. 1. In operation, the authorized mobile devices and POS devices are registered with the mobile wagering sub-system 3904, which includes a database (not shown) that associates the authorized mobile devices and POS devices with a designated gaming venue 108 as described above in FIG. 1.

In another illustrative embodiment, the mobile wagering sub-system 3904 and video presentation sub-system 3901 may also be communicatively coupled to other authorized clients such as gaming machines, slot machines, smartphones, PCs, stationary monitors, Internet appliances, Internet of Things (IoT) devices with hardwire connections or wireless connections to the Wide Area Network.

Communication between the server components, namely, the mobile wagering sub-system 3904 and the video presentation sub-system 3901, the stationary display 3914 and the player devices is performed over a wide-area network as described above in FIG. 1.

By way of example and not of limitation, the VPS caching component 3902 retrieves data from the mobile wagering sub-system 3904. The illustrative VPS caching component 3902 ensures that the number of interactive control modules 3906, 3908a, 3908b and 3908n requesting data does not affect the mobile wagering subsystem 3904. More specifically, the VPS caching component 3902 may utilize an apache web server with memcache enabled in order to reduce the number of times data is read from any mass storage device.

In operation, data is pulled from the mobile wagering sub-system 3904 at regular intervals and is held for immediate retrieval by the server-based interactive control module 3906 and client-based interactive control modules 3908a, 3908b and 3908n. In the illustrative embodiment, interactive control modules 3906, 3908a, 3908b and 3908n would then create their own https requests to the VPS caching component 3902, which returns the exact response retrieved from the mobile wagering subsystem 3904. Thus, one or more interactive control modules 3906, 3908a, 3908b and 3908n retrieves data from the VPS caching component 3902. Furthermore, each interactive control module 3906, 3908a, 3908b and 3908n contains logic to display the state of the entire tournament game.

The interactive control module 3906, 3908a, 3908b and 3908n renders a display containing all or a subset of the information about the state of the tournament session. For example, the gaming device 3910a, 3910b, 3910n may show the player's state in a two-dimensional environment or a three-dimensional environment. Additionally, the interactive control module 3906, 3908a, 3908b and 3908n allows a person to control a virtual camera having a field of view smaller than the entire virtual world, which enables the person controlling the virtual camera to view different areas of the virtual world.

In operation, the server-based interactive control module 3906 generates the video output that may be mixed with a video broadcast feed at broadcast preparation module 3912. The video broadcast feed (not shown) may be generated at a television studio. The combination of the video output from server-based interactive control module 3906 and a video broadcast feed is then displayed on stationary display 3914. More generally, the content generated by the broadcast preparation module 3912 may then be displayed on a stationary monitor 3914, player devices 3910 or any combination thereof.

For example, in the illustrative Fishing Derby tournament game presented in FIGS. 42-61, the state of the game includes items such as where each player has chosen to fish, the lure being used, the chosen fishing buddy, casts remaining, total points earned, player screen name, value of non-rank based prizes, value of rank based prizes and the total number of players.

Figure 57:
FIG. 57 shows the updated VPS display of tournament rankings, screen names, avatars and physical locations of other players during a flash bingo tournament.
Figure 58:
FIG. 58 shows an illustrative screen shot of the immersive virtual environment that combines live tournament data with the virtual fishing locations of other players.

The interactive control module 3906, 3908a, 3908b and 3908n includes a view from that of a boat on a three-dimensional lake, and the user can change the amount of data shown on the screen by piloting the virtual boat to different locations on the lake as shown in FIG. 58. The illustrative view from the boat is associated with Fishing Derby game that is described in further detail in FIGS. 42-61.

Figure 40:
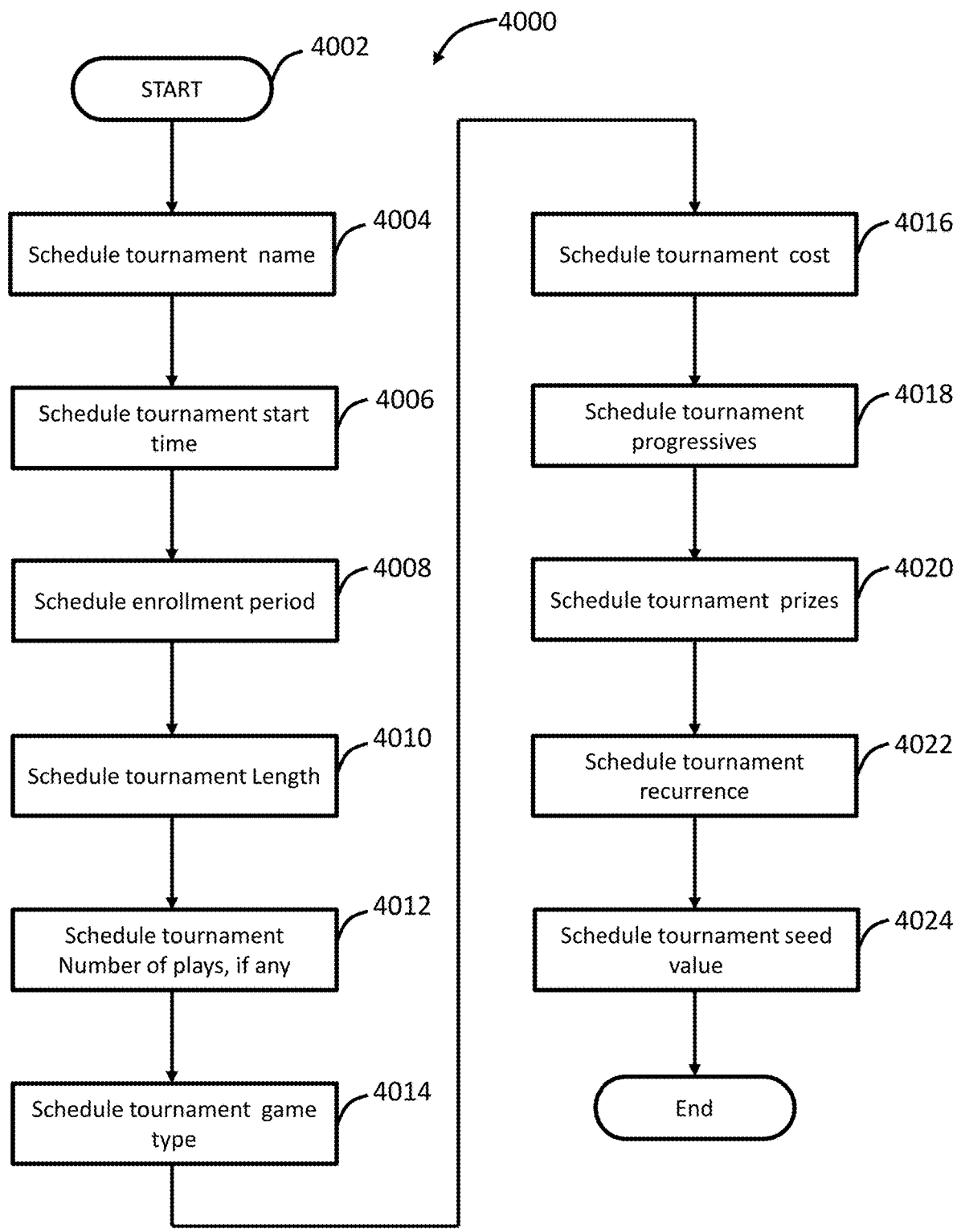
FIG. 40 shows an illustrative tournament scheduling process on a portal for an illustrative tournament session.

Referring to FIG. 40 there is shown an illustrative tournament scheduling process on a portal for an illustrative tournament session. Operation of the tournament game begins by scheduling a tournament session. In the illustrative embodiment, the tournament session activity is scheduled at a management terminal (not shown). An illustrative administrative user accesses the management terminal and provides the necessary credentials to properly login to the management terminal. Additionally, the administrative user has the required operational security authority to schedule the tournament session.

It shall be appreciated by those of ordinary skill in the art having access to this disclosure that the steps of FIG. 40 may be executed in any order and sometimes the different elements can be combined, often depending on jurisdictional requirements and restrictions.

In operation, the tournament scheduling process 4000 is initiated at 4002 when the authenticated administrative user securely accesses the management terminal. The method then proceeds to block 4004 where the administrative user assigns a name to a particular tournament session. In the illustrative embodiment, the name of the tournament session is displayed on the illustrative player devices 3910*a*, 3910*b* and 3910*n*. Additionally, the name of the tournament session may also be associated with one or more reports associated with the tournament session.

The method then proceeds to block 4006 where a start date and start time is associated with the tournament session. Thus, the administrative user determines the tournament session start date and start time by interacting with the management terminal.

Additionally, at block 4008, the administrative user can determine an enrollment period for the tournament session. The length of an enrollment period may vary. For example, a game may start at 8 PM, but the players can start to enroll 15 minutes earlier, or at 7:45 PM.

At block 4010, the administrative user accessing the management terminal proceeds to determine the length of the tournament session. By way of example and not of limitation, the length of the tournament session is entered in minutes. For example, a tournament can be designed to run for 20 minutes.

In block 4012, the administrative user determines a maximum number of game sessions associated with the tournament session. In the illustrative embodiment, this determination of the maximum number of game sessions is necessary when all players have the same number of game sessions. In another illustrative embodiment, the number of game sessions for each tournament session are not determined by the administrative user, instead, players are allowed can play as many game sessions as possible within the allocated time for the tournament session. Note, the type of tournament may be dictated by jurisdictional requirements and so the number of game sessions may be fixed or vary.

Additionally, there may be a variety of types of tournament session. The tournament session may vary based on game theme, prize structure or any combination thereof. By way of example and not of limitation, the prize structure may be associated with the quantity of winners, the percentage of the prize pool that will be won by winning players. Thus, the top finisher may be awarded 10% of the prize pool, the second-place winner may be awarded 8% of the prize pool and the remaining winners may be awarded other amounts.

At block 4014, the administrative user may select a particular type of tournament session from a menu of available choices. Additionally, the type of game session may also vary. Recall, that a tournament session includes a plurality of game sessions.

By way of example and not of limitation, the game sessions may be bingo-based, in which the prize amount is determined by the results of a bingo game between players and the resulting prize is presented in an entertaining manner such as a slot-machine or pull-tab game. In another illustrative embodiment, the awarded prize may be determined by a formula that us based on the generation of one or more random numbers by an algorithm associated with an illustrative gaming server. In yet another embodiment, the game session may be based on selection of a prize result from finite or infinite pool of predetermined possibilities. Examples of predetermined pools would include electronic pull-tabs or electronic instant tickets.

The method then proceeds to block 4016, in which the administrative user accessing the management terminal enters the cost for each player to enter the tournament session. The method then proceeds to block 4018 where the administrative user associates a progressive prize pool with the tournament session. The illustrative progressive prize specifies a percentage of the total enrollment costs played by the players that will be allocated to the growth of the progressive pool as well as the criteria to for awarding the progressive prize pool or any portion of the progressive prize pool.

At block 4020, the administrative user may enter a prize schedule for the tournament session. The prize schedule specifies the percentage of the prize pool to be won by the top ranked player, the second ranking player, and so on for the specific number of winners associated with the tournament session.

At block 4022, the administrative user schedules a particular frequency of game play for the tournament session. More particularly, a tournament session may be schedule as a one-time event or it may "recur" at a specified interval (e.g. daily, weekly, etc.). Thus, the administrative user may schedule the tournament session recurrence.

At block 4024, the administrative user establishes a seed value for the game prize pool; this seed value may be added to the prize pool contribution from the player enrollment costs before calculating player prizes at the end of a tournament.

Figure 41:
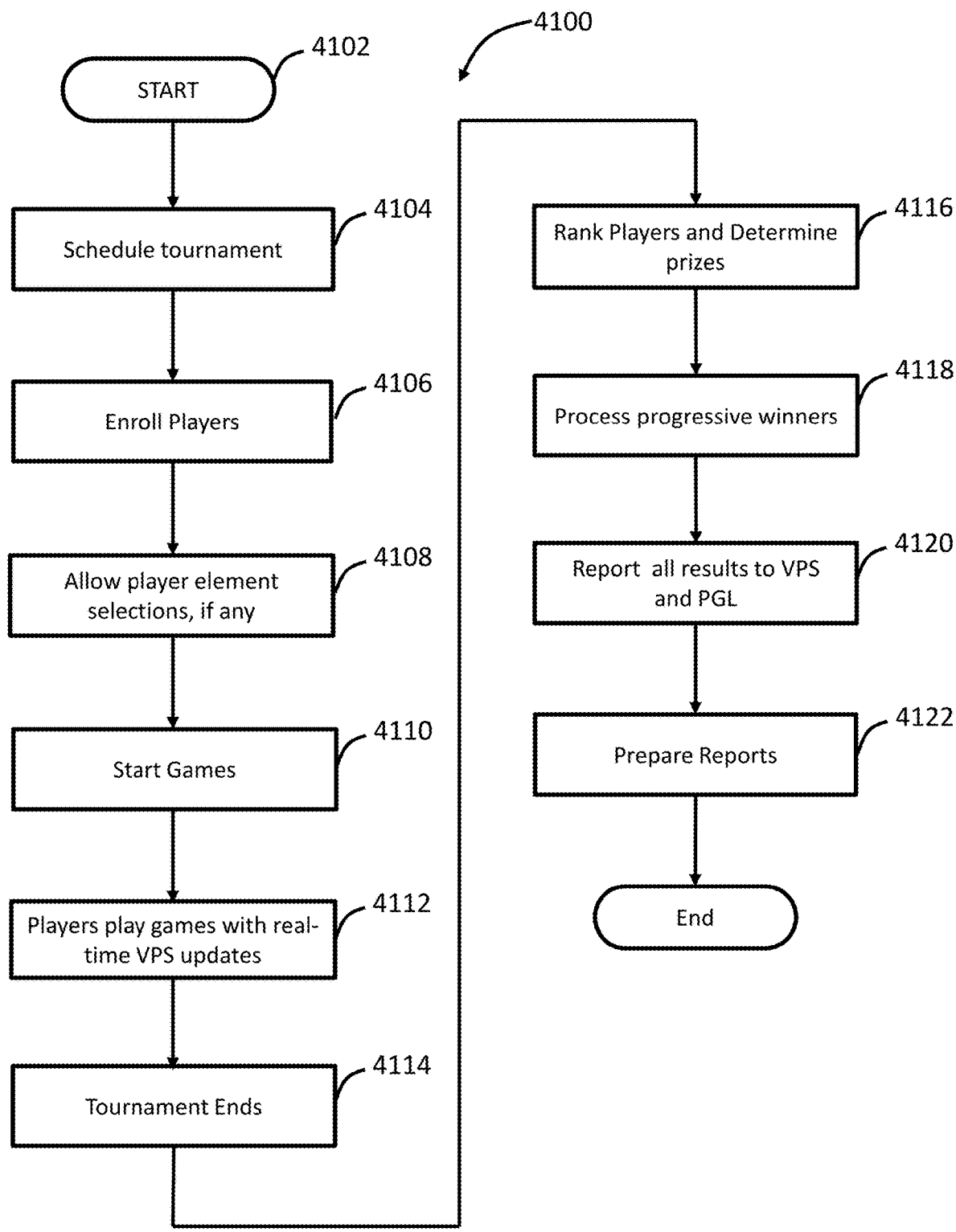
FIG. 41 shows an illustrative process for operating the tournament session.

Referring to FIG. 41 there is shown an illustrative process 4100 for operating the tournament session, which begins at 4102. At block 4104, the tournament session is scheduled as described above in FIG. 40.

The method then proceeds to block 4106 where the process of enrolling players begins, which has been described above. In the illustrative embodiment, players may select a game open for enrollment, as indicated by the green tournament icon 1110 in FIG. 11B. After selecting the tournament session, an enrollment screen as shown in FIG. 13 appears. The time shown 1330 is the time remaining before the start of the tournament.

An illustrative Flash Bingo tournament session information is provided at 1340 and more detailed data is provided when the player selects the GameInfo button 1320. The player may also exit the enrollment process by selecting the Menu button 1310. The illustrative Enter Screen Name prompts the player to enroll as a PGL member, indicating that they are participating in the PGL loyalty program, or as a non-PGL member.

In the illustrative embodiment, the player is then prompted to enter a screen name as shown in FIG. 14. If the player selects an avatar, they will be presented with the screen that provides that function as shown in FIG. 15. The player may then conclude the enrollment by selecting the SIGN-UP button presented in FIG. 16. In the illustrative embodiment, the wager is subtracted from the players account balance when the game session is initiated. Note, if the player does not have sufficient funds in his/her player account, the enrollment will be rejected.

Figure 54:
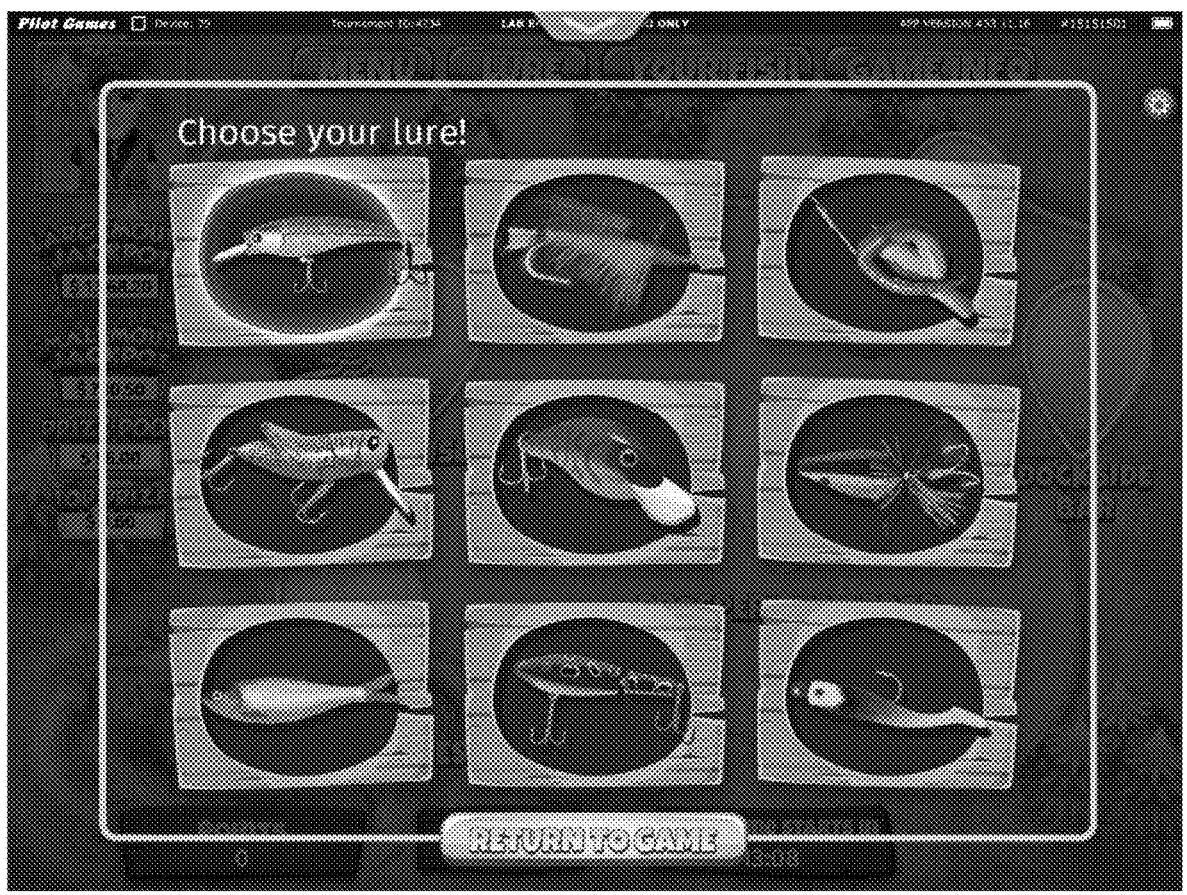
FIG. 54 shows a variety of types of lures the player may select.
Figure 55:
FIG. 55 shows one of three fishing partners the player may select.
Figure 56:
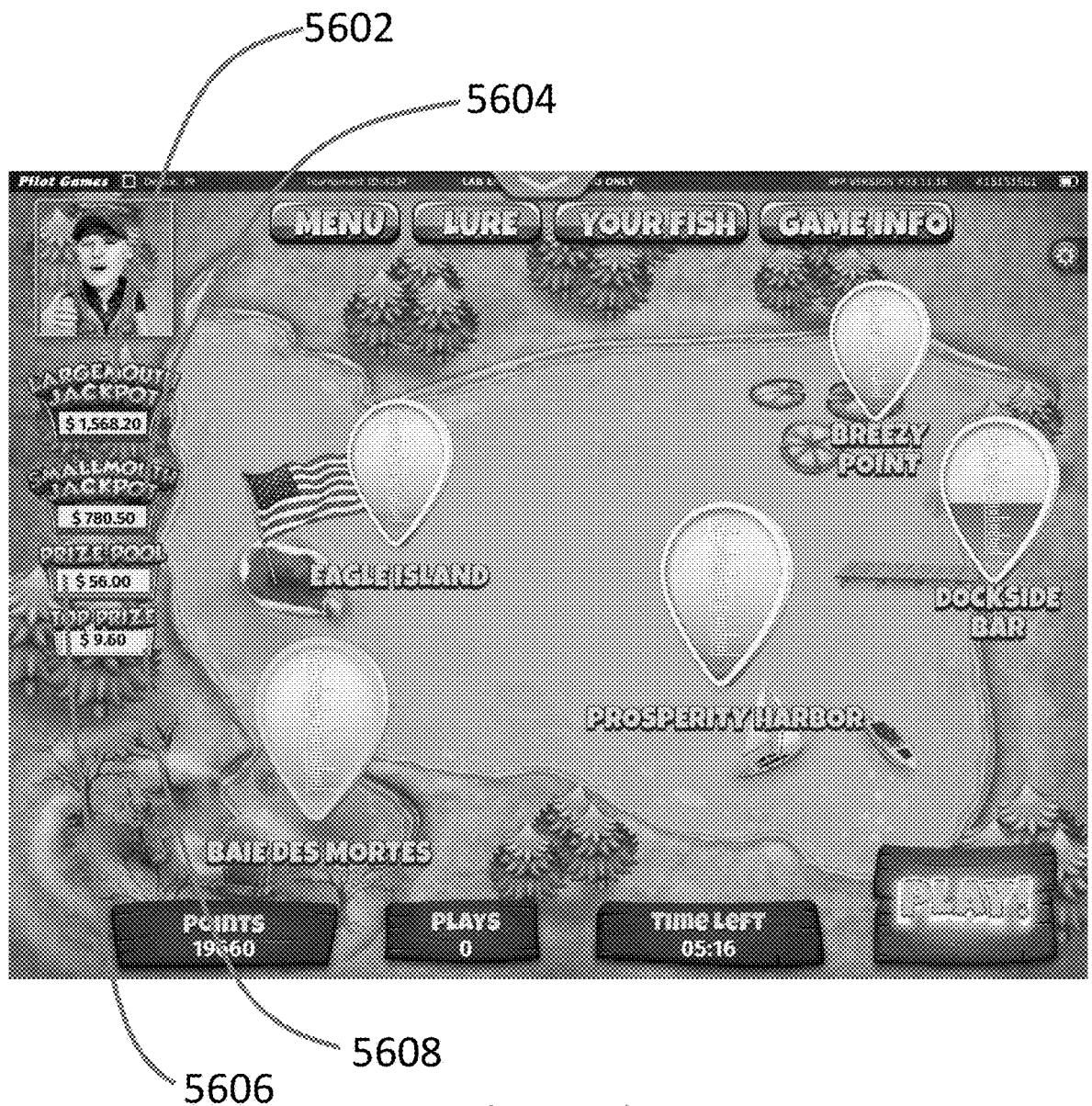
FIG. 56 shows fishing locations on a virtual lake the player may select.

At block 4108, the player may select certain entertainment elements before the tournament session. For example, in the illustrative Fishing Derby Tournament described below in FIG. 42-FIG. 61, the player may select a fishing partner, as shown in FIG. 55. Additionally, the player may select a type of lure as shown in FIG. 54. Furthermore, the player may select a fishing location on a virtual lake, as shown in FIG. 56. Alternatively, if the player does not select certain entertainment elements before the tournament session, default entertainment selections are used.

In some jurisdictions an additional selection of a PLAY button may be required when at the beginning of the tournament session, as shown above in FIG. 18. Note, that sometimes a minimum number of players are required for a particular tournament session and if the number of enrolled players does not equal or exceed the minimum, then the game will be cancelled, and all player funds will be returned to the player accounts of the enrolled players.

At block 4110, the tournament session is initiated. When the tournament session starts, the players proceed to play a plurality of game sessions. In one embodiment, players play their predetermined allotment of game sessions as shown in block 4112. In another embodiment, each player plays game sessions until the tournament time concludes, as specified by the game setup, as previously described.

During game play, the illustrative VPS system 3901 provides periodic updates to all players on the status of the tournament session. The updates are displayed on each of the player's mobile device screens, on the stationary VPS monitors 3914 in the venue, and on other personal devices such as a smartphone.

At block 4114, the tournament session concludes. The method then proceeds to block 4116 where the player point totals are ranked by the illustrative mobile wagering system 3904 (shown in FIG. 39). Additionally, at block 4116, the prizes allocated according to the prize structure are added to the player account totals. Special handling of larger amounts may be required in the event the prize amounts exceed certain jurisdictional and/or IRS mandated values.

One unique feature of the tournament session is that a progressive prize may be awarded for a single game play session during the tournament session. Thus, there may be multiple wins of the same progressive prize during the tournament session. By way of example and not of limitation, at block 4118, the progressive prizes may be awarded at the end of the tournament session. If there are multiple winners of the same progressive prize, then the progressive prize is split among the various winners. Partial pennies are handled according to jurisdictional requirements. In the illustrative embodiment, all cash prizes are added to the player's account balance.

At block 4120, the final status of the tournament session is communicated to the VPS sub-system 3901 and to the Pilot Gambling League (PGL). At block 4122, the final tournament reports may be prepared for management and regulators.

Figure 42A:
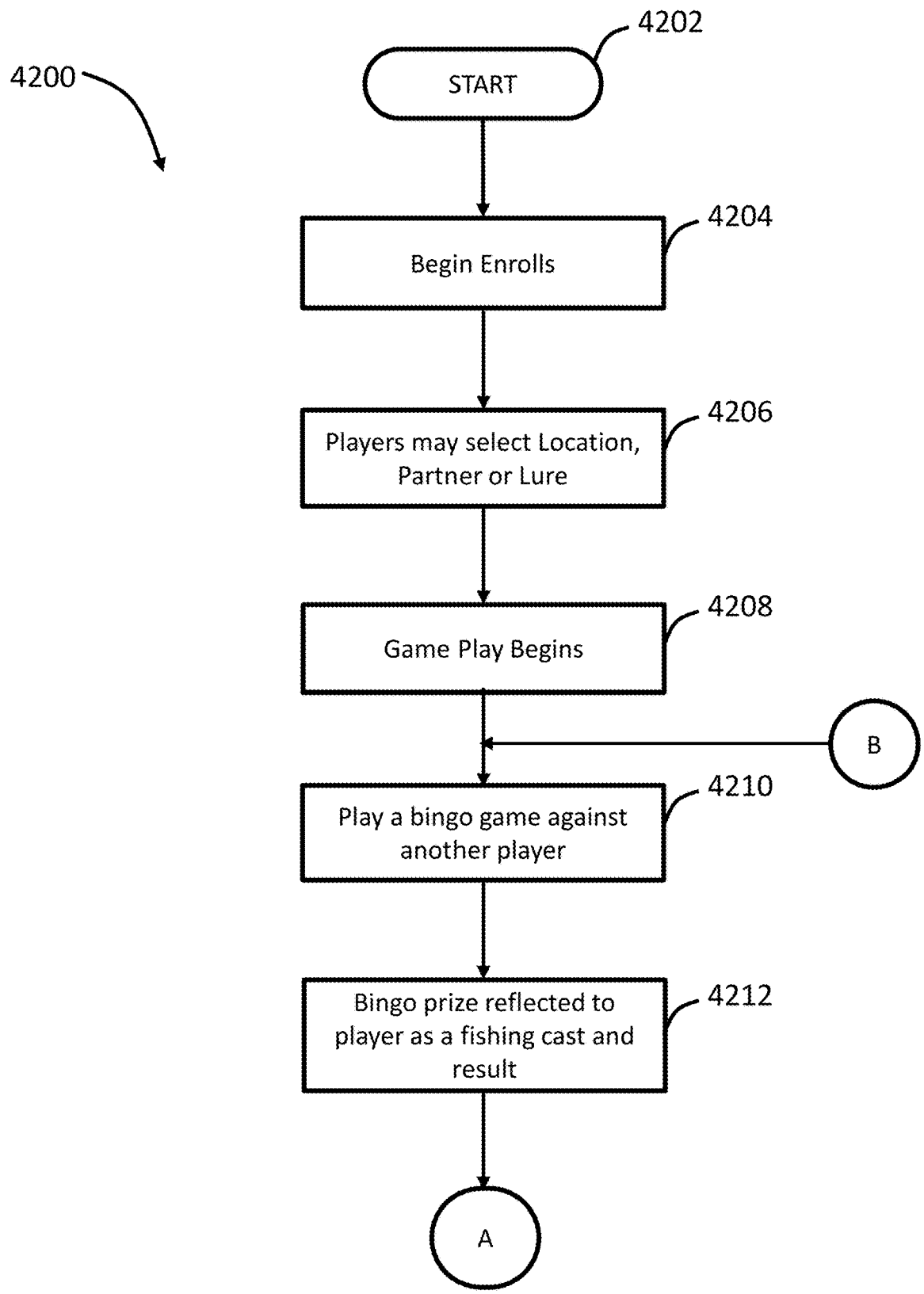
FIG. 42A, FIG. 42B and FIG. 42C shows an illustrative flowchart of a player experience during an illustrative tournament session.
Figure 42B:
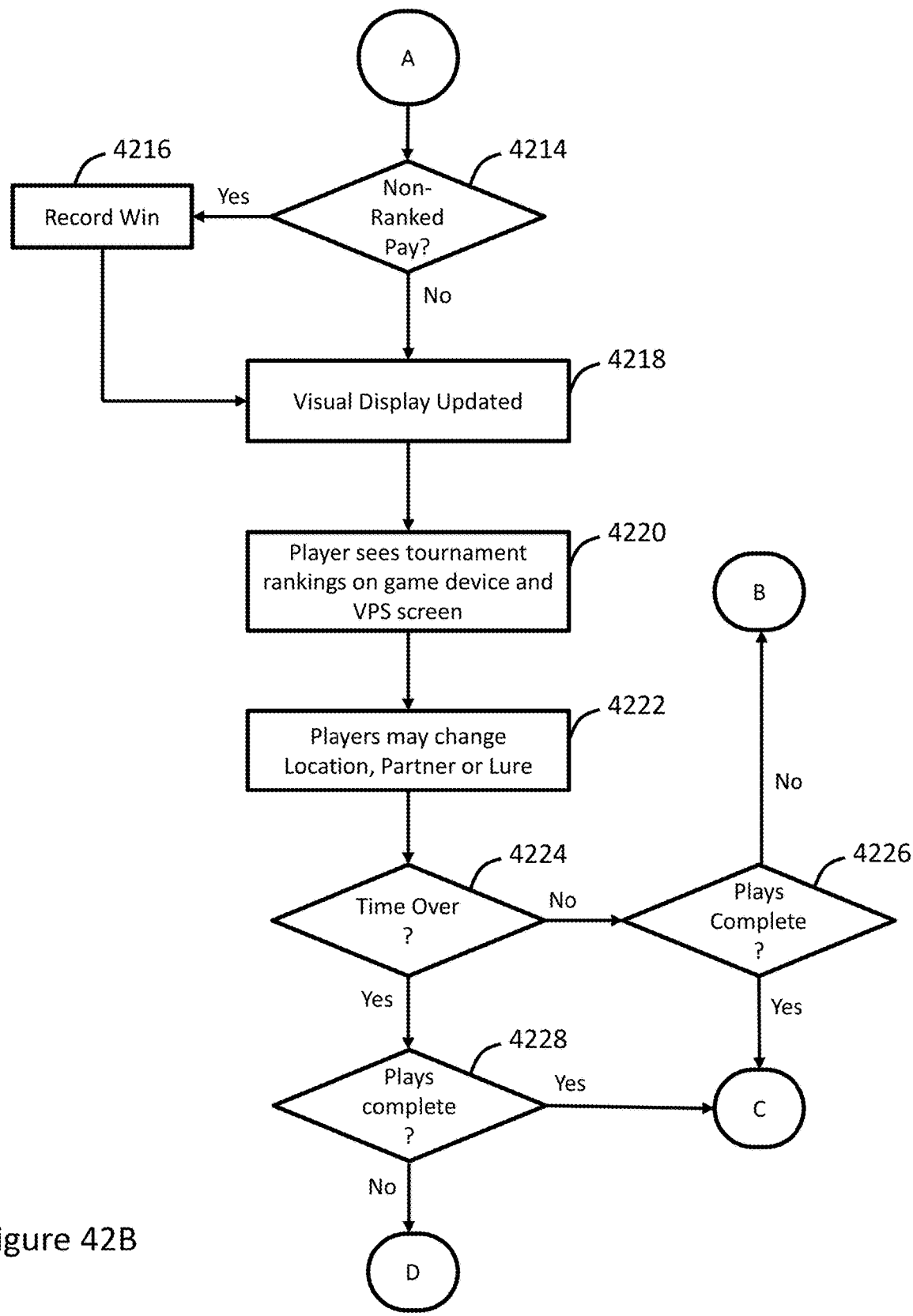
Figure 42C:
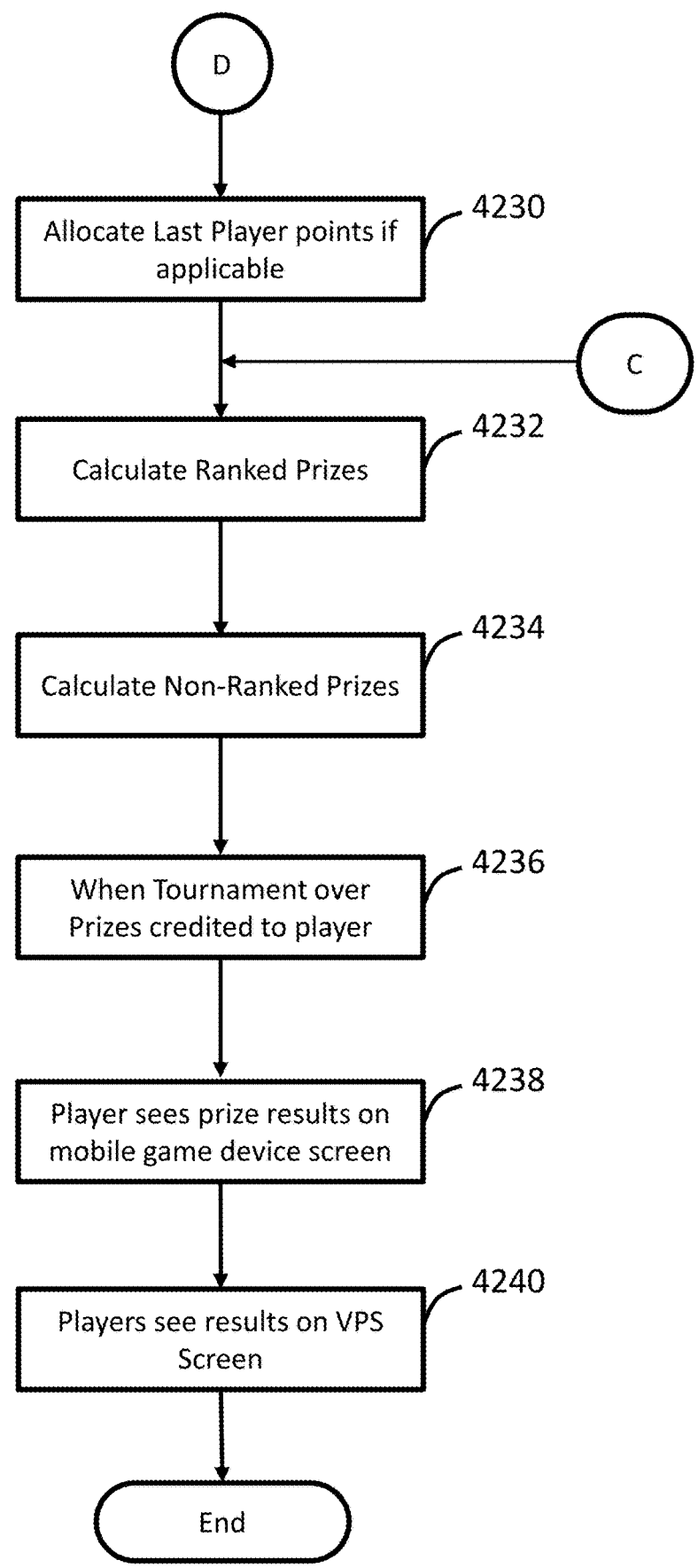

Referring to FIG. 42 there is shown an illustrative flowchart 4200 of a player experience during an illustrative tournament session. In the illustrative embodiment, the tournament session relates to a fishing tournament associated with a Fishing Derby tournament session that is described in further detail in FIGS. 42-61. At 4202, the illustrative Fishing Derby is initiated.

The method proceeds to block 4204 and the player enrolls in the tournament session as previously described in FIG. 40 and FIG. 41.

At block 4206, the player may select entertainment elements specific to the illustrative Fishing Derby as described above in block 4108. Additionally, in the Fishing Derby tournament session the player may select fishing location such as shown in FIG. 56. The player may also select one of three fishing partners as shown in FIG. 55. Additionally, the player may select one of nine lures as shown in FIG. 54. The choices do not affect the play of the game or prizes won. They are entertainment elements to make the game more fun.

Figure 43:
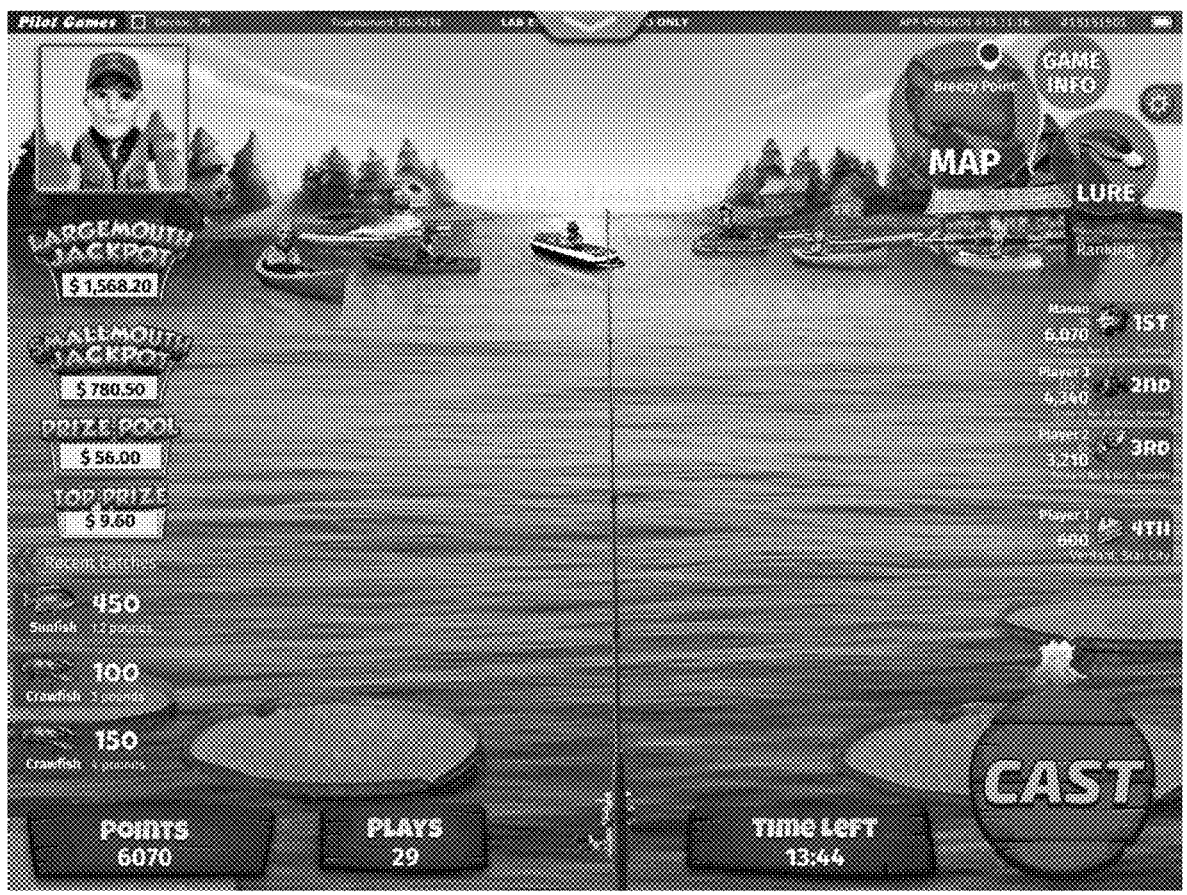
FIG. 43 shows an illustrative screenshot of a selected fishing area.

The method continues to block 4208 where game play for the illustrative Fishing Derby tournament session begins. In the illustrative embodiment, the player is presented with an illustrative screen shot of the selected fishing area as shown in FIG. 43. During the game session, the player selects an area to cast the fishing lure by touching a location on the screen and then activating the CAST button.

At block 4210, the game sessions associated with the Fishing Derby tournament session are bingo driven so that the awarded prize is determined by playing a bingo game with another player. During an illustrative game session, the player selects the CAST button shown in FIG. 43. When the CAST button instruction is received by the illustrative player device 3910 (shown in FIG. 39), a first request is communicated to the mobile gaming sub-system 3904.

The mobile gaming sub-system 3904 then proceeds to pair the first request with a second request from at least one other player. A bingo card is then randomly created by the mobile gaming sub-system 3904 for each player and a common ball draw occurs until winning patterns have occurred for one or more bingo patterns. In the illustrative embodiment, the bingo patterns include a small frame bingo pattern and a four-corner bingo pattern.

A point total is calculated by the mobile gaming subsystem 3904 based on which bingo card obtains the winning bingo pattern, the number of balls that were drawn to obtain the winning bingo pattern and the number of "bonus" balls in each winning pattern. There is shown an illustrative table in FIG. 53 that includes the prizes awarded for the winning four corner bingo pattern and the small frame bingo pattern.

Figure 44:
FIG. 44 shows an illustrative screen shot with the bingo card, ball draw and results displayed on the player's game screen.

During each game session, a response message is sent from the mobile gaming sub-system 3904 to each participating player device 3910 that identifies the card the player was assigned, the ball draw, the results, and the point totals won. In FIG. 44, there is shown an illustrative screen shot with the bingo card, ball draw and results displayed on the player's game screen. The various steps described as part of block 4210 are generally performed rapidly, e.g. in less than one second.

The method then proceeds to block 4212 where the player device 3910 displays the awarded points. Points contribute to a ranked prize, to be awarded at the end of the tournament. In the illustrative embodiment, the player may be awarded points toward a ranked prize or receive a non-ranked prize. A ranked prize relates to awarding a prize based on ranking the points awarded to players participating in the tournament session so that the players are ranked according to their point totals. A non-ranked prize is associated with awarding a player a prize without having to rank the player's point total in relation to the other players. Thus, a player that has achieved a very low ranking may be awarded a non-ranked prize even though said player cannot be awarded a ranked prize because of their low player ranking.

Figure 45:
FIG. 45 shows an illustrative screenshot of a boot, which represents the player not having been awarded any points.
Figure 46:
FIG. 46 shows a fishing bonus which is another symbolic representation for the awarded points.

In one illustrative embodiment of a ranked prize, the awarded points are presented as a caught fish, or other element such as a boot shown in FIG. 45. For example, in FIG. 51 the number of points corresponding with a fish type are described in a "Prize List." In FIG. 44 there is shown the awarded points being displayed as a large mouth bass consistent with the prize list shown in FIG. 51. The illustrative boot presented in FIG. 45 represents the player not having been awarded any points. In FIG. 46, a fishing bonus is presented, which is another symbolic representation for the awarded points.

Figure 47:
FIG. 47 shows the awarded points being displayed as a "bonus win" where the player selects items in a bait shop.
Figure 48:
FIG. 48 shows the awarded points being presented as an animated wheel that shows the awarded points or unranked prizes.

In another illustrative embodiment of the ranked prize, the awarded points may also be displayed as a "bonus win" where the player selects items in a bait shop as shown in FIG. 47. The illustrative bonus win is not related to a secondary bonus game, instead, the illustrative bonus win is presented as representation of the awarded points associated with the bingo game session. In FIG. 47, each item selected in the bait shop by the player may be associated with a number of awarded points. Additionally, as shown in FIG. 48, the awarded points may be presented as an animated wheel that shows the awarded points reflected as an amount of points displayed on the wheel.

Figure 49:
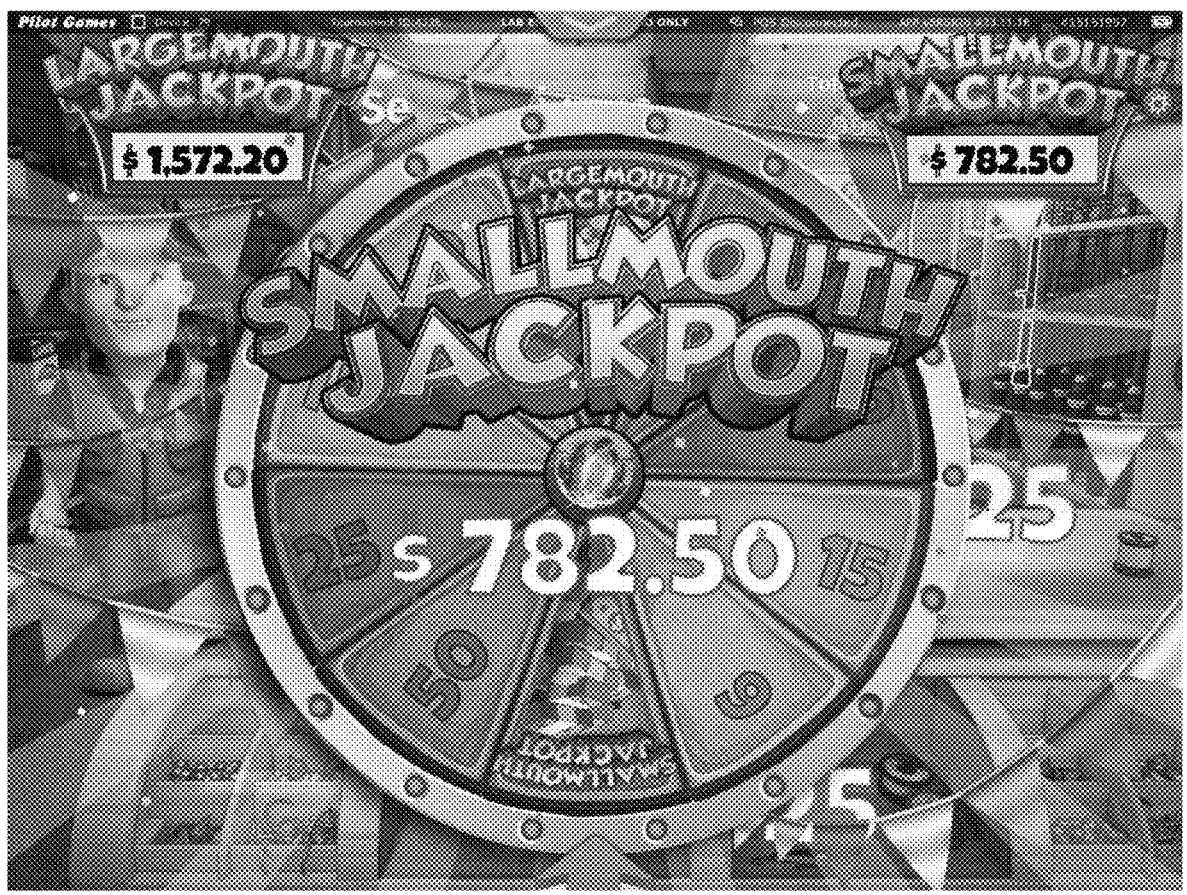
FIG. 49 shows the awarded unranked prize for a Smallmouth Jackpot.
Figure 50:
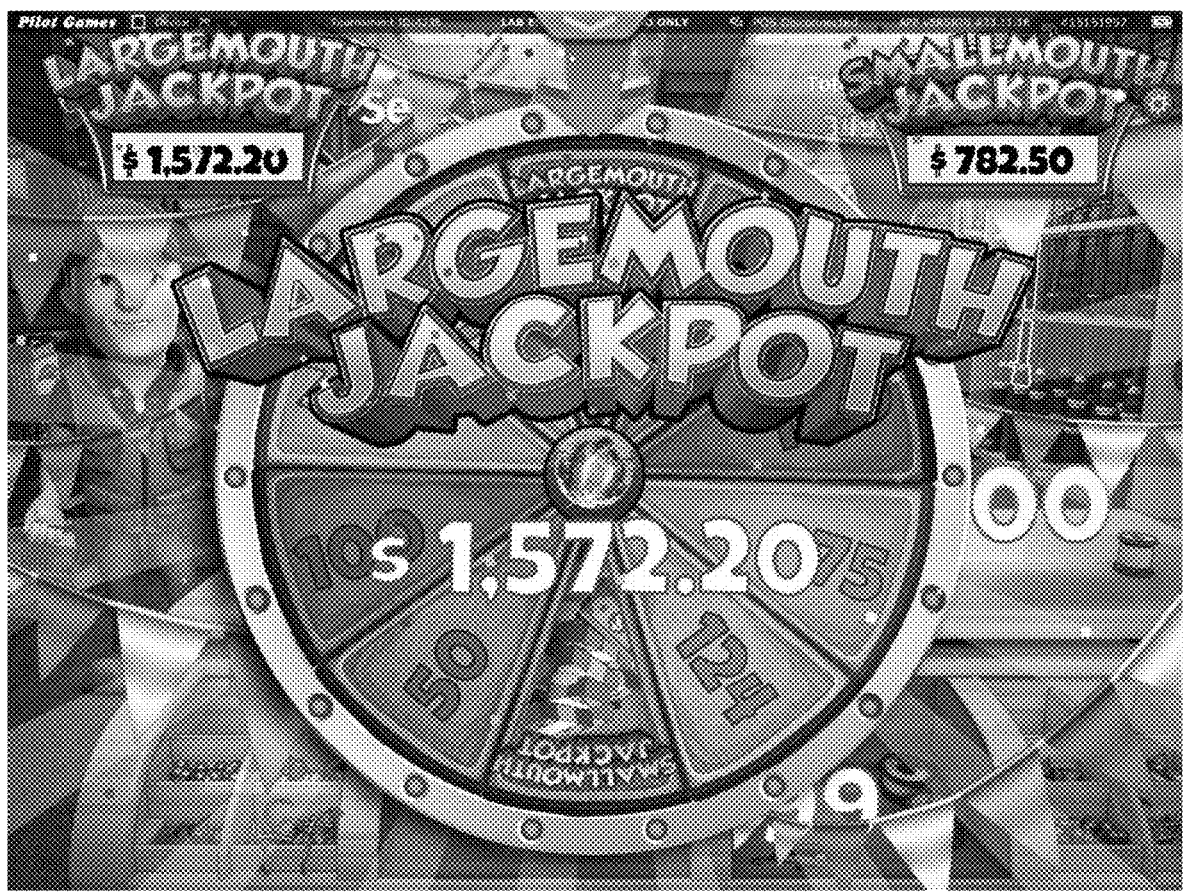
FIG. 50 shows the awarded unranked prize for a Largemouth Jackpot.
Figure 51:
FIG. 51 shows the number of points corresponding with a fish type, which is associated with a "Prize List."
Figure 52:
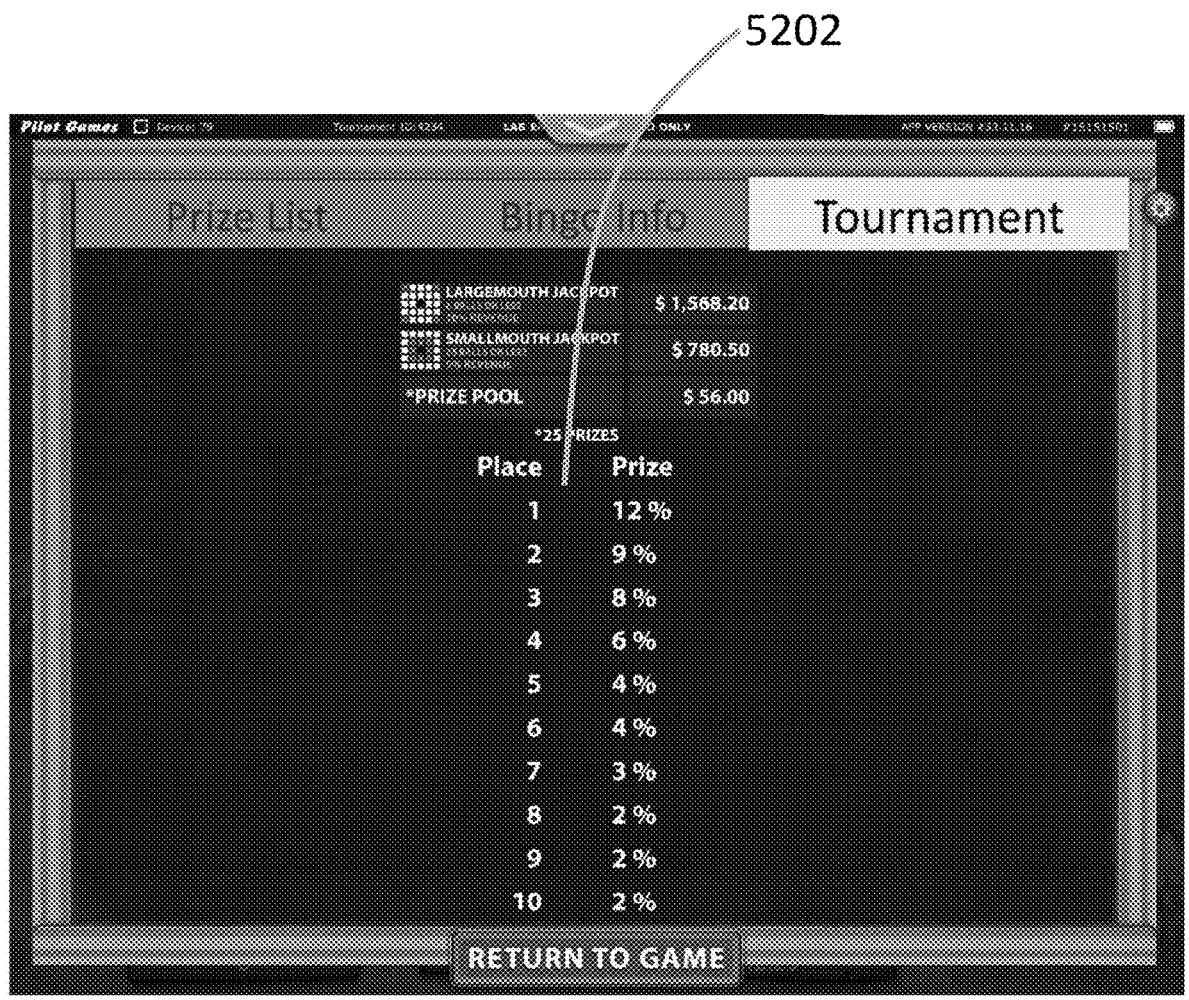
FIG. 52 shows an illustrative pay table with prize percentages.
Figure 53:
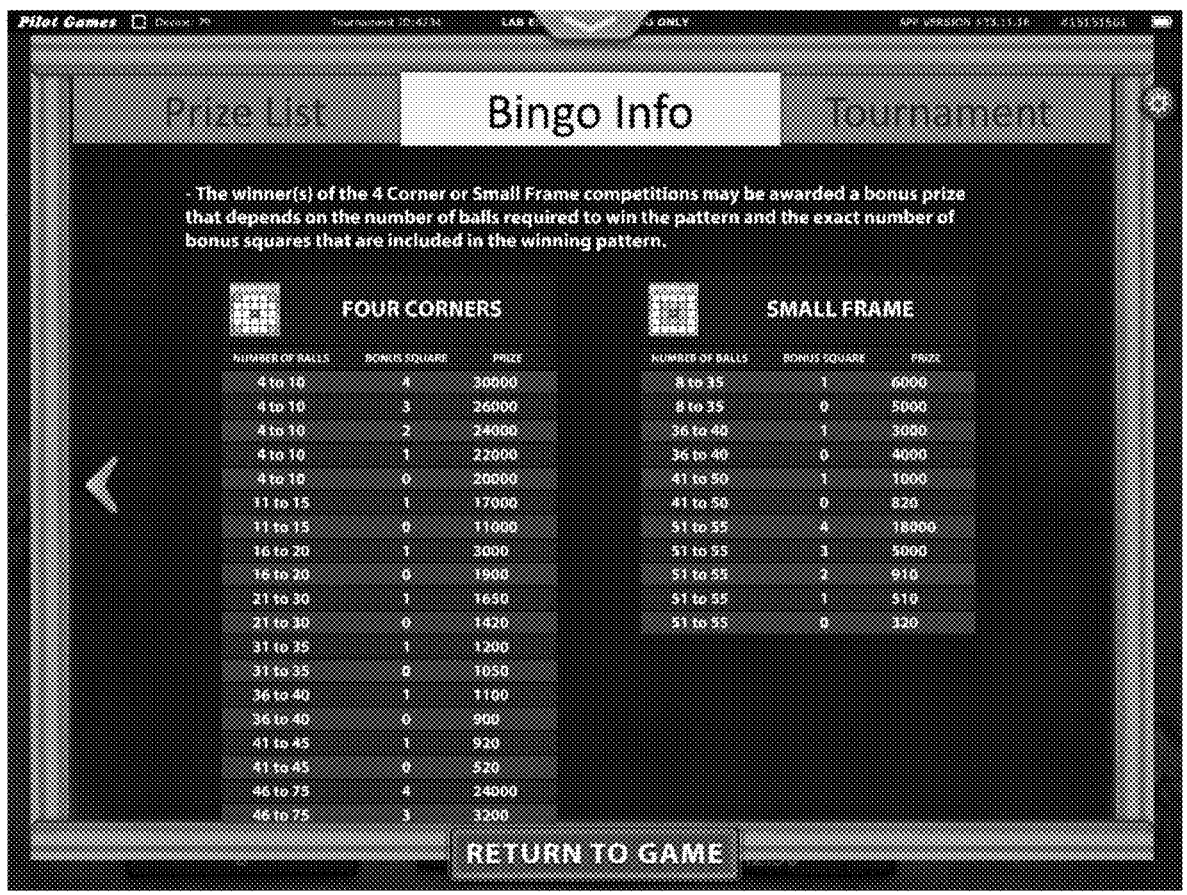
FIG. 53 shows an illustrative table that includes the points awarded for the winning four corner bingo pattern and the small frame bingo pattern during the bingo game play session.

With respect to a non-ranked prize, awarded points may be displayed as a progressive prize that is awarded during a game session when a particular bingo pattern is obtained under a predetermined number of ball draws as shown at the top of FIG. 52. The awarded progressive prize may be presented as a bait shop bonus that includes the wheel shown in FIG. 48; and, subsequently, the wheel rotates and stops at one of a Smallmouth Jackpot or a Largemouth Jackpot as shown in FIG. 49 and FIG. 50, respectively.

The progressive prize is associated with a non-ranked win, in which the non-ranked win is independent of the total point ranking of the player. Thus, if the player wins the non-ranked prize, e.g. the progressive prize, the player is awarded the progressive prize even if the player is ranked in last place is unable to be awarded a ranked prize. If more than one player hits the progressive in the course of a single tournament, then the process would normally be to split the progressive between the winners, but alternative handling may be required based upon marketing and jurisdictional regulations. Furthermore, in other game implementations, non-ranked prizes may include cash prizes or a tangible prize, like a car. These non-ranked prizes may also be awarded based on a single game session event and be independent of total point rankings associated with the tournament session.

At decision diamond 4214, a determination is made whether a non-ranked prize is awarded. If a non-ranked prize is awarded, the win and gaming event is recorded as shown in block 4216. The non-ranked prize win and related gaming events are recorded because the non-ranked prizes are typically larger then the ranked prize wins. The larger prizes typically require additional manual or electronic processing as specified by jurisdictional and/or federal IRS requirements. In addition, the recording of these wins allows for a determination of the final pay amount at block 4234 which may be determined based on the number of winners of a specific non-ranked prize.

At block 4218, the visual display is updated. More specifically, as the tournament session continues, the player devices 3910 and the stationary display 3914 (shown in FIG. 39) are updated to show the current display tournament rankings, screen names, avatars and locations of other players as shown in FIG. 22 and FIG. 57.

Referring to FIG. 57 there is show the updated VPS display of tournament rankings, screen names, avatars and physical locations of other players during a flash bingo tournament. The illustrative host 5702 may be a live host (a live person) or a virtual host such as an artificial intelligence (AI) host that comments on the game tournaments during tournament game play. The live host 5702 may also be referred to as a host, hostess, TV host, presenter, TV presenter, game presenter, master of ceremonies, MC, narrator, commentator or other such person that guides or introduces the game tournament and describes tournament game play such the points awarded to a player in a particular virtual location.

Generally, the host 5702 provides commentary about the game tournament using enhanced visual representations of the tournament game session. In one embodiment, the enhanced visual representations are controlled by the host 5702. By way of example and not of limitation, the illustrative enhanced visual representations are not controlled by the tournament game players.

The host may be displayed on gaming clients 2302 and 2304 or on a networked display 2300 which are shown above in FIG. 23. The networked display 2300 may also be referred to as "PilotTV." By way of example and not of limitation, the gaming clients described above are configured to display PilotTV content or other such video broadcast content that includes the live host or AI host. The live video broadcast content may be generated in a television studio, television production studio or other such video production location capable of recording live content.

The illustrative screenshot in FIG. 57 also shows the updated VPS display and various tournament prize including, but not limited to, a first prize of $792, a second prize of $594, a third prize of $528, a fourth prize 396 and a fifth prize of $264.

The progressive gaming module is communicatively coupled to a plurality of gaming clients. Each gaming client allocates a percentage of one or more wagers to a progressive pool. Typically, the progressive pool begins with a seed prize and increases with a portion of the wagers received from the gaming clients that are communicatively coupled to the progressive gaming module.

In the illustrative embodiment, the progressive gaming module can communicate with a tournament server when the gaming system is in a tournament session. In the illustrative embodiment, the tournament session includes a limited number of game sessions. In another illustrative embodiment, the tournament session includes a limited number of game sessions that are played during a fixed time period.

In the illustrative embodiment, one or more tournament prizes are awarded to the top ranked players having the highest number of points. In the illustrative embodiment, the tournament prize is referred to as a "prize pool." The prize pool is awarded to the player with the most points at the completion of the tournament session. The prize pool may award a fixed prize that is based on the number players participating in the tournament session. Alternatively, the tournament prize pool may be based on a portion of the wagers received by the gaming clients, i.e. the tournament prize pool may be a progressive prize that is awarded to the player or players with the most accumulated points at the completion of the tournament session.

Figure 59:
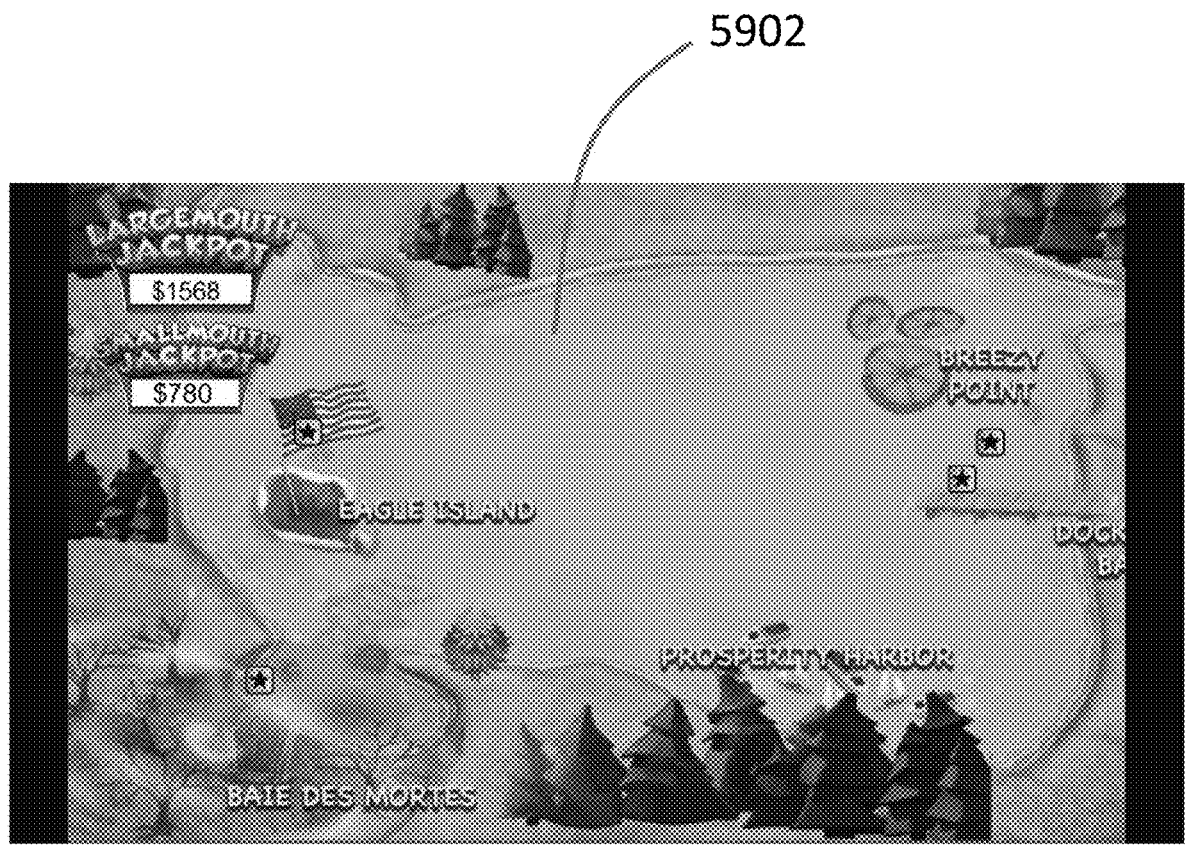
FIG. 59 shows updated entertaining game-based data that includes the virtual lake location where players are fishing.
Figure 60:
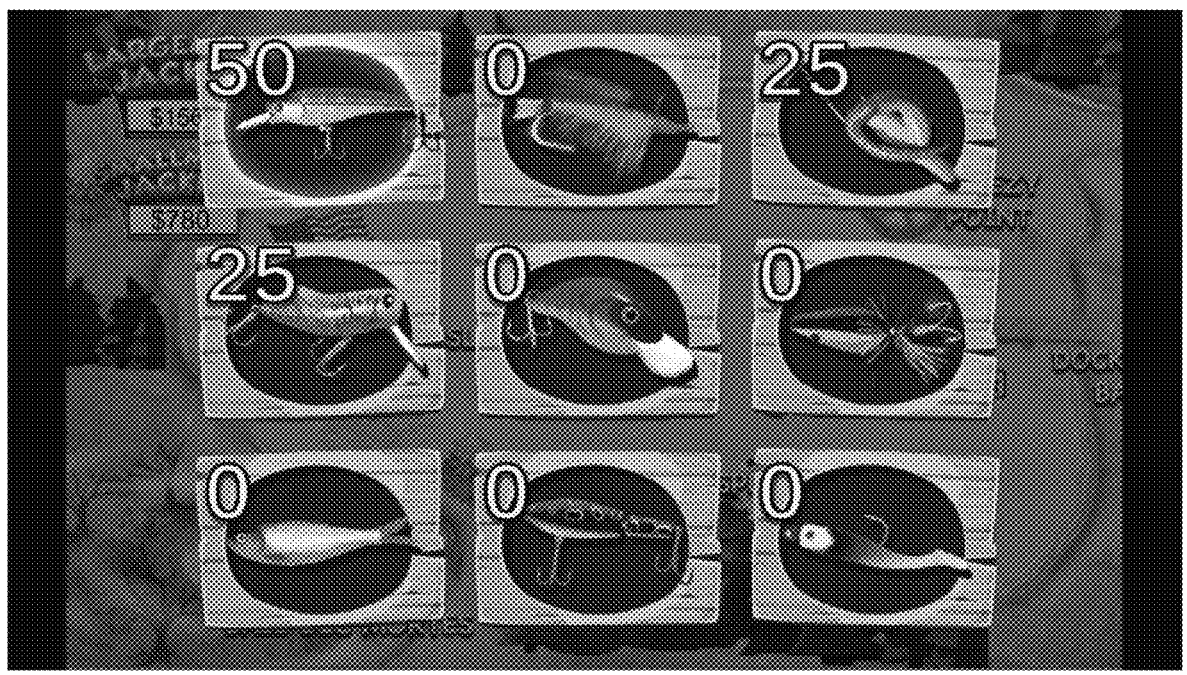
FIG. 60 shows updated entertaining game-based data related to the type of lure players have chosen during a tournament.
Figure 61:
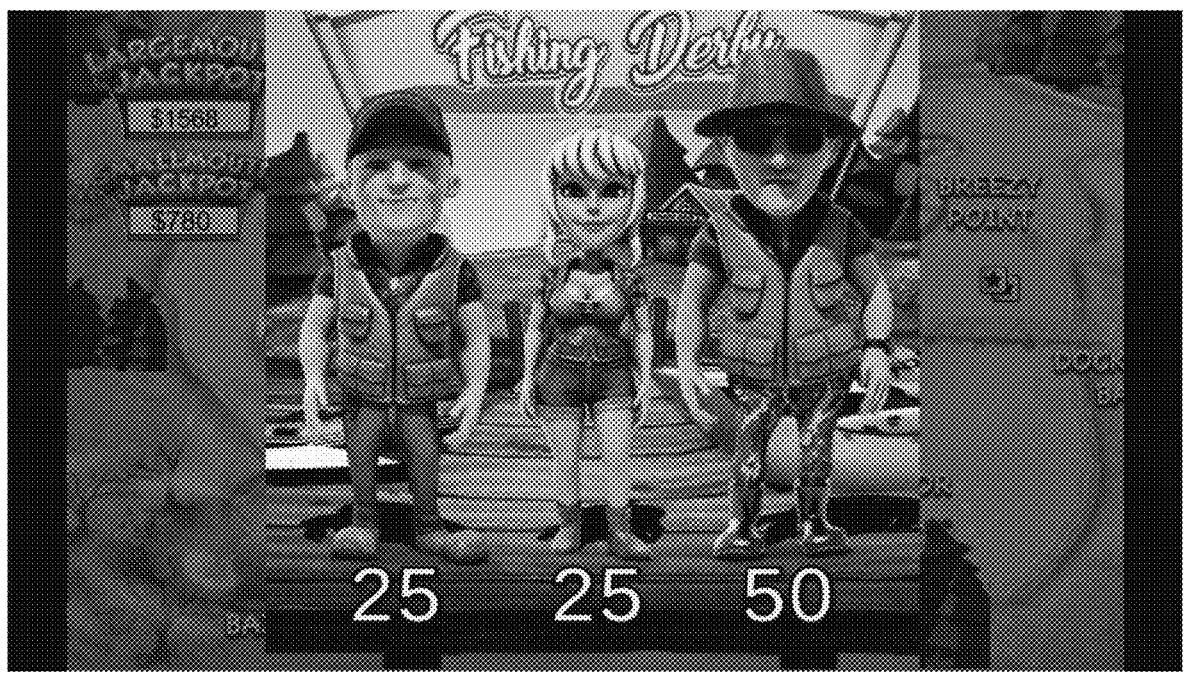
FIG. 61 shows the updated entertaining game-based data showing the percentage of players selecting each fishing buddy.

Additionally, the visual presentation sub-system can present updated entertaining game-based data to the player devices 3910 and stationary display 3914. The updated entertaining game-based data may include the points awarded to other players that participated in the tournament session that were selected by the player. Additionally, the updated entertaining game-based data may be related to the type of lure as shown in FIG. 60. Furthermore, updated entertaining game-based data may include the virtual lake location where players are fishing as shown in FIG. 59.

Further, the interactive control module 3906 and 3908 (shown in FIG. 39) integrates live game play data with virtual environments. The interactive control module 3906 and 3908 renders a display containing all or a subset of the information about the state of the game and may show the player's state of the game in a two-dimensional environment or a three-dimensional environment.

For example, an immersive virtual environment can be created by combining the 2D representation of the "Wampum Lake" fishing locations shown in FIG. 56 with live tournament data. The illustrative immersive virtual environment generates a 3D model of the virtual lake that a player navigates in a virtual ride across the lake. The immersive virtual environment shows virtual boats corresponding to live players at their chosen point of play with their actual screen names and points.

In FIG. 56 there is shown updated entertaining game-based data that includes the virtual lake location where players are fishing. In the illustrative embodiment, there are two different progressive prizes described as "large mouth jackpot" 5602 and "small mouth jackpot" 5604 that may be awarded at the end of each game session. In the illustrative embodiment, both of these "jackpot" prizes are progressive prizes that can be awarded at the game session, but independent of the player ranking. By way of the example and not of limitation, the large mouth jackpot 5602 progressive prize may be associated with a four corner's bingo pattern and the small mouth jackpot progressive prize 5604 may be associated with the small frame bingo pattern.

There may be many tournament prizes that are awarded based on the player's ranked position of total points at the conclusion of the tournament session which are presented a prize pool 5606 of $56.00 or a top prize 5608 of $9.60.

The awarded prizes are split when two or more players complete the tournament session with the same number of points. More particularly, if two or more players finish with the exact same number of points, their prize is the sum of the prizes for those finishing positions divided by the number of winners. For example, if $1^{st}$ place was to receive $100 and second place was to receive $50, and the top 2 finishers in the tournament both received 10,000 points, then the total of $150 is divided by two so that each player receives $75.

With respect to progressive prizes, in which two or more players achieve the winning progressive paying pattern, the progressive prize is evenly split between the two or more players having the winning progressive paying pattern. For example, if multiple players achieve the winning progressive paying pattern during a tournament session, then the amount paid to each player is the total progressive amount divided by the number of winners.

FIG. 58 provides an illustrative screen shot of the immersive virtual environment that combines live tournament data being with the fishing locations of other players. The player devices 3910 and stationary display 3914 shows the rendered data corresponding to the immersive virtual fishing environment. The immersive data may also be accessed by a player's own smartphone or other personal device.

The method continues to block 4222 where the player may change their location, partner or lure.

At decision diamond 4224, the mobile wagering sub-system 3904 determines whether the time for the tournament session is concluded. If the determination at decision diamond 4224 is that the time for tournament session is not completed, the method proceeds to decision diamond 4226.

At decision diamond 4226, a determination is made whether the player has completed their game play allotment. If the player has not completed their game play allotment of game sessions, the method returns the player to block 4210 where the player continues playing the next game session.

However, if the player has completed their game play allotment of game session at decision diamond 4226, then the final prize calculations are performed at block 4232 when the tournament session is complete. An illustrative pay table with prize percentages is shown in FIG. 52.

If, at decision diamond 4224, the mobile wagering sub-system 3904 determines that the time for the tournament session is over, then the method proceeds to decision diamond 4228.

At decision diamond 4228 a determination is made whether the player has completed their game play allotment.

If the player has completed their game play allotment, the method proceeds to block 4232. However, if the tournament is complete (in view of decision 4224) and the player's allotment of games has not been completed, then the player may be eligible for an additional point allocation, as specified by the parameters of the chosen tournament type, at block 4230 because the player was trying to complete a game session and there was no other player to play against.

The method then continues to block 4232 where the final ranking of players is determined, and prizes are allocated according to the tournament game parameters. At block 4234, any non-ranked prizes are credited to players.

The method continues to block 4236 where prizes are credited to the player when the tournament session is over. At block 4238, the players are presented with the final tournament results on the game device screen as shown previously in FIG. 21.

Additionally, at block 4240, the players may also be presented with the results at the stationary screen 3914 which is communicatively coupled to the video presentation sub-system 3901.

The illustrative tournament session associated with FIG. 42 is then concluded.

Referring back to FIG. 52, there is shown an illustrative paytable 5202 based on percentages of the total tournament monies that are awarded at the completion of the tournament session. In FIG. 57, the paytable 5202 is applied to a tournament session prize of $6600.

FIG. 57 also shows a variety of prizes below the image of the live host 5702. The displayed prizes include the first place prize 5704 of $792, the second place prize 5706 of $594, the third place prize 5708 of $528, the fourth place prize 5710 of $396 and the fifth place prize 5712 of $264. Note, an additional set of five additional prizes are not presented in the FIG. 57 screenshot. When all the prizes in FIG. 57 are combined with the pay table percentages of FIG. 52, the total tournament session prizes total $6600. At the end of the tournament session, the players with the highest point total wins the first place prize, the player with the second point total wins the second place prize, and so on until the top ten highest point totals are awarded prizes.

When two or more players have the same total points, the tournament prize may be divided up by the players rank at the conclusion of the tournament. In this circumstance, the players having the same point total divide the awarded prizes. For example, if the the second place player, third place player and fourth place player have the same total point score at the end of the tournament session shown in FIG. 57, then the prizes are divided between the players; the prizes are divided by combining the second place prize 5706 of $594, the third place prize 5708 of $528, and fourth place prize 5710 of $396, which totals $1,518, and then dividing the total by the three. The resulting divided prize is $506. Thus, the three players that had the same point total at the completion of the tournament session are each awarded a prize of $506.

Referring to FIG. 58 there is shown an illustrative screen shot of a virtual world that is controlled by the illustrative live host 5702 shown in FIG. 57. The illustrative virtual world 5802 is a three-dimensional virtual world that can be viewed by the live host 5702. The three-dimensional view shown in screenshot 5802 presents the other boats, i.e. players, that are fishing in a particular location. The screenshot 5802 presents a view from the perspective of another watercraft navigating through the three-dimensional virtual world.

However, the virtual world 5802 may not be displayed on the gaming client unless the live host 5702 determines that the virtual world 5802 should be presented to the gaming clients. Generally, virtual worlds are controlled by the player. On this illustrative embodiment, the virtual world 5802 is controlled by the live host. Thus, the live host determines whether the screen shot 5802 is shared with the bingo gaming clients and the virtual world 5802 may or may not be visible to the players participating in the tournament session. The virtual world 5802 may also be presented on a networked display such as PilotTV, which may also occur at the discretion of the live host 5702.

During the live video broadcast content, the live host 5702 may identify one or more locations in the virtual world. The live host 5702 may travel to one or more locations in the virtual world and provide real-time updates on the points awarded to one or more gaming clients at the virtual world location.

The live host 5702 may alternatively elect to share content as shown in FIG. 59, which shows a screenshot 5902 of a two-dimensional top view of the virtual lake location. The screenshot 5902 is similar to an animated map. More specifically, the screenshot 5902 includes a top view of a map that includes "Eagle Island," which is similar to a birds-eye view. Referring back to FIG. 58, a three-dimensional view of "Eagle Island" is presented from the perspective of a virtual boat travelling in the three-dimensional virtual world 5802.

The live host 5702 can decide to transition from a two-dimensional birds-eye view 5902 to a three-dimensional virtual world view 5802 that simulates the view from a watercraft. The live host may also elect to provide a studio backdrop as shown in FIG. 57. The live host may alternate between these views to add excitement to the game play while commenting on the points awarded during the tournament session. Thus, the live host is able to update players about the game play during the tournament session and simulate a sport fishing tournament, e.g. pro bass tournament fishing, in an exciting and interactive manner.

The illustrative gaming systems and methods presented above may include a plurality of server applications that are configured to provide high-availability and redundancy, processes all inputs, generates outputs, and maintains a central database for accounting, game play, system configuration data, and other such data types. By way of example and not of limitation, critical system data regarding clients may be maintained a repository associated with the illustrative gaming system. Historical games results, and leader board information may be maintained. Printable versions of this information may be available on the portal.

The illustrative client devices described in the illustrative embodiments are communicatively coupled to a gaming system database, which stores client device data. Additionally, the illustrative gaming system database is configured to be secure. Furthermore, the illustrative gaming system database manages the data that is received from client devices in geographically dispersed gaming venues.

The illustrative centralized gaming system may be disposed in a central site as described herein. The illustrative centralized gaming system may process information received over the internet backbone from client devices such as mobile devices, management terminals and other such client devices.

The illustrative MWS sub-system manages the funding of game play and operation of wagering games and overall system management. All gaming messaging between servers and client devices is sent and received over a secure internet network that directs network traffic to the appropriate server elements. A Portal service receives messages from management terminals and provides functionality to authorized users to control the system and access real-time and historical data. All server applications are structured to be deployable in a virtual server environment, configured for high-availability with fail-over capabilities on hardware components and database structures that keep a multiplicity of all data records.

By way of example and not of limitation, the games supported by the wagering system include electronic pull-tabs, linked bingo, high-speed linked bingo with entertainment, bingo tournaments, slot games, video poker, multi-player poker, black-jack, roulette, and other casino or non-casino based entertainment games.

Many game types, including electronic pull-tabs and the entertainment aspect of linked bingo have bonus modes that award prizes based on a theme-specific animation. Often these features take more play time than a conventional game. While these features are entertaining, many players who have played the games for some period of time find the time spent in animation wasteful. Therefore, this system features a unique option at the beginning of any potentially long bonus animation. The player is presented with a screen announcing the bonus and then is presented with an option to proceed with the bonus animation or bypass the animation and go directly to the prize award at the end of the animation.

It is clear that the infrastructure of the MWS with the added capabilities of the VPS can support a wide variety of game types, in addition to the ones described herein. Those games include slot machine games, video lottery games, poker, blackjack, skill-based wagering games, among others previously mentioned.

It should be noted that in jurisdictions that allow gaming outside of physically licensed areas some of the above-mentioned security considerations may be relaxed or replaced by more appropriate mechanisms. It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A gaming system operating a virtual world gaming tournament, the gaming system comprising:
   a plurality of gaming clients that are communicatively coupled through at least one of a Wi-Fi, a Local Area Network (LAN), a Wide Area Network (WAN), and any combination thereof to a wagering sub-system that receives a wager from each of the gaming clients, wherein each of the plurality of gaming clients includes a display screen and a network interface component supporting communications over at least one of the Wi-Fi, the Local Area Network, the Wide Area Network, and any combination thereof, and wherein the wagering sub-system includes one or more distributed servers coupled to the WAN through a router and firewall;
   a virtual world having a plurality of locations, in which each gaming client is associated with at least one location in the virtual world;

a tournament session that includes a plurality of predetermined game sessions for each gaming client, in which the tournament session begins at a particular time and the tournament session ends when the predetermined number of game sessions have been played;

each game session for each gaming client associates a random game outcome with a symbolic representation that is displayed at the location in the virtual world associated with the gaming client;

the random game outcome associated with each game session for each gaming client is further associated with one or more points that are displayed in the virtual world associated with the gaming client;

a live host that identifies to one or more locations in the virtual world, in which the live host provides updates on the points awarded to one or more gaming clients at the virtual world location;

wherein the live host selectively broadcasts at least one of a first virtual world and a second virtual world during the tournament session, in which the live host broadcast is displayed on at least one of a networked display and the gaming clients;

a tournament prize associated with the tournament session, in which the tournament prize is displayed on each gaming client; and the tournament prize is awarded to one or more gaming clients displaying a highest point total upon completion of the tournament session.

2. The gaming system of claim 1 wherein the live host is displayed on the gaming client.

3. The gaming system of claim 1 further comprising at least one progressive prize that receives a portion of each wager received by the wagering sub-system;

the progressive prize associated with the tournament session, in which the progressive prize is displayed on each gaming client; and wherein the progressive prize is awarded to each gaming client at the completion of the game session when the random game outcome corresponds to being awarded the progressive prize.

4. The gaming system of claim 1 wherein the gaming tournament includes a linked bingo tournament that includes a plurality of bingo gaming clients, a plurality of bingo game sessions and a plurality of bingo game outcomes.

5. The gaming system of claim 1 wherein the live host selects locations in the virtual world and provides updates about game play in the virtual world gaming tournament.

6. The gaming system of claim 1 wherein each gaming client in the tournament session receives a same wager from each gaming client.

7. The gaming system of claim 1 wherein the symbolic representation associated with the random outcome includes a point value and a symbolic object that is associated with the point value.

8. A bingo gaming system operating a virtual world gaming tournament, the gaming system comprising:

a plurality of bingo gaming clients that are communicatively coupled through at least one of a Wi-Fi, a Local Area Network (LAN), a Wide Area Network (WAN), and any combination thereof to a bingo wagering sub-system that receives a wager from each of the bingo gaming clients, wherein each of the plurality of bingo gaming clients includes a display screen and a network interface component supporting communications over at least one of the Wi-Fi, the Local Area Network, the Wide Area Network, and any combination thereof, and wherein the bingo wagering sub-system includes one or more distributed servers coupled to the WAN through a router and firewall;

a virtual world having a plurality of locations, in which each bingo gaming client is associated with at least one location in the virtual world;

a bingo tournament session that includes a plurality of predetermined bingo game sessions for each bingo gaming client, in which the bingo tournament session begins at a particular time and the bingo tournament session ends when the predetermined number of bingo game sessions have been played;

each bingo game session for each bingo gaming client associates a random bingo game outcome with a symbolic representation that is displayed at the location in the virtual world associated with the bingo gaming client;

the random bingo game outcome associated with each bingo game session for each bingo gaming client is further associated with one or more points that are displayed in the virtual world associated with the bingo gaming client;

a live host that identifies to one or more locations in the virtual world, in which the live host provides updates on the points awarded to one or more bingo gaming clients at the virtual world location;

wherein the live host selectively broadcasts at least one of a first virtual world and a second virtual world during the tournament session, and the live host broadcast is displayed on at least one of a networked display and the gaming clients;

a tournament prize associated with the tournament session, in which the tournament prize is displayed on each bingo gaming client; and the tournament prize is awarded to one or more bingo gaming clients displaying a highest point total upon completion of the tournament session.

9. The bingo gaming system of claim 8 wherein the live host is displayed on the bingo gaming client.

10. The bingo gaming system of claim 8 further comprising at least one progressive prize that receives a portion of each wager received by the bingo wagering sub-system;

the progressive prize associated with the tournament session, in which the progressive prize is displayed on each bingo gaming client; and wherein the progressive prize is awarded to each bingo gaming client at the completion of the bingo game session when the random game outcome corresponds to being awarded the progressive prize.

11. The bingo gaming system of claim 8 wherein the live host selects locations in the virtual world and provides updates about game play in the virtual world gaming tournament.

12. The bingo gaming system of claim 8 wherein each bingo gaming client in the tournament session receives a same wager from each bingo gaming client.

13. The bingo gaming system of claim 8 wherein the symbolic representation associated with the random outcome includes at least one bingo card, a point value and a symbolic object that is associated with the point value.

14. A bingo gaming method for conducting a linked bingo tournament, the method comprising:

communicatively coupling a plurality of bingo gaming clients through at least one of a Wi-Fi, a Local Area Network (LAN), a Wide Area Network (WAN), and any combination thereof to a bingo wagering sub-system that receives a wager from each bingo gaming client, wherein each of the plurality of bingo gaming clients includes a display screen and a network interface component supporting communications over at least one of the Wi-Fi, the Local Area Network, the Wide Area Network, and any combination thereof, and wherein the bingo wagering sub-system includes one or more distributed servers coupled to the WAN through a router and firewall;

generating a virtual world having a plurality of locations, in which each bingo gaming client is associated with at least one location in the virtual world;

initiating a tournament session that includes a plurality of predetermined bingo game sessions for each bingo gaming client, in which the tournament session begins at a particular time and the tournament session ends when the predetermined number of bingo game sessions have been played;

associating each bingo game session and the corresponding random bingo game outcome with a symbolic representation that is displayed at the location in the virtual world associated with the bingo gaming client;

enabling a live host to identify to one or more locations in the virtual world, in which the live host provides updates on the points awarded to one or more bingo gaming clients at the virtual world location;

enabling the live host to selectively broadcast at least one of a first virtual world and a second virtual world during the tournament session, and the live host broadcast is displayed on at least one of a networked display and the gaming clients;

associating a tournament prize with the tournament session, in which the tournament prize is displayed on each bingo gaming client; and awarding the tournament prize to one or more bingo gaming clients displaying a highest point total upon completion of the tournament session.

15. The bingo gaming method of claim 14 wherein the live host is displayed on the bingo gaming client.

16. The bingo gaming method of claim 14 further comprising at least one progressive prize that receives a portion of each wager received by the bingo wagering sub-system.

17. The bingo gaming method of claim 16 wherein the progressive prize associated with the tournament session, in which the progressive prize is displayed on each bingo gaming client, and wherein the progressive prize is awarded to each bingo gaming client at the completion of the bingo game session when the random game outcome corresponds to being awarded the progressive prize.

18. The bingo gaming method of claim 14 wherein the live host selects locations in the virtual world and provides updates about game play in the virtual world gaming tournament.

19. The bingo gaming method of claim 14 wherein each bingo gaming client in the tournament session receives a same wager from each bingo gaming client.

20. The bingo gaming method of claim 14 wherein the symbolic representation associated with the random outcome includes at least one bingo card, a point value and a symbolic object that is associated with the point value.

* * * * *